United States Patent
Niu et al.

(10) Patent No.: US 9,497,651 B2
(45) Date of Patent: Nov. 15, 2016

(54) TECHNIQUES FOR MMWAVE-CAPABLE SMALL CELL DETECTION

(71) Applicant: Intel IP Corporation, Santa Clara, CA (US)

(72) Inventors: Huaning Niu, Milpitas, CA (US); Qian Li, Hillsboro, OR (US); Carlos Cordeiro, Portland, OR (US); Pingping Zong, Randolph, NJ (US); Andreas Schmidt, Braunschweig (DE)

(73) Assignee: INTEL IP CORPORATION, Santa Clara, CA (US)

( * ) Notice: Subject to any disclaimer, the term of this patent is extended or adjusted under 35 U.S.C. 154(b) by 118 days.

(21) Appl. No.: 14/583,652

(22) Filed: Dec. 27, 2014

(65) Prior Publication Data

US 2015/0223088 A1 Aug. 6, 2015

Related U.S. Application Data

(60) Provisional application No. 61/934,525, filed on Jan. 31, 2014.

(51) Int. Cl.
| | |
|---|---|
| H04W 4/00 | (2009.01) |
| H04W 24/08 | (2009.01) |
| H04W 48/16 | (2009.01) |
| H04W 24/10 | (2009.01) |

(52) U.S. Cl.
CPC ............. *H04W 24/08* (2013.01); *H04W 24/10* (2013.01); *H04W 48/16* (2013.01)

(58) Field of Classification Search
CPC combination set(s) only.
See application file for complete search history.

(56) References Cited

U.S. PATENT DOCUMENTS

| | | | |
|---|---|---|---|
| 9,119,022 B2* | 8/2015 | Sinha | H04W 8/005 |
| 9,294,929 B2* | 3/2016 | Touag | H04W 16/14 |
| 2011/0064033 A1* | 3/2011 | Gong | H04B 7/0617 370/329 |
| 2014/0198676 A1* | 7/2014 | Han | H04W 24/10 370/252 |
| 2015/0029919 A1* | 1/2015 | Han | H04W 48/16 370/311 |

OTHER PUBLICATIONS

Li et al, Anchor-Booster Based Heterogeneous Networks with mmWave Capable Booster Cells, IEEE, 6 pages, 20013.*

* cited by examiner

*Primary Examiner* — Frank Duong

(57) ABSTRACT

Techniques for millimeter-wave (mmWave)-capable small cell detection are described. In one embodiment, for example, a mobile communication device may comprise at least one radio frequency (RF) transceiver, at least one RF antenna, and logic, at least a portion of which is in hardware, the logic to receive initiator sector sweep (ISS) monitoring instructions identifying one or more millimeter-wave (mmWave) frequency channels to be monitored, perform an ISS monitoring procedure comprising monitoring the one or more mmWave frequency channels, and send an ISS monitoring report indicating whether any mmWave-capable boosters have been detected during the ISS monitoring procedure. Other embodiments are described and claimed.

25 Claims, 15 Drawing Sheets

TECHNIQUES FOR MMWAVE-CAPABLE SMALL CELL DETECTION

RELATED CASE

This application claims priority to U.S. Provisional Patent Application No. 61/934,525, filed Jan. 1, 2014, the entirety of which is hereby incorporated by reference.

TECHNICAL FIELD

Embodiments described herein generally relate to wireless communications between devices in wireless networks.

BACKGROUND

The millimeter-wave (mmWave) frequency spectrum offers substantial promise for use in accommodating the ever-growing demand for wireless cellular data service. The mmWave spectrum contains a large amount of available bandwidth, and the physical properties of mmWave signals may support the application of robust beamforming and/or spatial multiplexing techniques and enable significant data rate improvements relative to the data rates achieved via lower frequency bands.

In order to enable mmWave-capable mobile devices in a given physical region to realize such benefits, one or more mmWave-capable small cells (MCSCs) may be deployed in that region. In each MCSC, an mmWave-capable control node may transmit synchronization ("sync") signals to enable mmWave-capable mobile devices to discover that MCSC. The transmissions of such sync signals may be highly directional, and may be swept through various sectors of the MCSC in sequence. As mmWave signals tend to be more susceptible to attenuation than are signals of lower frequency bands, MCSCs may tend to be fairly small. As such, MCSC deployments may often be relatively dense, especially in high-traffic areas.

The directional nature of MCSC sync signals can present challenges with respect to MCSC discovery, and dense MCSC deployments can add to those challenges. According to conventional techniques, to maintain an acceptably low degree of latency with respect to MCSC detection, the mmWave-capable mobile device may be forced to scan the mmWave band on a virtually continuous basis, resulting in rapid power consumption.

DETAILED DESCRIPTION

Figure 1:
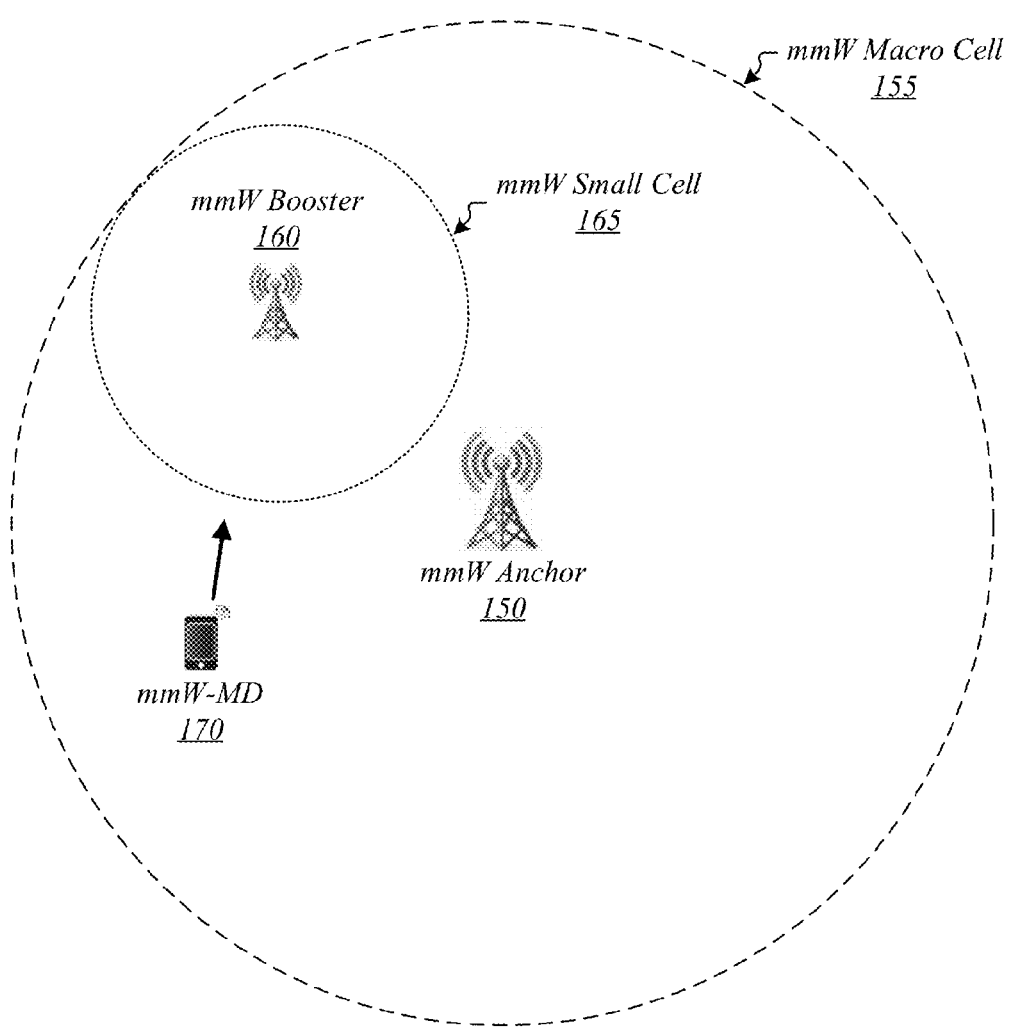
FIG. 1 illustrates an embodiment of a first operating environment.

Various embodiments may be generally directed to techniques for millimeter-wave (mmWave)-capable small cell detection. In one embodiment, for example, a mobile communication device may comprise at least one radio frequency (RF) transceiver, at least one RF antenna, and logic, at least a portion of which is in hardware, the logic to receive initiator sector sweep (ISS) monitoring instructions identifying one or more millimeter-wave (mmWave) frequency channels to be monitored, perform an ISS monitoring procedure comprising monitoring the one or more mmWave frequency channels, and send an ISS monitoring report indicating whether any mmWave-capable boosters have been detected during the ISS monitoring procedure. Other embodiments are described and claimed.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain topology by way of example, the embodiment may include more or less elements in alternate topologies as desired for a given implementation. It is worthy to note that any reference to "one embodiment" or "an embodiment" means that a particular feature, structure, or characteristic described in connection with the embodiment is included in at least one embodiment. The appearances of the phrases "in one embodiment," "in some embodiments," and "in various embodiments" in various places in the specification are not necessarily all referring to the same embodiment.

Various embodiments herein are generally directed to wireless communications systems. Some embodiments are particularly directed to wireless communications over millimeter wave (mmWave) frequencies. Various such embodiments may involve wireless communications performed according to one or more standards for mmWave wireless communications. For example, some embodiments may involve wireless communications performed according to one or more Wireless Gigabit Alliance ("WiGig")/Institute of Electrical and Electronics Engineers (IEEE) 802.11ad standards, such as IEEE 802.11ad-2012. Various embodiments may additionally or alternatively involve wireless communications according to one or more other wireless communication standards. Some embodiments may involve wireless communications performed according to one or more broadband wireless communication standards. For example, various embodiments may involve wireless communications performed according to one or more 3rd Generation Partnership Project (3GPP), 3GPP Long Term Evolution (LTE), and/or 3GPP LTE-Advanced (LTE-A) technologies and/or standards, including their predecessors, revisions, progeny, and/or variants.

Additional examples of broadband wireless communication technologies/standards that may be utilized in some embodiments may include—without limitation—Global System for Mobile Communications (GSM)/Enhanced Data Rates for GSM Evolution (EDGE), Universal Mobile Telecommunications System (UMTS)/High Speed Packet Access (HSPA), and/or GSM with General Packet Radio Service (GPRS) system (GSM/GPRS), IEEE 802.16 wireless broadband standards such as IEEE 802.16m and/or IEEE 802.16p, International Mobile Telecommunications Advanced (IMT-ADV), Worldwide Interoperability for Microwave Access (WiMAX) and/or WiMAX II, Code Division Multiple Access (CDMA) 2000 (e.g., CDMA2000 1×RTT, CDMA2000 EV-DO, CDMA EV-DV, and so forth), High Performance Radio Metropolitan Area Network (HIPERMAN), Wireless Broadband (WiBro), High Speed Downlink Packet Access (HSDPA), High Speed Orthogonal Frequency-Division Multiplexing (OFDM) Packet Access (HSOPA), High-Speed Uplink Packet Access (HSUPA) technologies and/or standards, including their predecessors, revisions, progeny, and/or variants.

Further examples of wireless communications technologies and/or standards that may be used in various embodiments may include—without limitation—other IEEE wireless communication standards such as the IEEE 802.11, IEEE 802.11a, IEEE 802.11b, IEEE 802.11g, IEEE 802.11n, IEEE 802.11u, IEEE 802.11ac, IEEE 802.11af, and/or IEEE 802.11ah standards, High-Efficiency Wi-Fi standards developed by the IEEE 802.11 High Efficiency WLAN (HEW) Study Group, Wi-Fi Alliance (WFA) wireless communication standards such as Wi-Fi, Wi-Fi Direct, Wi-Fi Direct Services, WiGig Display Extension (WDE), WiGig Bus Extension (WBE), WiGig Serial Extension (WSE) standards and/or standards developed by the WFA Neighbor Awareness Networking (NAN) Task Group, machine-type communications (MTC) standards such as those embodied in 3GPP Technical Report (TR) 23.887, 3GPP Technical Specification (TS) 22.368, and/or 3GPP TS 23.682, and/or near-field communication (NFC) standards such as standards developed by the NFC Forum, including any predecessors, revisions, progeny, and/or variants of any of the above. The embodiments are not limited to these examples.

FIG. 1 illustrates an example of an operating environment 100 such as may be representative of various embodiments. In operating environment 100, an mmWave-capable anchor node (mmW anchor) 150 generally provides wireless coverage within an mmWave-capable macro cell (mmW macro cell) 155, and an mmWave-capable booster node (mmW booster) 160 generally provides wireless coverage within an mmWave-capable small cell (mmW small cell) 165 located within mmW macro cell 155. mmW anchor 150 serves an mmWave-capable mobile device (mmW-MD) 170 located within mmW macro cell 155. In some embodiments, mmW anchor 150 may comprise an mmWave-capable anchor evolved node B (eNB), mmW booster 160 may comprise an mmWave-capable booster eNB, and mmW-MD 170 may comprise mmWave-capable user equipment (UE). The embodiments are not limited in this context.

Operating environment 100 may be representative of a capacity deployment of mmW small cell 165 according to various embodiments. As used herein in reference to a given mmW small cell, the term "capacity deployment" denotes an mmW small cell deployment with respect to which the procedures for mmW small cell discovery and connection establishment are based on an assumption that an mmW booster that serves the mmW small cell—as well as any mmW-MDs operating within the mmW small cell—will have connectivity to an mmW anchor that serves an overlaid mmW macro cell. In some embodiments, in a capacity deployment, an mmW booster may be positioned within a highly-trafficked region of an mmW macro cell, in order to help a serving mmW anchor to accommodate the heightened capacity demands associated with such a region. The embodiments are not limited in this context.

In operating environment 100, as mmW-MD 170 moves within mmW macro cell 155 and approaches mmW small cell 165, it may be desirable that mmW-MD 170 discover mmW booster 160 and establish a connection with mmW booster 160. If operating environment 100 embodies a capacity deployment of mmW small cell 165, the procedures to enable mmW small cell discovery and connection establishment on the part of mmW-MD 170 may reflect an underlying assumption that both mmW booster 160 and mmW-MD 170 will have connectivity with mmW anchor 150. The embodiments are not limited in this context.

In various embodiments, the procedures for mmW small cell discovery and connection establishment in a capacity deployment may reflect one or more additional underlying assumptions. In some embodiments, the procedures in a capacity deployment may reflect an underlying assumption that an mmW anchor is capable of monitoring the geographical location(s) of all mmW-MDs that it manages. In various embodiments, the procedures in a capacity deployment may reflect an underlying assumption that an mmW anchor is aware of the geographical location(s) of all mmW boosters that it manages. In some embodiments, the procedures in a capacity deployment may reflect an underlying assumption that any given mmW booster may independently enter a dormant state in the event that there is no traffic within its mmW small cell, but will still maintain synchronization with the mmW anchor while in the dormant state. In various embodiments, the procedures in a capacity deployment may reflect an underlying assumption that each mmW booster in an mmW macro cell periodically reports mmW small cell traffic load information to the mmW anchor for that mmW macro cell. The embodiments are not limited in this context.

Figure 2:
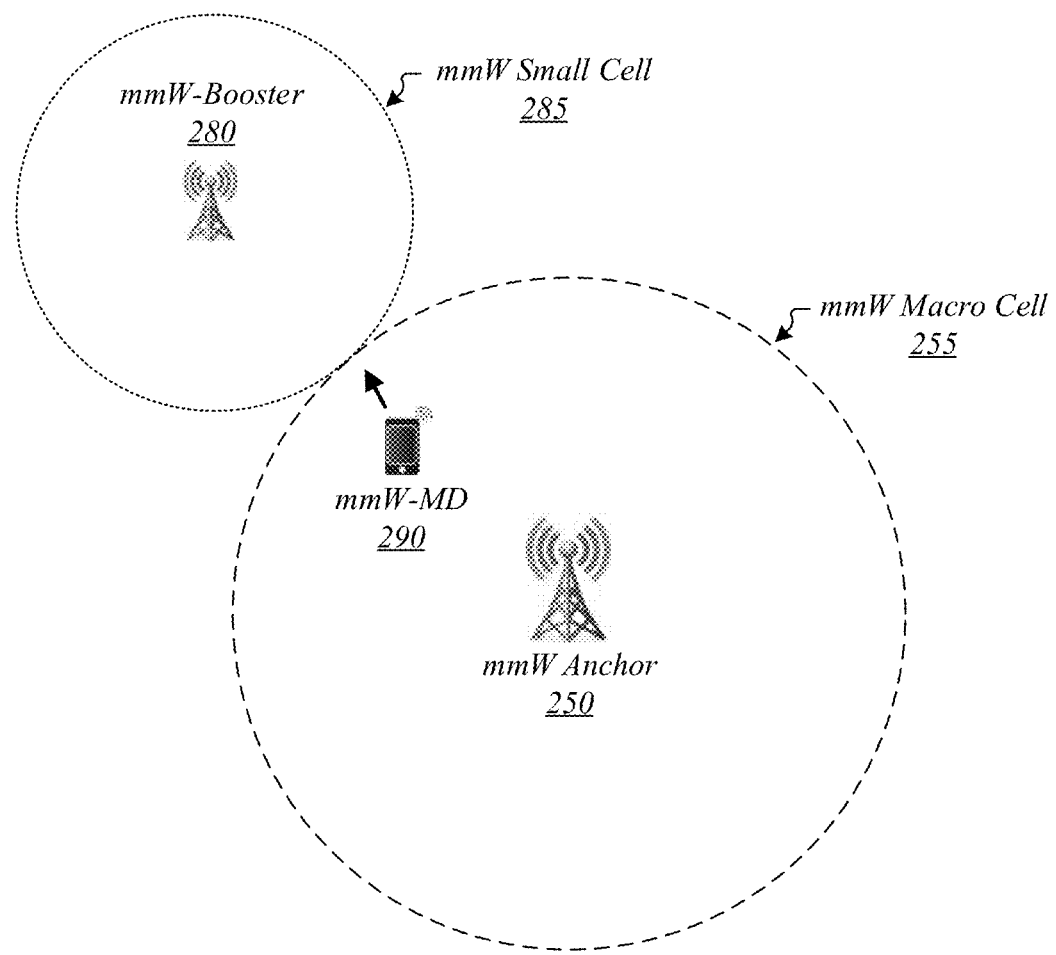
FIG. 2 illustrates an embodiment of a second operating environment.

FIG. 2 illustrates an example of an operating environment 200 such as may be representative of some embodiments. In operating environment 200, an mmW anchor 250 generally provides wireless coverage within an mmW macro cell 255, and an mmW booster 280 generally provides wireless coverage within an mmW small cell 285 that is located just outside of mmW macro cell 255. The mmW anchor 250 serves an mmW-MD 290 located within mmW macro cell 255. In various embodiments, mmW anchor 250 may comprise an mmWave-capable anchor eNB, mmW booster 280 may comprise an mmWave-capable booster eNB, and mmW-MD 290 may comprise an mmWave-capable UE. The embodiments are not limited in this context.

Operating environment 200 may be representative of a coverage deployment of mmW small cell 285 according to some embodiments. As used herein in reference to a given mmW small cell, the term "coverage deployment" denotes an mmW small cell deployment with respect to which the procedures for mmW small cell discovery and connection establishment are based on the premise that an mmW booster that serves the mmW small cell—and/or any given mmW-MD operating within the mmW small cell—may not have connectivity to a neighboring mmW anchor. In various embodiments, in a coverage deployment, an mmW booster may be positioned near the periphery of an mmW macro cell, in order to implement an mmW small cell that provides coverage to a region that cannot be reliably served by an mmW anchor of the mmW macro cell. It is worthy of note that although mmW small cell 285 is depicted in FIG. 2 as being entirely outside of mmW macro cell 255 and tangential to mmW macro cell 255, the embodiments are not so limited. In some coverage deployments, there may be overlap between the mmW small cell and the mmW macro cell. In various other coverage deployments, there may be a gap between the periphery of the mmW small cell and that of the mmW macro cell. The embodiments are not limited in this context.

In operating environment 200, as mmW-MD 290 moves towards the periphery of mmW macro cell 255 and approaches mmW small cell 285, it may be desirable the mmW-MD 290 discover mmW booster 280 and establish a connection with mmW booster 280. If operating environment 200 embodies a coverage deployment of mmW small cell 285, the procedures to enable mmW small cell discovery and connection establishment on the part of mmW-MD 290 may reflect the premise that one or both of mmW booster 280 and mmW-MD 290 may not have connectivity with mmW anchor 250. The embodiments are not limited in this context.

In some embodiments, the procedures for mmW small cell discovery and connection establishment in a coverage deployment may reflect one or more additional underlying assumptions. In various embodiments, the procedures in a coverage deployment may reflect an underlying assumption that an mmW anchor is capable of monitoring the geographical location(s) of all mmW-MDs that it manages. In some embodiments, the procedures in a coverage deployment may reflect an underlying assumption that an mmW anchor may be aware of the geographical location(s) of mmW booster(s) that are located in the vicinity of the mmW anchor but do not have connectivity with the mmW anchor. In various embodiments, the procedures in a coverage deployment may reflect an underlying assumption that an mmW anchor may be capable of informing an mmW-MD of mmW small cells in the vicinity of the mmW-MD, even if the mmW anchor does not have connectivity with those mmW small cells. In some embodiments, the procedures in a coverage deployment may reflect an underlying assumption that if an mmW booster has an LTE interface, it will use that LTE interface to notify mmW-MDs of its mmWave capabilities. In various embodiments, the procedures in a coverage deployment may reflect an underlying assumption that if an mmW booster with LTE capabilities has established connectivity with an mmW-MD via its mmWave interface, it will use that connectivity to notify the mmW-MD of its LTE capabilities. The embodiments are not limited in this context.

Figure 3:
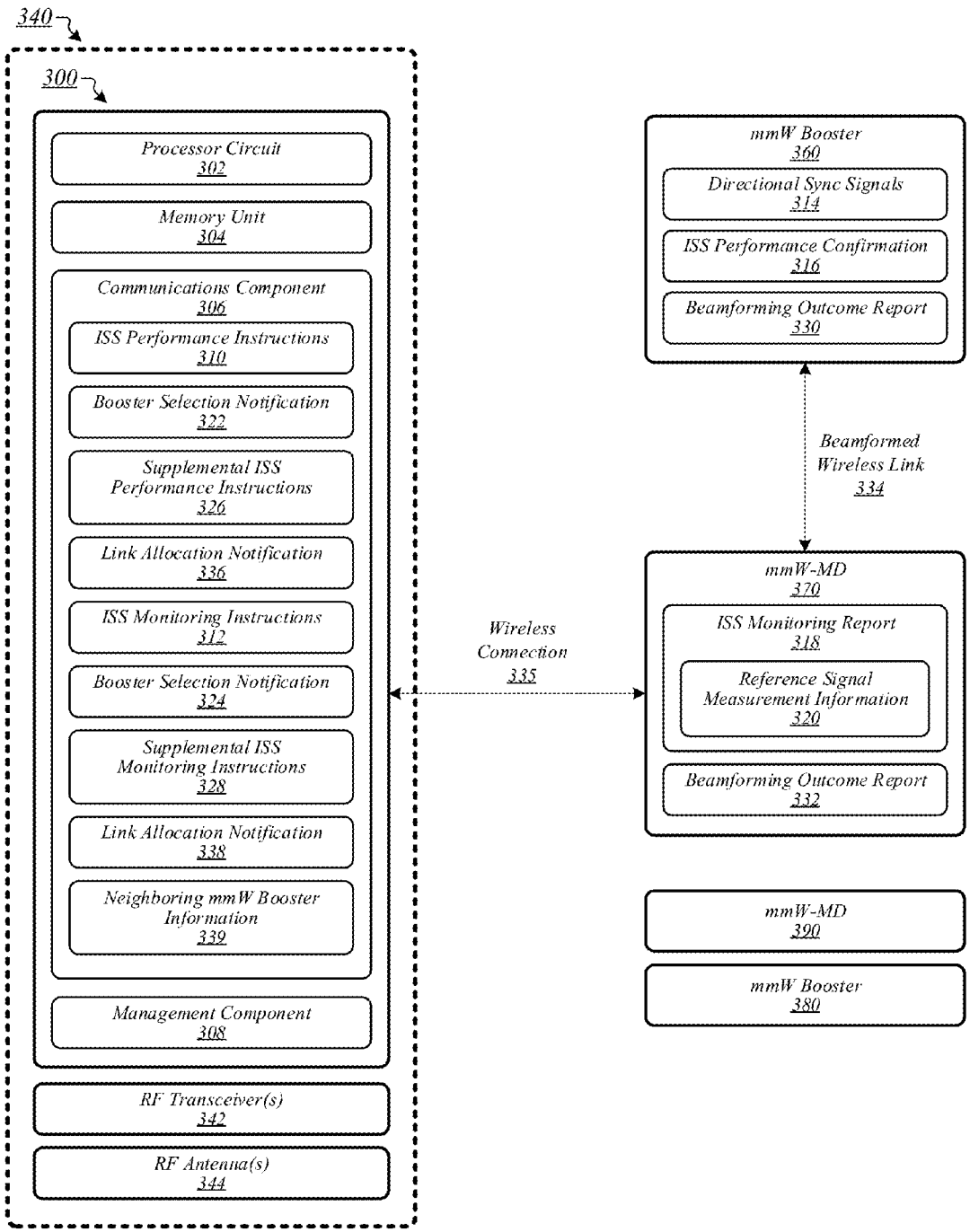
FIG. 3 illustrates an embodiment of a first apparatus and an embodiment of a first system.

FIG. 3 illustrates a block diagram of an apparatus 300 such as may be representative of an mmW anchor that may implement techniques to support efficient mmW small cell detection in some embodiments. For example, apparatus 300 may be representative of mmW anchor 150 of FIG. 1 and/or mmW anchor 250 of FIG. 2. As shown in FIG. 3, apparatus 300 comprises multiple elements including a processor circuit 302, a memory unit 304, a communications component 306, and a management component 308. The embodiments, however, are not limited to the type, number, or arrangement of elements shown in this figure.

In various embodiments, apparatus 300 may comprise processor circuit 302. Processor circuit 302 may be implemented using any processor or logic device, such as a complex instruction set computer (CISC) microprocessor, a reduced instruction set computing (RISC) microprocessor, a very long instruction word (VLIW) microprocessor, an ×86 instruction set compatible processor, a processor implementing a combination of instruction sets, a multi-core processor such as a dual-core processor or dual-core mobile processor, or any other microprocessor or central processing unit (CPU). Processor circuit 302 may also be implemented as a dedicated processor, such as a controller, a microcontroller, an embedded processor, a chip multiprocessor (CMP), a co-processor, a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In one embodiment, for example, processor circuit 302 may be implemented as a general purpose processor, such as a processor made by Intel® Corporation, Santa Clara, Calif. The embodiments are not limited in this context.

In some embodiments, apparatus 300 may comprise or be arranged to communicatively couple with a memory unit 304. Memory unit 304 may be implemented using any machine-readable or computer-readable media capable of storing data, including both volatile and non-volatile memory. For example, memory unit 304 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy of note that some portion or all of memory unit 304 may be included on the same integrated circuit as processor circuit 302, or alternatively some portion or all of memory unit 304 may be disposed on an integrated circuit or other medium, for example a hard disk drive, that is external to the integrated circuit of processor circuit 302. Although memory unit 304 is comprised within apparatus 300 in FIG. 3, memory unit 304 may be external to apparatus 300 in various embodiments. The embodiments are not limited in this context.

In some embodiments, apparatus 300 may comprise a communications component 306. Communications component 306 may comprise logic, circuitry, and/or instructions operative to send messages to one or more remote devices and/or to receive messages from one or more remote devices. In various embodiments, communications component 306 may be operative to send and/or receive messages over one or more wired connections, one or more wireless connections, or a combination of both. In some embodiments, communications component 306 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, apparatus 300 may comprise a management component 308. Management component 308 may comprise logic, circuitry, and/or instructions operative to manage various operations performed by apparatus 300. In some embodiments, management component 308 may be operative to control operations that apparatus 300 performs in conjunction with managing and/or communicating with one or more external devices. In various embodiments, management component 308 may be operative to control operations performed by apparatus 300 in support of mmW small cell detection on the part of one or more mobile devices. The embodiments are not limited in this context.

FIG. 3 also illustrates a block diagram of a system 340. System 340 may comprise any of the aforementioned elements of apparatus 300. System 340 may further comprise one or more radio frequency (RF) transceivers 342. Any given RF transceiver 342 may comprise one or more radios capable of transmitting and receiving signals using various suitable wireless communications techniques. Such techniques may involve communications across one or more wireless networks. Exemplary wireless networks include (but are not limited to) cellular radio access networks, wireless local area networks (WLANs), wireless personal area networks (WPANs), wireless metropolitan area network (WMANs), and satellite networks. In communicating across such networks, RF transceiver(s) 342 may operate in accordance with one or more applicable standards in any version. The embodiments are not limited in this context.

In some embodiments, system 340 may comprise one or more RF antennas 344. Examples of any particular RF antenna 344 may include, without limitation, an internal antenna, an omni-directional antenna, a monopole antenna, a dipole antenna, an end-fed antenna, a circularly polarized antenna, a micro-strip antenna, a diversity antenna, a dual antenna, a tri-band antenna, a quad-band antenna, and so forth. In various embodiments, one or more RF transceivers 342 may be operative to send and/or receive messages and/or data using one or more RF antennas 344. The embodiments are not limited in this context.

In some embodiments, apparatus 300 and/or system 340 may operate as an mmW anchor and may provide wireless coverage within an mmW macro cell, such as mmW macro cell 155 of FIG. 1 and/or mmW macro cell 255 of FIG. 2. In various embodiments, a capacity-deployed mmW booster 360 may serve an mmW small cell located within an mmW macro cell served by apparatus 300 and/or system 340. In some embodiments, mmW booster 360 may be the same as—or similar to—mmW booster 160 of FIG. 1. In various embodiments, apparatus 300 and/or system 340 may be aware of the geographic location of mmW booster 360. In some embodiments, apparatus 300 and/or system 340 may be operative to serve an mmW-MD 370. In various embodiments, mmW-MD 370 may be the same as—or similar to—mmW-MD 170 of FIG. 1. In some embodiments, in addition to serving mmW-MD 370, apparatus 300 and/or system 340 may be operative to monitor the geographic location of mmW-MD 370 as it moves within the mmW macro cell. The embodiments are not limited in this context.

In various embodiments, during ongoing monitoring of the geographic location of mmW-MD 370, management component 308 may be operative to determine that mmW-MD 370 has entered or approached the mmW small cell served by mmW booster 360. In some embodiments, in response to this determination, management component 308 may be operative to determine that an mmW small cell discovery and connection establishment procedure is to be initiated, to enable mmW-MD 370 to discover mmW booster 360 and establish a connection with mmW booster 360.

In various embodiments, in response to initiation of the mmW small cell discovery and connection establishment procedure, communications component 306 may be operative to send initiator sector sweep (ISS) performance instructions 310 to mmW booster 360. In some embodiments, ISS performance instructions 310 may instruct mmW booster 360 to transmit directional synchronization (sync) signals 314. In various embodiments, the directional sync signals 314 may comprise primary synchronization signals (PSSs) and/or secondary synchronization signals (SSSs). In some embodiments, ISS performance instructions 310 may instruct mmW booster 360 to perform an initiator sector sweep (ISS), according to which mmW booster 360 may sweep directional sync signal transmissions through the various sectors of its mmW small cell. Hereinafter, the term "ISS sector" shall be employed to denote a sector comprised among one or more sectors through which transmissions are swept during an ISS. In various embodiments, ISS performance instructions 310 may specify one or more mmWave frequency channels over which mmW booster 360 is to transmit directional sync signals 314 during the ISS. In some embodiments, ISS performance instructions 310 may specify a time interval during which mmW booster 360 is to perform the ISS. The embodiments are not limited in this context.

Although FIG. 3 depicts a single mmW booster 360, the embodiments are not limited to this depiction. In various embodiments, during ongoing monitoring of the geographic location of mmW-MD 370, management component 308 may be operative to determine that mmW-MD 370 has entered the vicinity of a plurality of mmW small cells that includes the mmW small cell served by mmW booster 360. In some such embodiments, communications component 306 may be operative to send ISS performance instructions 310 to each of the respective mmW boosters for the plurality of mmW small cells. In various embodiments, communications component 306 may be operative to send ISS performance instructions 310 that specify a different respective time interval during which each mmW booster is to perform its ISS. In some embodiments, communications component 306 may be operative to send ISS performance instructions 310 that specify one or more respective mmWave frequency channels over which each mmW booster is to transmit its directional sync signals 314. The embodiments are not limited in this context.

In various embodiments, communications component 306 may be operative to send ISS monitoring instructions 312 to mmW-MD 370. In some embodiments, ISS monitoring instructions 312 may instruct mmW-MD 370 to scan for directional sync signals 314. In various embodiments, ISS monitoring instructions 312 may specify one or more mmWave frequency channels on which mmW-MD 370 is to scan for directional sync signals 314. In some embodiments, ISS monitoring instructions 312 may specify one or more time intervals during which mmW-MD 370 is to scan for directional sync signals 314. In various embodiments, each such time interval may correspond to a time interval during which a respective mmW booster will transmit directional sync signals 314 based on respective ISS performance instructions 310 received from apparatus 300 and/or system 340. In some embodiments, for each such time interval, ISS monitoring instructions 312 may specify one or more respective mmWave frequency channels on which mmW-MD 370 is to scan for directional sync signals 314 during that time interval. The embodiments are not limited in this context.

In various embodiments, in response to receipt of ISS performance instructions 310, mmW booster 360 may be operative to transmit directional sync signals 314 during the time interval(s) and over the mmWave frequency channel(s) specified in ISS performance instructions 310. In some embodiments, mmW booster 360 may then be operative to send ISS performance confirmation 316 to apparatus 300 and/or system 340 to confirm that it has transmitted directional sync signals 314 according to the parameters specified in ISS performance instructions 310. In various embodiments, communications component 306 may be operative to receive a plurality of ISS performance confirmations 316, each corresponding to a respective one of a plurality of mmW boosters to which communications component 306 sent ISS performance instructions 310. The embodiments are not limited in this context.

In some embodiments, mmW-MD 370 may be operative to scan for directional sync signals 314 according to the parameters specified in ISS monitoring instructions 312. In various embodiments, mmW-MD 370 may be operative to detect multiple mmW boosters based on respective directional sync signals 314 that it successfully receives from those multiple mmW boosters. In an example of such an embodiment, mmW-MD 370 may be operative to detect mmW booster 360 and one or more other mmW boosters. In some other embodiments, mmW-MD 370 may be operative to detect a single mmW booster. In an example of such an embodiment, mmW-MD 370 may be operative to detect mmW booster 360 based on directional sync signals 314 sent by mmW booster 360, but may not detect any other mmW booster. In yet other embodiments, mmW-MD 370 may not detect any mmW booster. In an example of such an embodiment, mmW-MD 370 may begin moving at a high rate of speed just as management component 308 determines to initiate the mmW small cell discovery and connection establishment procedure, and may no longer be within range of any mmW booster(s) to which communications component 306 sends ISS performance instructions 310. The embodiments are not limited to these examples.

In various embodiments, mmW-MD 370 may be operative to send an ISS monitoring report 318 to apparatus 300 and/or system 340. In some embodiments, ISS monitoring report 318 may comprise information indicating a number of mmW boosters that mmW-MD 370 has been able to detect based on the directional sync signals 314 transmitted according to the mmW small cell discovery and connection establishment procedure. In various embodiments, ISS monitoring report 318 may indicate that mmW-MD 370 has not been able to detect any mmW boosters. In some embodiments, in response to an ISS monitoring report 318 that indicates that mmW-MD 370 has not been able to detect any mmW boosters, management component 308 may be operative to transmit new sets of ISS performance instructions 310 and ISS monitoring instructions 312 in order to provide mmW-MD 370 with another chance to discover an mmW booster. In various other embodiments, management component 308 may simply terminate the mmW small cell discovery and connection establishment procedure for mmW-MD 370. The embodiments are not limited in this context.

In some embodiments, ISS monitoring report 318 may comprise information identifying one or more mmW boosters that mmW-MD 370 has detected. In various embodiments, ISS monitoring report 318 may comprise a respective mmW booster identifier (ID) for each mmW booster that mmW-MD 370 has detected. In some embodiments, ISS monitoring report 318 may identify multiple detected mmW boosters, and may comprise reference signal measurement information 320 for consideration by apparatus 300 and/or system 340 in selecting from among those multiple detected mmW boosters. In various embodiments, for each detected mmW booster, reference signal measurement information 320 may comprise a corresponding set of one or more reference signal measurements. For example, in some embodiments, for each detected mmW booster, reference signal measurement information 320 may a corresponding set of one or more reference signal measurements that includes one or more of a reference signal received power (RSRP), a reference signal received quality (RSRQ), and a received signal strength indicator (RSSI). It is worthy of note that in various embodiments, rather than being comprised in ISS monitoring report 318, reference signal measurement information 320 may be received separately from ISS monitoring report 318. The embodiments are not limited in this context.

In some embodiments, in response to an ISS monitoring report 318 that identifies multiple detected mmW boosters, management component 308 may be operative to select an mmW booster to serve mmW-MD 370 from among the multiple detected mmW boosters identified in the ISS monitoring report 318. In various embodiments, management component 308 may be operative to select from among the multiple detected mmW boosters based on reference signal measurement information 320. In some embodiments, management component 308 may be operative to select from among the multiple detected mmW boosters based additionally or alternatively on one or more other factors. Examples of such other factors in various embodiments may include, without limitation, the current respective traffic loads served by the multiple detected mmW boosters, the respective geographic locations of the multiple detected mmW boosters, the current geographic location of mmW-MD 370, and any current and/or expected mobility/motion of mmW-MD 370.

In some embodiments, management component 308 may be operative to identify an mmW booster that is to serve mmW-MD 370. In various embodiments, ISS monitoring report 318 may identify multiple mmW boosters that mmW-MD 370 has detected, and management component 308 may be operative to select an mmW booster from among those multiple detected mmW boosters. In some other embodiments, ISS monitoring report 318 may indicate that mmW-MD 370 has detected only one mmW booster, and management component 308 may be operative to identify that detected mmW booster as the mmW booster that is to serve mmW-MD 370. In the interest of clarity, the remainder of the discussion of FIG. 3 shall assume that management component 308 determines that mmW booster 360 is the mmW booster that is to serve mmW-MD 370. However, it is to be understood that the embodiments are not limited in this context.

In various embodiments, communications component 306 may be operative to send a booster selection notification 322 to mmW booster 360 in order to notify mmW booster 360 that it is to serve mmW-MD 370. In some embodiments, communications component 306 may be operative to send a booster selection notification 324 to mmW-MD 370 in order to notify mmW-MD 370 that it is to be served by mmW booster 360. In various embodiments, communications component 306 may only be operative to send booster selection notification 324 to mmW-MD 370 if it has selected mmW booster 360 from among multiple mmW boosters that mmW-MD 370 has detected. In some other embodiments, communications component 306 may be operative to send booster selection notification 324 to mmW-MD 370 even if mmW booster 360 is the only mmW booster that mmW-MD 370 has detected. The embodiments are not limited in this context.

In various embodiments, in order to account for potential changes in wireless channel conditions during the time elapsed since mmW booster 360 performed its ISS in response to ISS performance instructions 310, it may be desirable that mmW booster 360 perform a supplemental ISS and that mmW-MD 370 scan for directional sync signals 314 during that supplemental ISS. In some embodiments, communications component 306 may be operative to send supplemental ISS performance instructions 326 to mmW booster 360 in order to instruct mmW booster 360 to perform a supplemental ISS. In various embodiments, communications component 306 may be operative to send supplemental ISS performance instructions 326 to mmW booster 360 in response to a determination that a time elapsed since that booster's initial ISS is greater than a validity threshold $ISS_{VALIDITY}$. In some embodiments, communications component 306 may be operative to send supplemental ISS performance instructions 326 to mmW booster 360 in response to detected mobility on the part of mmW-MD 370 during the time elapsed since the initial ISS. In various other embodiments, communications component 306 may be operative to send supplemental ISS performance instructions 326 to mmW booster 360 simply based on its selection/identification of mmW booster 360 as the mmW booster that is to serve mmW-MD 370, without regard for the time elapsed since the initial ISS or any mobility on the part of mmW-MD 370 during that time. In some embodiments in which it sends supplemental ISS performance instructions 326 to mmW booster 360, communications component 306 may be operative to send supplemental ISS monitoring instructions 328 to mmW-MD 370 in order to instruct mmW-MD 370 to scan for directional sync signals 314 during the supplemental ISS. The embodiments are not limited in this context.

In various embodiments, once mmW booster 360 and mmW-MD 370 have been notified that mmW booster 360 is to serve mmW-MD 370—and following a supplemental ISS, if one is performed—mmW booster 360 and mmW-MD 370 may perform an mmWave beamforming procedure in order to establish a beamformed wireless link 334 between mmW booster 360 and mmW-MD 370. In some embodiments, communications component 306 may be operative to receive information from mmW booster 360 and/or mmW-MD 370 that indicates whether the mmWave beamforming procedure between mmW booster 360 and mmW-MD 370 has been successful. In various embodiments, communications component 306 may be operative to receive a beamforming outcome report 330 from mmW booster 360 and a beamforming outcome report 332 from mmW-MD 370. In some embodiments, beamforming outcome report 330 may comprise information indicating whether the mmWave beamforming procedure has been successful from the perspective of mmW booster 360, and beamforming outcome report 332 may comprise information indicating whether the mmWave beamforming procedure has been successful from the perspective of mmW-MD 370. In various embodiments, if both beamforming outcome report 330 and beamforming outcome report 332 indicate success, management component 308 may be operative to determine that the mmWave beamforming procedure between mmW booster 360 and mmW-MD 370 has been successful. In some embodiments, if one or both of beamforming outcome report 330 and beamforming outcome report 332 indicates failure, management component 308 may be operative to determine that the mmWave beamforming procedure between mmW booster 360 and mmW-MD 370 has failed. The embodiments are not limited in this context.

In various embodiments, in response to a determination that the mmWave beamforming procedure between mmW booster 360 and mmW-MD 370 has failed, management component 308 may be operative to terminate the mmW small cell discovery and connection establishment procedure for mmW-MD 370. In some other embodiments, if ISS monitoring report 318 identifies multiple detected mmW boosters, management component 308 may be operative to select a different detected mmW booster. In various such embodiments, communications component 306 may then send a booster selection notification 322 to the newly selected mmW booster to notify the newly selected mmW booster that it is to serve mmW-MD 370, and may send a booster selection notification 324 to mmW-MD 370 to notify mmW-MD 370 that it is to be served by the newly selected mmW booster. In some embodiments, communications component 306 may be operative to send supplemental ISS performance instructions 326 to the newly selected mmW booster in order to instruct the newly selected mmW booster to perform a supplemental ISS, and may be operative to send supplemental ISS monitoring instructions 328 to mmW-MD 370 in order to instruct mmW-MD 370 to scan for directional sync signals 314 during the supplemental ISS. The embodiments are not limited in this context.

In various embodiments, in response to a determination that the mmWave beamforming procedure between mmW booster 360 and mmW-MD 370 has been successful, management component 308 may generally be operative to determine how the beamformed wireless link 334 is to be used to accommodate downlink and/or uplink communications on the part of mmW-MD 370. More particularly, in some embodiments, management component 308 may be operative to determine what types of data are to be communicated to/from mmW-MD 370 over beamformed wireless link 334 and what types of data are to be communicated to/from mmW-MD 370 over a wireless connection 335 between mmW-MD 370 and apparatus 300 and/or system 340. In various embodiments, management component 308 may be operative to define a control plane/user plane split with respect to how data is to be communicated to/from mmW-MD 370 over beamformed wireless link 334 and wireless connection 335. In some embodiments, management component 308 may be operative to allocate beamformed wireless link 334 for use in communication of user plane data to/from mmW-MD 370, and may be operative to allocate wireless connection 335 for use in communication of control plane data to/from mmW-MD 370. In various other embodiments, rather than assigning all user plane data to beamformed wireless link 334, management component 308 may be operative to allocate wireless connection 335 for use in communication of certain types of user plane data, such as delay-sensitive user plane data. The embodiments are not limited to these examples.

In some embodiments, communications component 306 may be operative to send a link allocation notification 336 to mmW booster 360 and a link allocation notification 338 to mmW-MD 370 in order to inform them of the type(s) of communications that beamformed wireless link 334 has been allocated to accommodate. In various embodiments, link allocation notifications 336 and 338 may notify mmW booster 360 and mmW-MD 370, respectively, of a control plane/user plane split with respect to how data is to be communicated to/from mmW-MD 370 over beamformed wireless link 334 and wireless connection 335. In some embodiments, mmW booster 360 and mmW-MD 370 may then communicate over beamformed wireless link 334 in accordance with a control plane/user plane split indicated by link allocation notifications 336 and 338. The embodiments are not limited in this context.

In various embodiments, a coverage-deployed mmW booster 380 may serve an mmW small cell that is adjacent—or approximately adjacent—to an mmW macro cell served by apparatus 300 and/or system 340. In some embodiments, mmW booster 380 may be the same as—or similar to—mmW booster 280 of FIG. 2. In various embodiments, apparatus 300 and/or system 340 may not have connectivity with mmW booster 380, but may have awareness of the geographic location and/or capabilities of mmW booster 380. In some embodiments, apparatus 300 and/or system 340 may be operative to track the geographic location of an mmW-MD 390. In various embodiments, mmW-MD 390 may be the same as—or similar to—mmW-MD 290 of FIG. 2. The embodiments are not limited in this context.

In some embodiments, during ongoing monitoring of the geographic location of mmW-MD 390, management component 308 may be operative to determine that mmW-MD 390 has entered or approached the mmW small cell served by mmW booster 380. In various embodiments, in response to this determination, communications component 306 may be operative to send neighboring mmW booster information 339 to mmW-MD 390 in order to notify mmW-MD 390 that it is in proximity to mmW booster 380. In some embodiments, as will be discussed in more detail with respect to FIG. 9, mmW-MD 390 may initiate a procedure to discover mmW booster 380 in response to receipt of neighboring mmW booster information 339. The embodiments are not limited in this context.

Figure 4:
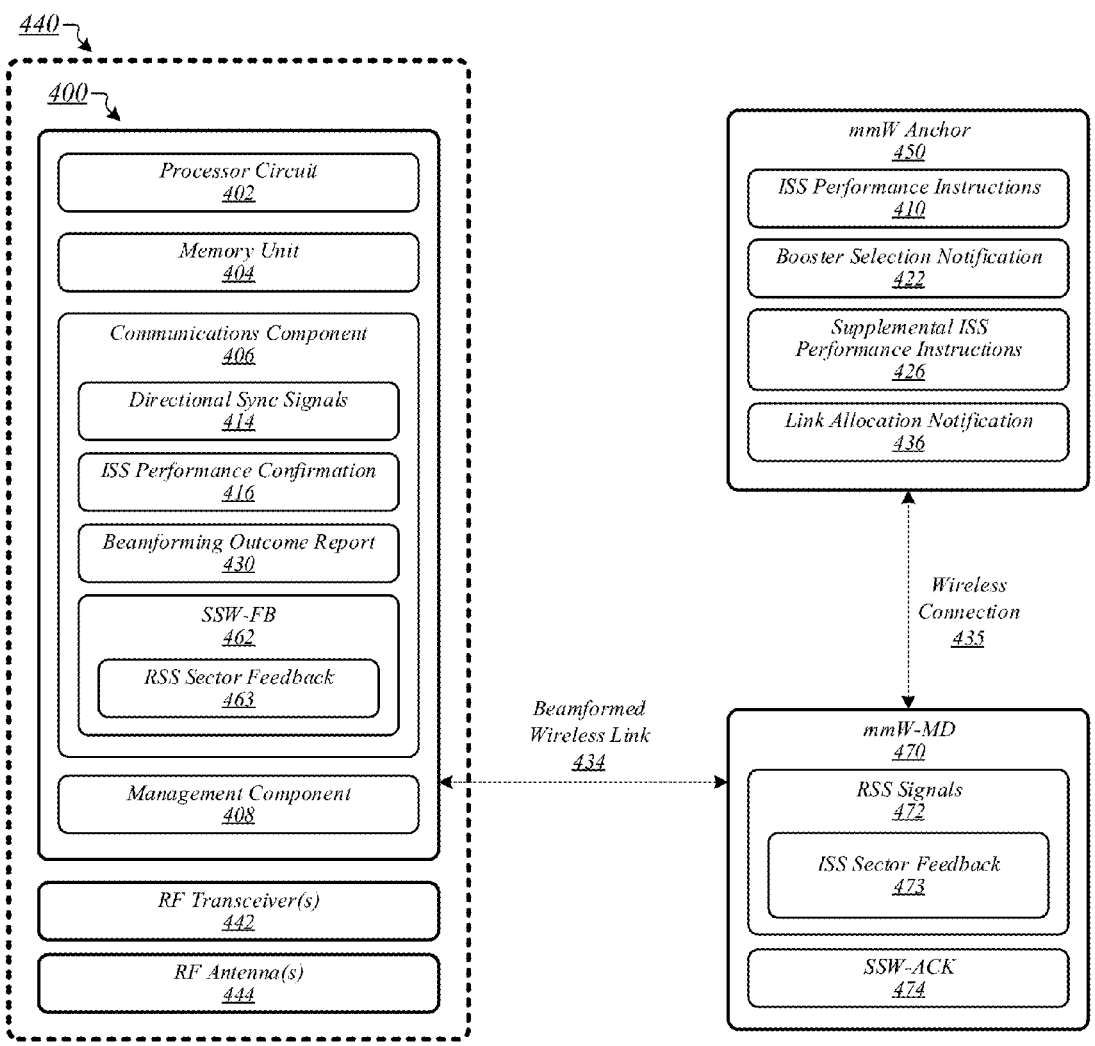
FIG. 4 illustrates an embodiment of a second apparatus and an embodiment of a second system.

FIG. 4 illustrates a block diagram of an apparatus 400 such as may be representative of a capacity-deployed mmW booster that may implement techniques to support efficient mmW small cell detection in various embodiments. For example, apparatus 400 may be representative of mmW booster 160 of FIG. 1 and/or mmW booster 360 of FIG. 3. As shown in FIG. 4, apparatus 400 comprises multiple elements including a processor circuit 402, a memory unit 404, a communications component 406, and a management component 408. The embodiments, however, are not limited to the type, number, or arrangement of elements shown in this figure.

In some embodiments, apparatus 400 may comprise processor circuit 402. Processor circuit 402 may be implemented using any processor or logic device, examples of which may include—without limitation—any of the examples previously mentioned with respect to processor circuit 302 of FIG. 3. The embodiments are not limited in this context.

In various embodiments, apparatus 400 may comprise or be arranged to communicatively couple with a memory unit 404. Memory unit 404 may be implemented using any machine-readable or computer-readable media capable of storing data, including both volatile and non-volatile memory. Examples of memory unit 404 may include—without limitation—any of the examples previously mentioned with respect to memory unit 304 of FIG. 3. It is worthy of note that some portion or all of memory unit 404 may be included on the same integrated circuit as processor circuit 402, or alternatively some portion or all of memory unit 404 may be disposed on an integrated circuit or other medium, for example a hard disk drive, that is external to the integrated circuit of processor circuit 402. Although memory unit 404 is comprised within apparatus 400 in FIG. 4, memory unit 404 may be external to apparatus 400 in some embodiments. The embodiments are not limited in this context.

In various embodiments, apparatus 400 may comprise a communications component 406. Communications component 406 may comprise logic, circuitry, and/or instructions operative to send messages to one or more remote devices and/or to receive messages from one or more remote devices. In some embodiments, communications component 406 may be operative to send and/or receive messages over one or more wired connections, one or more wireless connections, or a combination of both. In various embodiments, communications component 406 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In some embodiments, apparatus 400 may comprise a management component 408. Management component 408 may comprise logic, circuitry, and/or instructions operative to manage various operations performed by apparatus 400. In various embodiments, management component 408 may be operative to control operations that apparatus 400 performs in conjunction with managing and/or communicating with one or more external devices. In some embodiments, management component 408 may be operative to control operations performed by apparatus 400 in support of mmW small cell detection on the part of one or more mobile devices. The embodiments are not limited in this context.

FIG. 4 also illustrates a block diagram of a system 440. System 440 may comprise any of the aforementioned elements of apparatus 400. System 440 may further comprise one or more RF transceivers 442. Any given RF transceiver 442 may comprise one or more radios capable of transmitting and receiving signals using various suitable wireless communications techniques. Such techniques may involve communications across one or more wireless networks. Exemplary wireless networks may include—without limitation—any of the examples previously mentioned with respect to RF transceiver(s) 342 of FIG. 3. In communicating across such networks, RF transceiver(s) 442 may operate in accordance with one or more applicable standards in any version. The embodiments are not limited in this context.

In various embodiments, system 440 may comprise one or more RF antennas 444. Examples of any particular RF antenna 444 may include—without limitation—any of the examples previously mentioned with respect to RF antenna(s) 344 of FIG. 3. In some embodiments, one or more RF transceivers 442 may be operative to send and/or receive messages and/or data using one or more RF antennas 444. The embodiments are not limited in this context.

In various embodiments, apparatus 400 and/or system 440 may operate as an mmW booster in a capacity deployment, and may provide wireless coverage within an mmW small cell, such as mmW small cell 165 of FIG. 1. In some embodiments, an mmW anchor 450 may serve an mmW macro cell that is overlaid upon that mmW small cell. In various embodiments, mmW anchor 450 may be the same as—or similar to—mmW anchor 150 of FIG. 1, mmW anchor 250 of FIG. 2, and/or apparatus 300 and/or system 340 of FIG. 3. The embodiments are not limited in this context.

In some embodiments, during general operation of apparatus 400 and/or system 440, an mmW-MD 470 may enter or approach the mmW small cell served by apparatus 400 and/or system 440. In various embodiments, mmW-MD 470 may be the same as—or similar to—mmW-MD 170 of FIG. 1 and/or mmW-MD 370 of FIG. 3. In some embodiments, mmW anchor 450 may be operative to monitor the geographic location of the mmW-MD 470. In some embodiments, in response to a determination that mmW-MD 470 has entered or approached the mmW small cell served by apparatus 400 and/or system 440, mmW anchor 450 may be operative to initiate an mmW small cell discovery and connection establishment procedure to enable mmW-MD 470 to discover and establish a connection with apparatus 400 and/or system 440.

In some embodiments, in conjunction with the mmW small cell discovery and connection establishment procedure, communications component 406 may be operative to receive ISS performance instructions 410 from mmW anchor 450. In various embodiments, in response to ISS performance instructions 410, communications component 406 may be operative to perform an ISS. In some embodiments, communications component 406 may be operative to perform the ISS during a time interval specified by the ISS performance instructions 410. In various embodiments, during the ISS, communications component 406 may be operative to send directional sync signals 414 for detection/reception by mmW-MD 470. In some embodiments, directional sync signals 414 may comprise PSSs and/or SSSs. In various embodiments, communications component 406 may be operative on RF transceiver(s) 442 and/or RF antenna(s) 444 to sweep transmissions of directional sync signals 414 through the various sectors of the mmW small cell served by apparatus 400 and/or system 440. In some embodiments, communications component 406 may be operative on RF transceiver(s) 442 and/or RF antenna(s) 444 to transmit directional sync signals 414 over multiple mmWave frequency channels. In various embodiments, communications component 406 may be operative on RF transceiver(s) 442 and/or RF antenna(s) 444 to transmit directional sync signals 414 over each mmWave frequency channel that apparatus 400 and/or system 440 is configured to utilize. In some embodiments, communications component 406 may be operative on RF transceiver(s) 442 and/or RF antenna(s) 444 to transmit directional sync signals 414 over one or more mmWave frequency channels specified in ISS performance instructions 410. In various embodiments, communications component 406 may be operative to send an ISS performance confirmation 416 to mmW anchor 450 in order to confirm that it has performed the ISS as specified by ISS performance instructions 410. The embodiments are not limited in this context.

In some embodiments, based on feedback that it receives from mmW-MD 470, mmW anchor 450 may be operative to select apparatus 400 and/or system 440 as an mmW booster that is to serve mmW-MD 470. In various embodiments, communications component 406 may be operative to receive a booster selection notification 422 from mmW anchor 450 that indicates this selection. In some embodiments, in response to receipt of booster selection notification 422, management component 408 may be operative to initiate a responder sector sweep (RSS) monitoring procedure. In various embodiments, communications component 406 may be operative to receive supplemental ISS performance instructions 426 from mmW anchor 450, and may perform a supplemental ISS prior to initiation of the RSS monitoring procedure. In some other embodiments, communications component 406 may not receive supplemental ISS performance instructions 426, and may directly proceed with initiation of the RSS monitoring procedure following receipt of booster selection notification 422. The embodiments are not limited in this context.

In various embodiments, according to the RSS monitoring procedure, communications component 406 may be operative to monitor one or more mmWave frequency channels for RSS signals 472 transmitted by mmW-MD 470. In some embodiments, mmW anchor 450 may instruct mmW-MD 470 to perform an RSS, and mmW-MD 470 may transmit RSS signals 472 in conjunction with the RSS. In various embodiments, during the RSS, mmW-MD 470 may be operative to sweep transmissions of RSS signals 472 through a plurality of sectors. Hereinafter, the term "RSS sector" shall be employed to denote a sector comprised among one or more sectors through which transmissions are swept during an RSS. In some embodiments, the RSS may comprise a random access sector sweep, and may involve sweeping random access code transmissions through each of a plurality of RSS sectors. In various embodiments, the RSS signals 472 may comprise ISS sector feedback 473 that identifies—from among the various ISS sectors across which directional sync signals 414 were swept during a preceding ISS or supplemental ISS—a best ISS sector detected by mmW-MD 470. In some embodiments, this best ISS sector may comprise an ISS sector with respect to which mmW-MD 470 received the corresponding directional sync signals 414 with a highest associated degree of power, quality, and/or strength. The embodiments are not limited in this context.

In various embodiments, if communications component 406 successfully receives the RSS signals 472 corresponding to one or more RSS sectors, management component 408 may be operative to determine that the RSS has been successful. In some embodiments, management component 408 may be operative to identify a best RSS sector from among the one or more RSS sectors for which corresponding RSS signals 472 have been successfully received. In various embodiments, from among multiple RSS sectors for which corresponding RSS signals 472 have been successfully received, management component 408 may be operative to identify the best RSS sector as the RSS sector with respect to which the corresponding RSS signals 472 were received with a highest associated degree of power, quality, and/or strength. In some other embodiments, communications component 406 may only successfully receive RSS signals 472 for one RSS sector, and management component 408 may identify that one RSS sector as the best RSS sector. In yet other embodiments, communications component 406 may not successfully receive any RSS signals 472, and management component 408 may be operative to determine that the RSS has not been successful. The embodiments are not limited in this context.

In various embodiments, in response to a determination that the RSS has been successful, communications component 406 may be operative to send sector sweep feedback (SSW-FB) 462 to mmW-MD 470. In some embodiments, SSW-FB 462 may comprise RSS sector feedback 463 that specifies the best RSS sector as identified by management component 408. In various embodiments, in response to receipt of SSW-FB 462, mmW-MD 470 may be operative to send a sector sweep acknowledgment (SSW-ACK) 474. In some embodiments, SSW-ACK 474 may indicate that mmW-MD 470 has successfully received SSW-FB 462. In various embodiments, apparatus 400 and/or system 440 and mmW-MD 470 may exchange directional sync signals 414, RSS signals 472, SSW-FB 462, and SSW-ACK 474 in conjunction with an mmWave beamforming procedure for establishment of a beamformed wireless link 434 between apparatus 400 and/or system 440 and mmW-MD 470. In some embodiments, in response to receipt of SSW-ACK 474, management component 408 may be operative to determine that the mmWave beamforming procedure has been successful. In various such embodiments, in response to this determination, communications component 406 may be operative to send a beamforming outcome report 430 to inform mmW anchor 450 that the mmWave beamforming procedure has been successful. In some embodiments, if no SSW-ACK 474 is received from mmW-MD 470, management component 408 may be operative to determine that the mmWave beamforming procedure has failed. In various such embodiments, communications component 406 may be operative to send a beamforming outcome report 430 to inform mmW anchor 450 that the mmWave beamforming procedure has failed. The embodiments are not limited in this context.

In some embodiments, in response to sending a beamforming outcome report 430 to report a successful mmWave beamforming procedure, communications component 406 may be operative to receive a link allocation notification 436 from mmW anchor 450. In various embodiments, link allocation notification 436 may comprise information describing the manner in which apparatus 400 and/or system 440 and mmW-MD 470 are to communicate over the beamformed wireless link 434. In some embodiments, mmW anchor 450 may be operative to define a control plane/user plane split with respect to how data is to be communicated to/from mmW-MD 470 over beamformed wireless link 434 and a wireless connection 435 between mmW anchor 450 and mmW-MD 470. In various such embodiments, link allocation notification 436 may identify one or more types of data that may be exchanged between apparatus 400 and/or system 440 and mmW-MD 470 over beamformed wireless link 434 in accordance with the control plane/user plane split. In an example embodiment, link allocation notification 436 may indicate that apparatus 400 and/or system 440 may utilize beamformed wireless link 434 to exchange any type of user plane data with mmW-MD 470. In another example embodiment, link allocation notification 436 may indicate that certain types of user plane data, such as delay-sensitive user plane data, are not to be exchanged over beamformed wireless link 434. The embodiments are not limited to these examples.

In some embodiments, following establishment of beamformed wireless link 434, communications component 406 may be operative to communicate over beamformed wireless link 434 based on link allocation notification 436. In various embodiments, this communication may involve receiving data from mmW-MD 470 over beamformed wireless link 434, sending data to mmW-MD 470 over beamformed wireless link 434, or both. The embodiments are not limited in this context.

Figure 5:
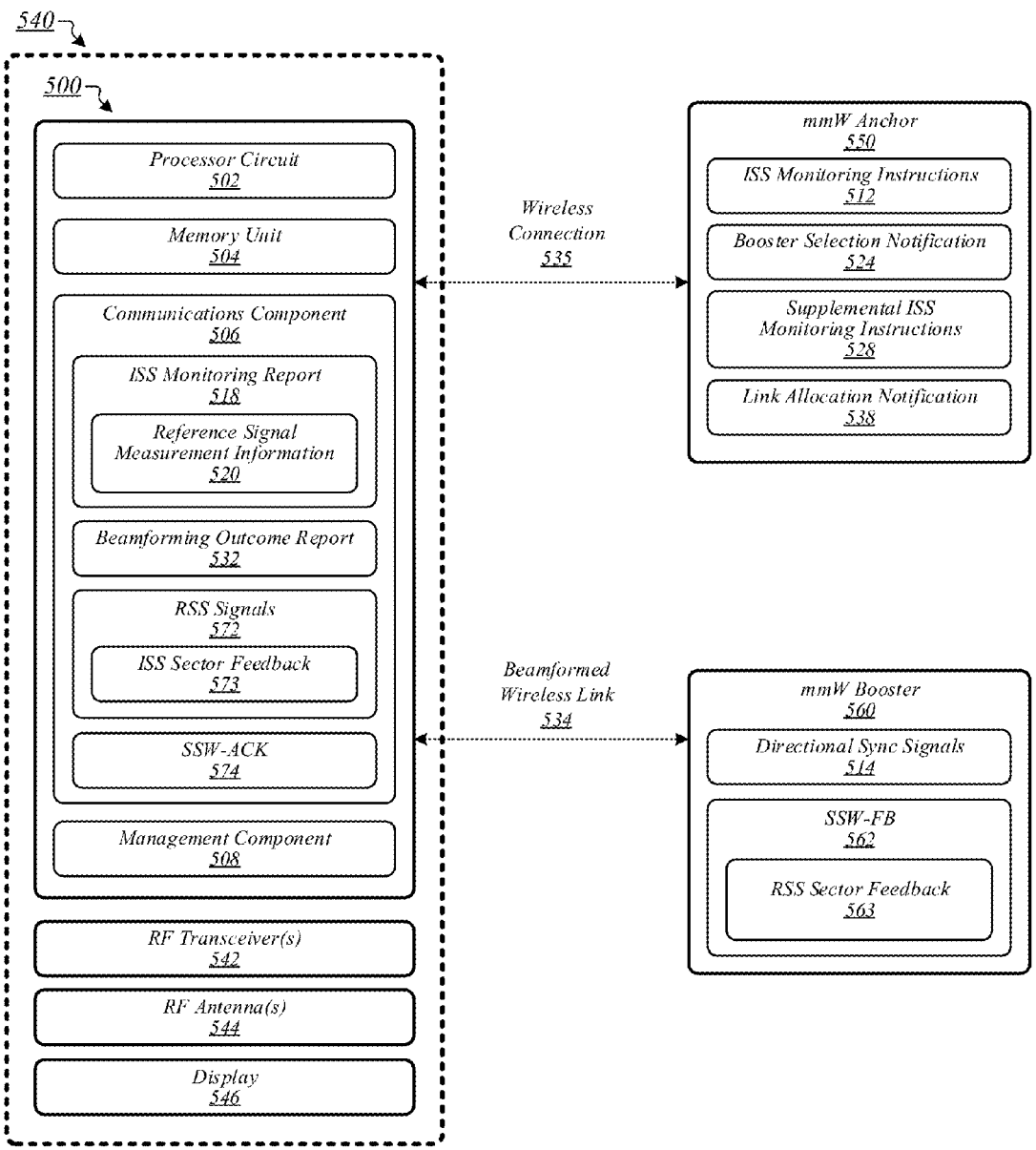
FIG. 5 illustrates an embodiment of a third apparatus and an embodiment of a third system.

FIG. 5 illustrates a block diagram of an apparatus 500 such as may be representative of an mmWave-capable mobile device that may implement techniques for efficient mmW small cell detection in some embodiments. For example, apparatus 500 may be representative of mmW-MD 170 of FIG. 1, mmW-MD 370 of FIG. 3, and/or mmW-MD 470 of FIG. 4. As shown in FIG. 5, apparatus 500 comprises multiple elements including a processor circuit 502, a memory unit 504, a communications component 506, and a management component 508. The embodiments, however, are not limited to the type, number, or arrangement of elements shown in this figure.

In various embodiments, apparatus 500 may comprise processor circuit 502. Processor circuit 502 may be implemented using any processor or logic device, examples of which may include—without limitation—any of the examples previously mentioned with respect to processor circuit 302 of FIG. 3 and/or processor circuit 402 of FIG. 4. The embodiments are not limited in this context.

In some embodiments, apparatus 500 may comprise or be arranged to communicatively couple with a memory unit 504. Memory unit 504 may be implemented using any machine-readable or computer-readable media capable of storing data, including both volatile and non-volatile memory. Examples of memory unit 504 may include—without limitation—any of the examples previously mentioned with respect to memory unit 304 of FIG. 3 and/or memory unit 404 of FIG. 4. It is worthy of note that some portion or all of memory unit 504 may be included on the same integrated circuit as processor circuit 502, or alternatively some portion or all of memory unit 504 may be disposed on an integrated circuit or other medium, for example a hard disk drive, that is external to the integrated circuit of processor circuit 502. Although memory unit 504 is comprised within apparatus 500 in FIG. 5, memory unit 504 may be external to apparatus 500 in various embodiments. The embodiments are not limited in this context.

In some embodiments, apparatus 500 may comprise a communications component 506. Communications component 506 may comprise logic, circuitry, and/or instructions operative to send messages to one or more remote devices and/or to receive messages from one or more remote devices. In various embodiments, communications component 506 may be operative to send and/or receive messages over one or more wired connections, one or more wireless connections, or a combination of both. In some embodiments, communications component 506 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, apparatus 500 may comprise a management component 508. Management component 508 may comprise logic, circuitry, and/or instructions operative to manage various operations performed by apparatus 500. In some embodiments, management component 508 may be operative to control operations that apparatus 500 performs in conjunction with communicating with one or more external devices and/or networks. In various embodiments, management component 508 may be operative to control operations performed by apparatus 500 in conjunction with mmW small cell detection. The embodiments are not limited in this context.

FIG. 5 also illustrates a block diagram of a system 540. System 540 may comprise any of the aforementioned elements of apparatus 500. System 540 may further comprise one or more RF transceivers 542. Any given RF transceiver 542 may comprise one or more radios capable of transmitting and receiving signals using various suitable wireless communications techniques. Such techniques may involve communications across one or more wireless networks. Exemplary wireless networks may include—without limitation—any of the examples previously mentioned with respect to RF transceiver(s) 342 of FIG. 3 and/or RF transceiver(s) 442 of FIG. 4. In communicating across such networks, RF transceiver(s) 542 may operate in accordance with one or more applicable standards in any version. The embodiments are not limited in this context.

In some embodiments, system 540 may comprise one or more RF antennas 544. Examples of any particular RF antenna 544 may include—without limitation—any of the examples previously mentioned with respect to RF antenna(s) 344 of FIG. 3 and/or RF antenna(s) 444 of FIG. 4. In various embodiments, one or more RF transceivers 542 may be operative to send and/or receive messages and/or data using one or more RF antennas 544. The embodiments are not limited in this context.

In some embodiments, system 540 may comprise a display 546. Display 546 may comprise any display device capable of displaying information received from processor circuit 502. In various embodiments, display 546 may comprise a touch-sensitive display screen ("touchscreen"). In some embodiments, display 546 may comprise a monitor, a computer screen, a television, a projector, or another type of display device. In various embodiments, display 546 may be implemented by a liquid crystal display (LCD), light emitting diode (LED) or other type of suitable visual interface. In some embodiments, display 546 may comprise an LCD that includes one or more thin-film transistors (TFTs). The embodiments are not limited in this context.

In various embodiments, during general operation, apparatus 500 and/or system 540 may obtain wireless coverage from an mmW anchor 550 while it is located within an mmW macro cell served by that mmW anchor 550. In some embodiments, mmW anchor 550 may be the same as—or similar to—mmW anchor 150 of FIG. 1, mmW anchor 250 of FIG. 2, apparatus 300 and/or system 340 of FIG. 3, and/or mmW anchor 450 of FIG. 4. In various embodiments, while being served by mmW anchor 550, apparatus 500 and/or system 540 may move within the mmW macro cell. In some embodiments, as a result of such motion, apparatus 500 and/or system 540 may enter or approach an mmW small cell upon which the mmW macro cell is overlaid. In various embodiments, the mmW small cell may be served by an mmW booster 560. In some embodiments, mmW booster 560 may be the same as—or similar to—mmW booster 160 of FIG. 1, mmW booster 360 of FIG. 3, and/or apparatus 400 and/or system 440 of FIG. 4. The embodiments are not limited in this context.

In various embodiments, mmW anchor 550 may be operative to monitor the geographic location of apparatus 500 and/or system 540. In some embodiments, in response to a determination that apparatus 500 and/or system 540 has entered or approached the mmW small cell served by mmW booster 560, mmW anchor 550 may be operative to initiate an mmW small cell discovery and connection establishment procedure to enable apparatus 500 and/or system 540 to discover and establish a connection with mmW booster 560. It is worthy of note that in various other embodiments, mmW anchor 550 may be operative to initiate the mmW small cell discovery and connection establishment procedure based on additional/alternate criteria. For example, in some embodiments, mmW anchor 550 may be operative to initiate the mmW small cell discovery and connection establishment procedure based on a determination that apparatus 500 and/or system 540 that apparatus 500 and/or system 540 has entered the vicinity of a plurality of mmW small cells that includes the mmW small cell served by mmW booster 560. In various such embodiments, mmW anchor 550 may initiate the mmW small cell discovery and connection establishment procedure to enable apparatus 500 and/or system 540 to obtain service from one of the plurality of mmW small cells by discovering and establishing a connection with one of the corresponding plurality of mmW boosters. The embodiments are not limited in this context.

In some embodiments, in conjunction with the mmW small cell discovery and connection establishment procedure, communications component 506 may be operative to receive ISS monitoring instructions 512 from mmW anchor 550. In various embodiments, ISS monitoring instructions 512 may instruct apparatus 500 and/or system 540 to scan for directional sync signals. In some embodiments, ISS monitoring instructions 512 may instruct apparatus 500 and/or system 540 to scan for respective directional sync signals to be transmitted by a plurality of mmW boosters that includes mmW booster 560. In various other embodiments, ISS monitoring instructions 512 may instruct apparatus 500 and/or system 540 to scan for directional sync signals to be transmitted solely by mmW booster 560. In some embodiments, ISS monitoring instructions 512 may instruct apparatus 500 and/or system 540 to scan for directional sync signals comprising PSSs and/or SSSs. The embodiments are not limited in this context.

In various embodiments, ISS monitoring instructions 512 may specify one or more mmWave frequency channels on which apparatus 500 and/or system 540 is to scan for directional sync signals. In some embodiments, ISS monitoring instructions 512 may specify one or more time intervals during which apparatus 500 and/or system 540 is to scan for directional sync signals. In various embodiments, each such time interval may correspond to a time interval during which a respective mmW booster will transmit directional sync signals pursuant to instructions received from mmW anchor 550. In some embodiments, for each such time interval, ISS monitoring instructions 512 may specify one or more respective mmWave frequency channels on which apparatus 500 and/or system 540 is to scan for directional sync signals during that time interval. The embodiments are not limited in this context.

In various embodiments, in response to receipt of ISS monitoring instructions 512, communications component 506 may be operative to perform an ISS monitoring procedure. In some embodiments, according to the ISS monitoring procedure, communications component 506 may be operative to scan for directional sync signals according to the parameters specified in ISS monitoring instructions 512. In various embodiments, communications component 506 may be operative to detect multiple mmW boosters based on respective directional sync signals that it successfully receives from those multiple mmW boosters. For example, in some embodiments, communications component 506 may be operative to detect mmW booster 560 based on directional sync signals 514 received from mmW booster 560, and may be operative to detect one or more other mmW boosters based on directional sync signals received from those one or more other mmW boosters. In various other embodiments, communications component 506 may be operative to detect a single mmW booster. For example, in some embodiments, communications component 506 may be operative to detect mmW booster 560 based on directional sync signals 514 received from mmW booster 560, but may not successfully receive directional sync signals from any other mmW booster. In yet other embodiments, communications component 506 may not successfully receive any directional sync signals, and thus may not detect any mmW booster. The embodiments are not limited in this context.

In various embodiments, communications component 506 may be operative to send an ISS monitoring report 518 to mmW anchor 550 to report the results of the ISS monitoring procedure. In some embodiments, ISS monitoring report 518 may comprise information indicating whether communications component 506 detected any mmW boosters during the ISS monitoring procedure. In various embodiments, communications component 506 may not successfully receive any directional sync signals during the ISS monitoring procedure, and ISS monitoring report 518 may indicate that no mmW boosters have been detected. In some other embodiments, communications component 506 may successfully receive directional sync signals from one or more mmW boosters during the ISS monitoring procedure, and ISS monitoring report 518 may identify those one or more mmW boosters. In various such embodiments, ISS monitoring report 518 may comprise an mmW booster ID for each mmW booster detected during the ISS monitoring procedure. The embodiments are not limited in this context.

In some embodiments, ISS monitoring report 518 may identify multiple detected mmW boosters, and may comprise reference signal measurement information 520 for consideration by mmW anchor 550 in selecting from among those multiple detected mmW boosters. In various embodiments, for each detected mmW booster, reference signal measurement information 520 may comprise a corresponding set of one or more reference signal measurements. For example, in some embodiments, for each detected mmW booster, reference signal measurement information 520 may a corresponding set of one or more reference signal measurements that includes one or more of an RSRP, an RSRQ, and an RSSI. It is worthy of note that in various embodiments, rather than being comprised in ISS monitoring report 518, reference signal measurement information 520 may be sent separately from ISS monitoring report 518. It is also worthy of note that in some embodiments, reference signal measurement information 520 may be sent even if only one mmW booster has been detected. The embodiments are not limited in this context.

In various embodiments, communications component 506 may detect one or more mmW boosters during the ISS monitoring procedure, and those one or more mmW boosters may include mmW booster 560. In some embodiments, management component 508 may be operative to identify a provisional serving mmW booster from among the one or more detected mmW boosters. In various embodiments, the provisional serving mmW booster may comprise an mmW booster by which apparatus 500 and/or system 540 is to be served, contingent upon successful completion of an mmWave beamforming procedure between apparatus 500 and/or system 540 and the provisional serving mmW booster. In some embodiments, communications component 506 may send an ISS monitoring report 518 to mmW anchor 550 that identifies one or more detected mmW boosters. In various embodiments, in response to the ISS monitoring report 518, communications component 506 may be operative to receive a booster selection notification 524 from mmW anchor 550 that identifies—from among those one or more detected mmW boosters—an mmW booster by which apparatus 500 and/or system 540 is to be served. In some embodiments, mmW anchor 550 may only send booster selection notification 524 if multiple detected mmW boosters were identified in ISS monitoring report 518. In various other embodiments, mmW anchor 550 may send booster selection notification 524 even if only a single detected mmW booster was identified in ISS monitoring report 518. In some embodiments, management component 508 may be operative to identify its provisional serving mmW booster as an mmW booster specified by booster selection notification 524. In various other embodiments, management component 508 may be operative to identify its provisional serving mmW booster as a sole mmW booster detected during the ISS monitoring procedure. In the interest of clarity, the remainder of the discussion of FIG. 5 shall assume that management component 508 identifies mmW booster 560 as its provisional serving mmW booster. However, it is to be understood that the embodiments are not limited in this context.

In some embodiments, following identification of mmW booster 560 as provisional serving mmW booster, communications component 506 may be operative to perform an RSS in conjunction with an mmWave beamforming procedure for establishment of a beamformed wireless link 534 between apparatus 500 and/or system 540 and mmW booster 560. In various embodiments, communications component 506 may be operative to receive supplemental ISS monitoring instructions 528 from mmW anchor 550, and may perform a supplemental ISS monitoring procedure prior to initiating the RSS. In some other embodiments, communications component 506 may not receive supplemental ISS monitoring instructions 528, and may directly proceed with initiation of the RSS following identification of mmW booster 560 as provisional serving mmW booster. The embodiments are not limited in this context.

In various embodiments, during the RSS, communications component 506 may be operative to send RSS signals 572 for detection/reception by mmW booster 560. In some embodiments, communications component 506 may be operative on RF transceiver(s) 542 and/or RF antenna(s) 544 to sweep transmissions of RSS signals 572 through a plurality of RSS sectors. In various embodiments, the RSS may comprise a random access sector sweep, and may involve sweeping random access code transmissions through each of a plurality of RSS sectors. In some embodiments, the RSS signals 572 may comprise ISS sector feedback 573 that identifies—from among various ISS sectors through which mmW booster 560 swept transmission of directional sync signals 514 during a preceding ISS or supplemental ISS—a best ISS sector. In various embodiments, the best ISS sector may comprise an ISS sector with respect to which the corresponding directional sync signals 514 were received with a highest associated degree of power, quality, and/or strength. In some embodiments, mmW booster 560 may be operative to monitor one or more mmWave frequency channels for RSS signals 572 during the RSS. The embodiments are not limited in this context.

In various embodiments, following the RSS, communications component 506 may be operative to SSW-FB 562 from mmW booster 560. In some embodiments, SSW-FB 562 may indicate that mmW booster 560 has successfully received at least some of the RSS signals 572 transmitted during the RSS. In various embodiments, SSW-FB 562 may comprise RSS sector feedback 563 that specifies a best RSS sector as determined by mmW booster 560. In some embodiments, the best RSS sector may comprise an RSS sector with respect to which mmW booster 560 received the corresponding RSS signals 572 with a highest associated degree of power, quality, and/or strength during the RSS. In various embodiments, based on receipt of SSW-FB 562, management component 508 may be operative to determine that the mmWave beamforming procedure for establishment of beamformed wireless link 534 has been successful from the perspective of apparatus 500 and/or system 540. In some other embodiments, no SSW-FB 562 may be received from mmW booster 560, and management component 508 may be operative to determine that the mmWave beamforming procedure has failed. In various such embodiments, communications component 506 may be operative to send a beamforming outcome report 532 to inform mmW anchor 550 that the mmWave beamforming procedure has failed. The embodiments are not limited in this context.

In some embodiments, communications component 506 may successfully receive SSW-FB 562 from mmW booster 560, and may send an SSW-ACK 574 in response. In various embodiments, SSW-ACK 574 may indicate that apparatus 500 and/or system 540 has successfully received SSW-FB 562 from mmW booster 560. In some embodiments, in response to successful receipt of SSW-FB 562, communications component 506 may also be operative to send a beamforming outcome report 532 to inform mmW anchor 550 that the mmWave beamforming procedure has been successful from the perspective of apparatus 500 and/or system 540. In various embodiments, in response to successful receipt of SSW-ACK 574, mmW booster 560 may be operative to communicate with mmW anchor 550 in order to inform mmW anchor 550 that the mmWave beamforming procedure has also been successful from the perspective of mmW booster 560. In some other embodiments, mmW booster 560 may not successfully receive SSW-ACK 574, and may be operative to communicate with mmW anchor 550 to inform mmW anchor 550 that the mmWave beamforming procedure has failed. The embodiments are not limited in this context.

In various embodiments, both apparatus 500 and/or system 540 and mmW booster 560 may indicate to mmW anchor 550 that the mmWave beamforming procedure has been successful, and communications component 506 may then receive a link allocation notification 538 from mmW anchor 550. In some embodiments, link allocation notification 538 may comprise information describing the manner in which apparatus 500 and/or system 540 and mmW booster 560 are to communicate over the beamformed wireless link 534. In various embodiments, mmW anchor 550 may be operative to define a control plane/user plane split with respect to how data is to be communicated to/from apparatus 500 and/or system 540 over beamformed wireless link 534 and a wireless connection 535 between mmW anchor 550 and apparatus 500 and/or system 540. In some such embodiments, link allocation notification 538 may identify one or more types of data that may be exchanged between apparatus 500 and/or system 540 and mmW booster 560 over beamformed wireless link 534 in accordance with the control plane/user plane split. In an example embodiment, link allocation notification 538 may indicate that apparatus 500 and/or system 540 may utilize beamformed wireless link 534 to exchange any type of user plane data with mmW booster 560. In another example embodiment, link allocation notification 538 may indicate that certain types of user plane data, such as delay-sensitive user plane data, are not to be exchanged over beamformed wireless link 534. The embodiments are not limited to these examples.

In various embodiments, following establishment of beamformed wireless link 534, communications component 506 may be operative to communicate over beamformed wireless link 534 based on link allocation notification 538. In some embodiments, this communication may involve receiving data from mmW booster 560 over beamformed wireless link 534, sending data to mmW booster 560 over beamformed wireless link 534, or both. The embodiments are not limited in this context.

Operations for the above embodiments may be further described with reference to the following figures and accompanying examples. Some of the figures may include a logic flow. Although such figures presented herein may include a particular logic flow, it can be appreciated that the logic flow merely provides an example of how the general functionality as described herein can be implemented. Further, the given logic flow does not necessarily have to be executed in the order presented unless otherwise indicated. In addition, the given logic flow may be implemented by a hardware element, a software element executed by a processor, or any combination thereof. The embodiments are not limited in this context.

Figure 6:
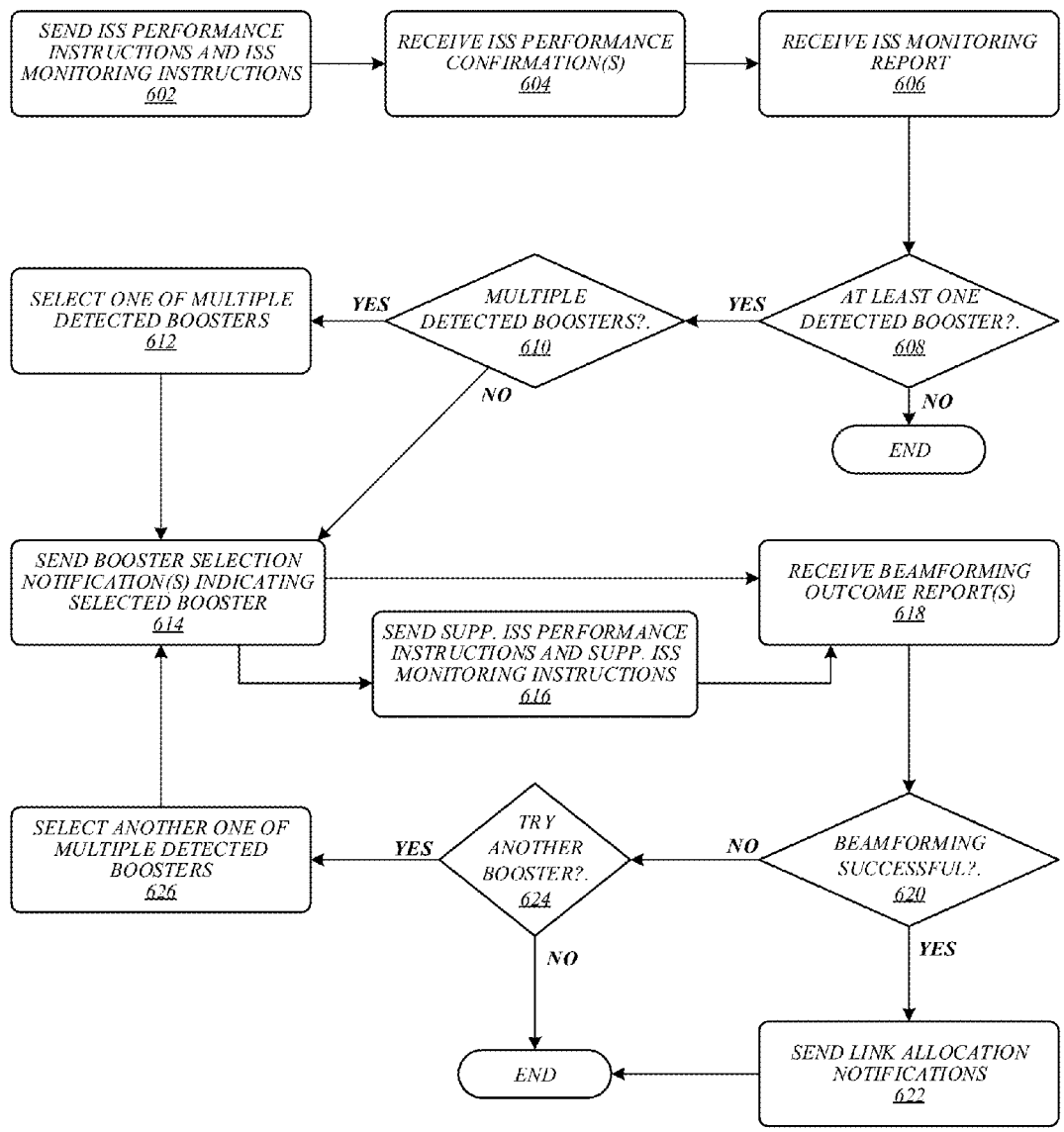
FIG. 6 illustrates an embodiment of a first logic flow.

FIG. 6 illustrates one embodiment of a logic flow 600, which may be representative of operations that may be executed by an mmW anchor in various embodiments to support the establishment of a wireless connection between a capacity-deployed mmW booster and an mmWave-capable mobile device. For example, logic flow 600 may be representative of operations that apparatus 300 and/or system 340 of FIG. 3 may perform in some embodiments to support the establishment of beamformed wireless link 334 between mmW booster 360 and mmW-MD 370. As shown in logic flow 600, ISS performance instructions and ISS monitoring instructions may be sent at 602. For example, communications component 306 of FIG. 3 may be operative to send ISS performance instructions 310 to one or more mmW boosters including mmW booster 360, and may be operative to send ISS monitoring instructions 312 to mmW-MD 370. At 604, one or more ISS performance confirmations may be received. For example, communications component 306 of FIG. 3 may be operative to receive ISS performance confirmation(s) 316 from one or more mmW boosters including mmW booster 360. At 606, an ISS monitoring report may be received from the mmWave-capable mobile device. For example, communications component 306 of FIG. 3 may be operative to receive ISS monitoring report 318 from mmW-MD 370.

At 608, it may be determined whether the mmWave-capable mobile device has detected at least one mmW booster. For example, based on ISS monitoring report 318, management component 308 of FIG. 3 may be operative to determine whether mmW-MD 370 has detected at least one mmW booster. If it is determined at 608 that the mmWave-capable mobile device has not detected any mmW booster, the logic flow may end. If it is determined at 608 that the mmWave-capable mobile device has detected at least one mmW booster, flow may pass to 610. At 610, it may be determined whether the mmWave-capable mobile device has detected multiple mmW boosters. For example, based on ISS monitoring report 318, management component 308 of FIG. 3 may be operative to determine whether mmW-MD 370 has detected multiple mmW boosters. If it is determined at 610 that the mmWave-capable mobile device has detected multiple mmW boosters, flow may pass to 612. At 612, one of the multiple detected mmW boosters may be selected to serve the mmWave-capable mobile device. For example, based on reference signal measurement information 320 in ISS monitoring report 318 of FIG. 3, management component 308 may be operative to select mmW booster 360 to serve mmW-MD 370. From 612, flow may pass to 614. If it is determined at 610 that the mmWave-capable mobile device has only detected one mmW booster, flow may pass directly from 610 to 614.

At 614, one or more booster selection notifications may be sent that indicate the selected mmW booster. For example, communications component 306 of FIG. 3 may be operative to send booster selection notification 324 to mmW-MD 370 and/or may be operative to send booster selection notification 322 to mmW booster 360. At 616, supplemental ISS performance instructions and supplemental ISS monitoring instructions may be sent. For example, communications component 306 of FIG. 3 may be operative to send supplemental ISS performance instructions 326 to mmW booster 360, and may be operative to send supplemental ISS monitoring instructions 328 to mmW-MD 370. From 616, flow may pass to 618. In various embodiments, no supplemental ISS performance instructions or supplemental ISS monitoring instructions may be sent, and thus flow may pass directly from 614 to 618.

At 618, one or more beamforming outcome reports may be received. For example, communications component 306 of FIG. 3 may be operative to receive a beamforming outcome report 332 from mmW-MD 370 and/or may be operative to receive a beamforming outcome report 330 from mmW booster 360. At 620, it may be determined whether an mmWave beamforming procedure for establishing a beamformed wireless link between the mmW booster and the mmWave-capable device has been successful. For example, based on beamforming outcome report 332 and/or beamforming outcome report 330, management component 308 of FIG. 3 may be operative to determine whether an mmWave beamforming procedure for establishing beamformed wireless link 334 has been successful. If it is determined at 620 that the mmWave beamforming procedure has been successful, flow may pass to 622. At 622, link allocation notifications may be sent to the mmW booster and the mmW-capable mobile device. For example, communications component 306 of FIG. 3 may be operative to send link allocation notification 336 to mmW booster 360, and may be operative to send link allocation notification 338 to mmW-MD 370. Following 622, the logic flow may end.

If it is determined at 620 that the mmWave beamforming procedure has not been successful, flow may pass to 624. At 624, it may be determined whether the mmW-capable mobile device should attempt the mmWave beamforming procedure with another mmW booster. If the mmW-capable mobile device has detected multiple mmW boosters and has not yet attempted the mmWave beamforming procedure with one or more of those mmW boosters, it may be determined at 624 that the mmW-capable mobile device should attempt the mmWave beamforming procedure with another mmW booster, and flow may pass to 626. At 626, another one of the multiple detected mmW boosters may be selected, and flow may then return to 614. At 624, if the mmW-capable mobile device has only detected one mmW booster or has already attempted the mmWave beamforming procedure with each mmW booster that it has detected, it may be determined that the mmW-capable mobile device should not attempt the mmWave beamforming procedure with any other mmW booster, and the logic flow may end. The embodiments are not limited in this context.

Figure 7:
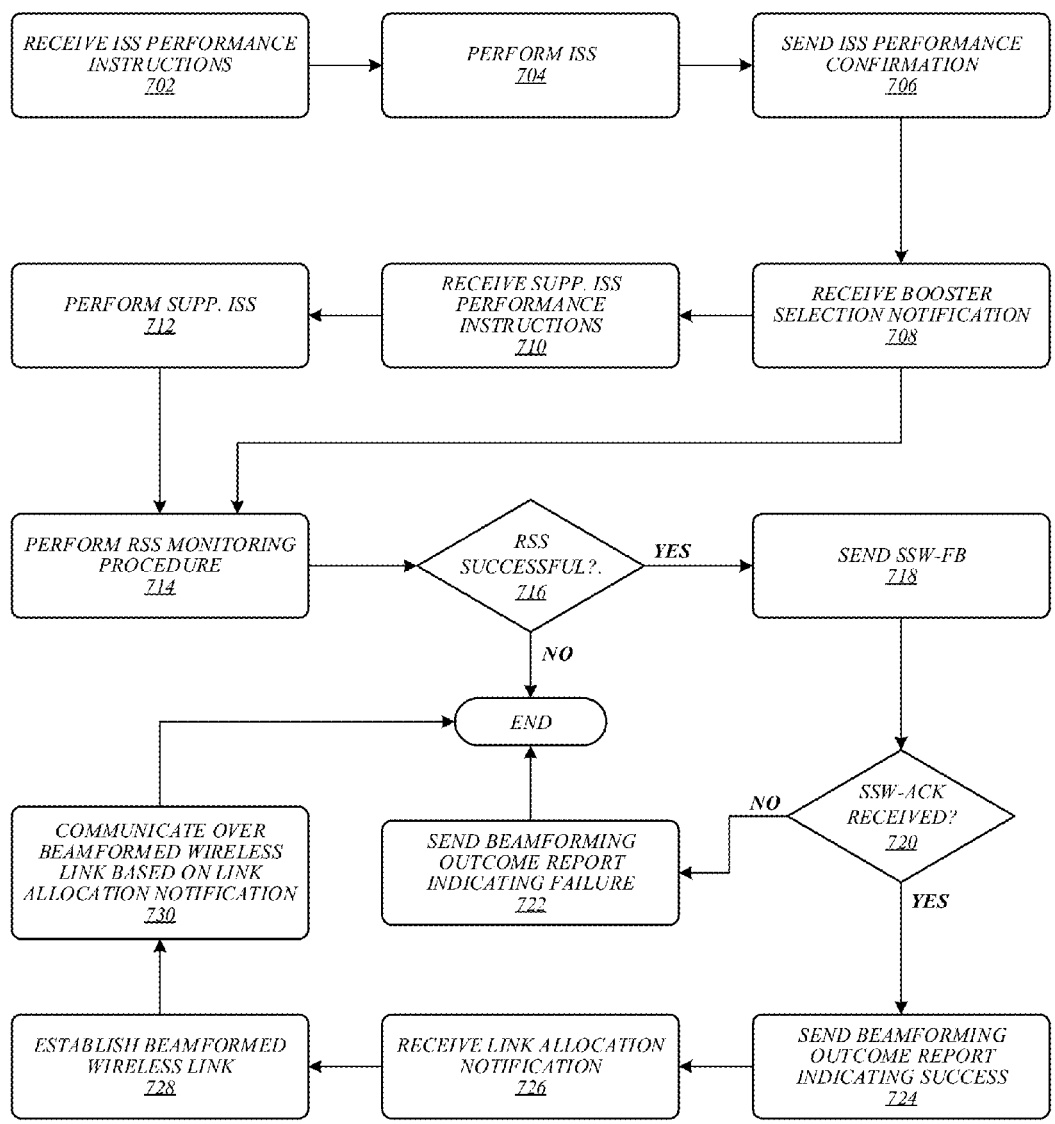
FIG. 7 illustrates an embodiment of a second logic flow.

FIG. 7 illustrates one embodiment of a logic flow 700, which may be representative of operations that may be executed by a capacity-deployed mmW booster in some embodiments in conjunction with the establishment of a wireless connection with an mmWave-capable mobile device. For example, logic flow 700 may be representative of operations that apparatus 400 and/or system 440 of FIG. 4 may perform in various embodiments in conjunction with the establishment of beamformed wireless link 434 with mmW-MD 470. As shown in logic flow 700, ISS performance instructions may be received at 702. For example, communications component 406 of FIG. 4 may be operative to receive ISS performance instructions 410 from mmW anchor 450. At 704, an ISS may be performed. For example, communications component 406 of FIG. 4 may be operative to perform an ISS according to which it sweeps transmissions of directional sync signals 414 across one or more ISS sectors. At 706, an ISS performance confirmation may be sent to confirm performance of the ISS. For example, communications component 406 of FIG. 4 may be operative to send ISS performance confirmation 416 to mmW anchor 450.

At 708, a booster selection notification may be received that indicates that the mmW booster is to perform an mmWave beamforming procedure with the mmWave-capable mobile device. For example, communications component 406 of FIG. 4 may be operative to receive booster selection notification 422 from mmW anchor 450. At 710, supplemental ISS performance instructions may be received. For example, communications component 406 of FIG. 4 may be operative to receive supplemental ISS performance instructions 426 from mmW anchor 450. At 712, a supplemental ISS may be performed. For example, communications component 406 of FIG. 4 may be operative to perform a supplemental ISS according to which it sweeps transmissions of directional sync signals 414 across one or more ISS sectors. From 712, flow may pass to 714. In some embodiments, no supplemental ISS performance instructions may be received, and thus flow may pass directly from 708 to 714.

At 714, an RSS monitoring procedure may be performed, which may involve monitoring one or more mmWave frequency channels for RSS signals transmitted by the mmWave-capable mobile device. For example, communications component 406 of FIG. 4 may be operative to perform an RSS monitoring procedure according to which it monitors one or more mmWave frequency channels for RSS signals 472 transmitted by mmW-MD 470. At 716, it may be determined whether the RSS has been successful, based on whether any RSS signals have been successfully received. For example, management component 408 of FIG. 4 may be operative to determine whether an RSS performed by mmW-MD 470 has been successful based on whether communications component 406 has successfully received any of the RSS signals 472 transmitted by mmW-MD 470. If it is determined at 716 that the RSS has not been successful, the logic flow may end. If it is determined at 716 that the RSS has been successful, flow may pass to 718.

At 718, SSW-FB may be sent to the mmWave-capable mobile device to provide feedback regarding the RSS. For example, communications component 406 of FIG. 4 may be operative to send SSW-FB 462 to mmW-MD 470. At 720, it may be determined whether an SSW-ACK has been received in response to the SSW-FB. For example, management component 408 of FIG. 4 may be operative to determine whether SSW-ACK 474 has been received in response to SSW-FB 462. If it is determined at 720 that no SSW-ACK has been received, flow may pass to 722. At 722, a beamforming outcome report may be sent that indicates failure of the mmWave beamforming procedure. For example, communications component 406 of FIG. 4 may be operative to send a beamforming outcome report 430 that indicates failure of the mmWave beamforming procedure with mmW-MD 470. Following 722, the logic flow may end. If it is determined at 720 that an SSW-ACK has been received, flow may pass to 724.

At 724, a beamforming outcome report may be sent that indicates that the mmWave beamforming procedure has been successful. For example, communications component 406 of FIG. 4 may be operative to send a beamforming outcome report 430 that indicates that the mmWave beamforming procedure with mmW-MD 470 has been successful. At 726, a link allocation notification may be received. For example, communications component 406 of FIG. 4 may be operative to receive link allocation notification 436 from mmW anchor 450. At 728, a beamformed wireless link may be established with the mmWave-capable mobile device. For example, beamformed wireless link 434 of FIG. 4 may be established between apparatus 400 and/or system 440 and mmW-MD 470. At 730, communication over the beamformed wireless link may be performed based on the link allocation notification. For example, communications component 406 of FIG. 4 may be operative to exchange communications with mmW-MD 470 based on the received link allocation notification 436. The embodiments are not limited to these examples.

Figure 8:
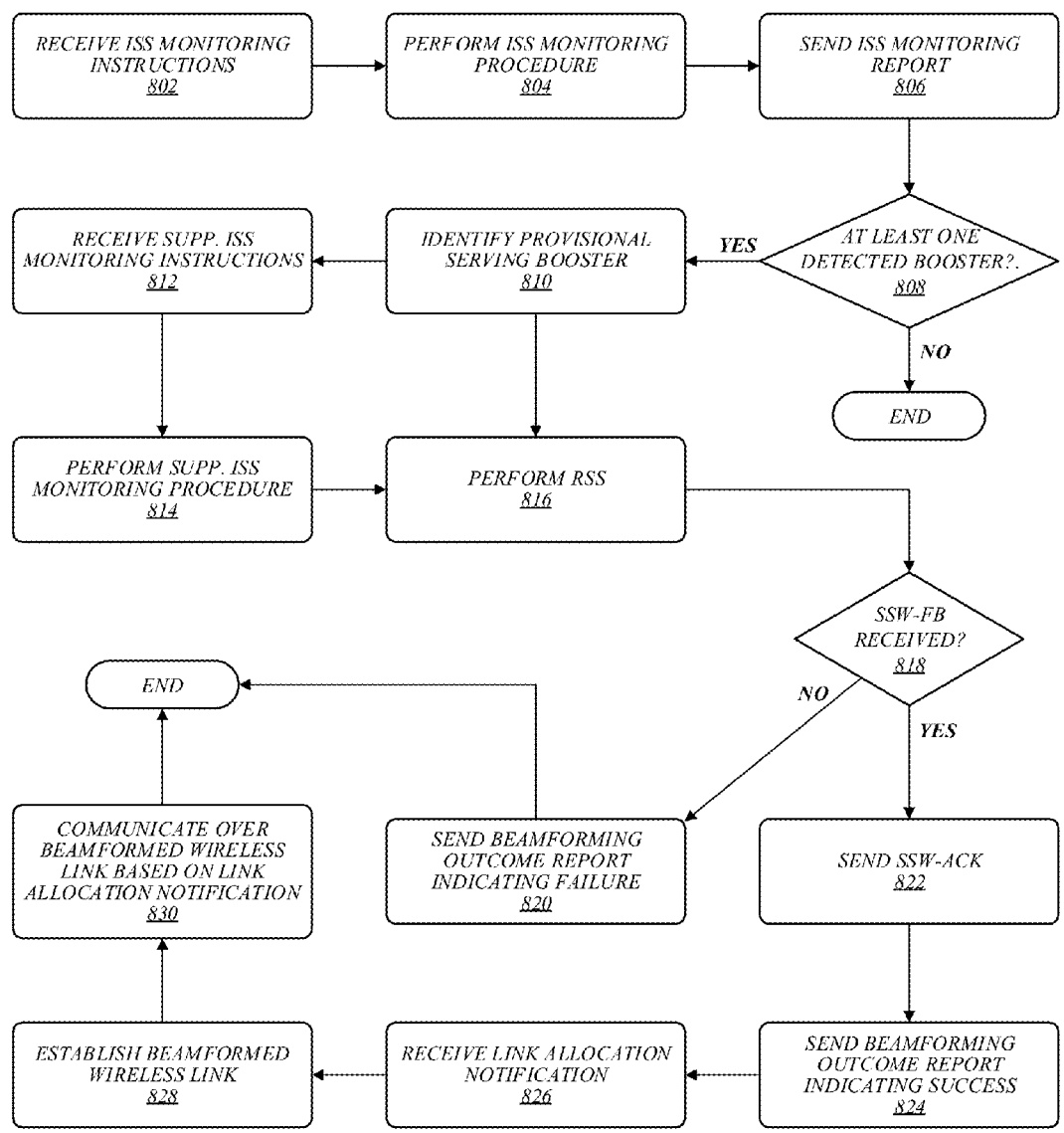
FIG. 8 illustrates an embodiment of a third logic flow.

FIG. 8 illustrates one embodiment of a logic flow 800, which may be representative of operations that may be executed by an mmWave-capable mobile device in various embodiments in conjunction with the establishment of a wireless connection with a capacity-deployed mmW booster. For example, logic flow 800 may be representative of operations that apparatus 500 and/or system 540 of FIG. 5 may perform in some embodiments in conjunction with the establishment of beamformed wireless link 534 with mmW booster 560. As shown in logic flow 800, ISS monitoring instructions may be received at 802. For example, communications component 506 of FIG. 5 may be operative to receive ISS monitoring instructions 512 from mmW anchor 550. At 804, an ISS monitoring procedure may be performed based on the ISS monitoring instructions. For example, communications component 506 of FIG. 5 may be operative to perform an ISS monitoring procedure based on ISS monitoring instructions 512. At 806, an ISS monitoring report may be sent to report the results of the ISS monitoring procedure. For example, communications component 506 of FIG. 5 may be operative to send ISS monitoring report 518 to mmW anchor 550. At 808, a determination may be made of whether the logic flow is to proceed. If no mmW booster was detected during the ISS monitoring procedure, the logic flow may end. If at least one mmW booster has been detected, flow may pass to 810.

At 810, a provisional serving mmW booster may be identified. In various embodiments, the provisional serving mmW booster may be identified based on a received booster selection notification. For example, management component 508 of FIG. 5 may be operative to identify mmW booster 560 as the provisional serving mmW booster based on a booster selection notification 524 received from mmW anchor 550. In some other embodiments, the provisional mmW booster may be identified as a sole mmW booster detected during the ISS monitoring procedure. For example, communications component 506 of FIG. 5 may only detect mmW booster 560 during the ISS monitoring procedure, and management component 508 of FIG. 5 may be operative to identify mmW booster 560 as the provisional serving mmW booster on that basis. At 812, supplemental ISS monitoring instructions may be received. For example, communications component 506 of FIG. 5 may be operative to receive supplemental ISS monitoring instructions 528 from mmW anchor 550. At 814, a supplemental ISS monitoring procedure may be performed. For example, communications component 506 of FIG. 5 may be operative to perform a supplemental ISS monitoring procedure according to which it monitors one or more mmWave frequency channels for directional sync signals 514 transmitted by mmW booster 560. From 814, flow may pass to 816. In various embodiments, no supplemental ISS monitoring instructions may be received, and thus flow may pass directly from 810 to 816.

At 816, an RSS may be performed. For example, communications component 506 of FIG. 5 may be operative to perform an RSS according to which it sweeps transmissions of RSS signals 572 through a plurality of RSS sectors. At 818, it may be determined whether SSW-FB has been received in response to performance of the RSS. For example, management component 508 of FIG. 5 may be operative to determine whether SSW-FB 562 has been received from mmW booster 560. If it is determined that no SSW-FB has been received, flow may pass to 820. At 820, a beamforming outcome report may be sent that indicates failure of the mmWave beamforming procedure. For example, communications component 506 of FIG. 5 may be operative to send a beamforming outcome report 532 that indicates failure of the mmWave beamforming procedure with mmW booster 560. Following 820, the logic flow may end. If it is determined at 818 that SSW-FB has been received, flow may pass to 822.

At 822, an SSW-ACK may be sent in response to the SSW-FB. For example, communications component 506 of FIG. 5 may be operative to send SSW-ACL 574 to mmW booster 560 in response to SSW-FB 562. At 824, a beamforming outcome report may be sent that indicates that the mmWave beamforming procedure has been successful. For example, communications component 506 of FIG. 5 may be operative to send a beamforming outcome report 532 that indicates that the mmWave beamforming procedure with mmW booster 560 has been successful. At 826, a link allocation notification may be received. For example, communications component 506 of FIG. 5 may be operative to receive link allocation notification 538 from mmW anchor 550. At 828, a beamformed wireless link may be established with the mmW booster. For example, beamformed wireless link 534 of FIG. 5 may be established between apparatus 500 and/or system 540 and mmW booster 560. At 830, communication over the beamformed wireless link may be performed based on the link allocation notification. For example, communications component 506 of FIG. 5 may be operative to exchange communications with mmW booster 560 based on the received link allocation notification 538. The embodiments are not limited to these examples.

Figure 9:
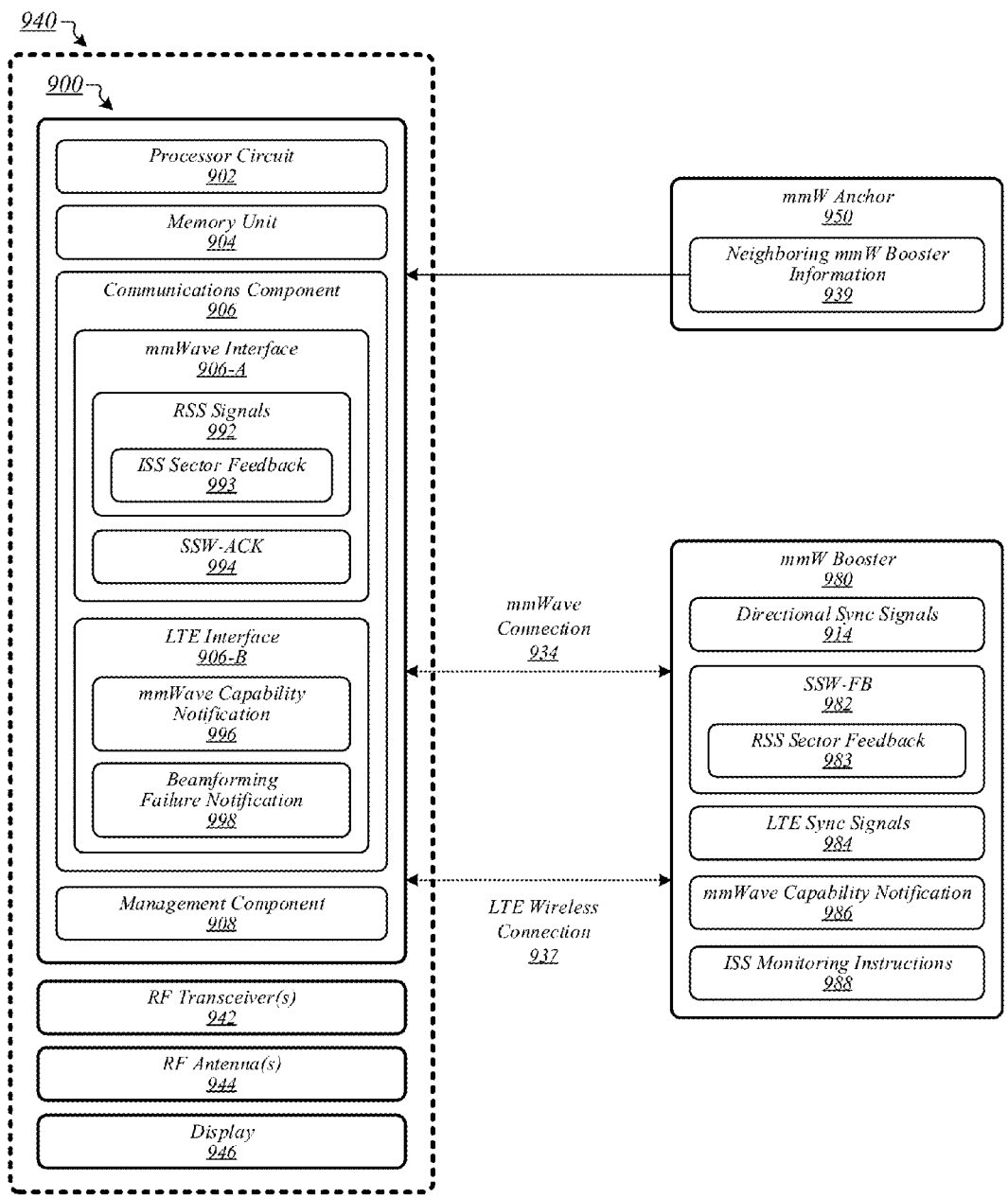
FIG. 9 illustrates an embodiment of a fourth apparatus and an embodiment of a fourth system.

FIG. 9 illustrates a block diagram of an apparatus 900 such as may be representative of an mmWave-capable mobile device that may implement techniques to support efficient mmW small cell detection in some embodiments. For example, apparatus 900 may be representative of mmW-MD 290 of FIG. 2. As shown in FIG. 9, apparatus 900 comprises multiple elements including a processor circuit 902, a memory unit 904, a communications component 906, and a management component 908. The embodiments, however, are not limited to the type, number, or arrangement of elements shown in this figure.

In various embodiments, apparatus 900 may comprise processor circuit 902. Processor circuit 902 may be implemented using any processor or logic device, examples of which may include—without limitation—any of the examples previously mentioned with respect to processor circuit 302 of FIG. 3, processor circuit 402 of FIG. 4, and/or processor circuit 502 of FIG. 5. The embodiments are not limited in this context.

In some embodiments, apparatus 900 may comprise or be arranged to communicatively couple with a memory unit 904. Memory unit 904 may be implemented using any machine-readable or computer-readable media capable of storing data, including both volatile and non-volatile memory. Examples of memory unit 904 may include—without limitation—any of the examples previously mentioned with respect to memory unit 304 of FIG. 3, memory unit 404 of FIG. 4, and/or memory unit 504 of FIG. 5. It is worthy of note that some portion or all of memory unit 904 may be included on the same integrated circuit as processor circuit 902, or alternatively some portion or all of memory unit 904 may be disposed on an integrated circuit or other medium, for example a hard disk drive, that is external to the integrated circuit of processor circuit 902. Although memory unit 904 is comprised within apparatus 900 in FIG. 9, memory unit 904 may be external to apparatus 900 in various embodiments. The embodiments are not limited in this context.

In some embodiments, apparatus 900 may comprise a communications component 906. Communications component 906 may comprise logic, circuitry, and/or instructions operative to send messages to one or more remote devices and/or to receive messages from one or more remote devices. In various embodiments, communications component 906 may be operative to send and/or receive messages over one or more wired connections, one or more wireless connections, or a combination of both. In some embodiments, communications component 906 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, communications component 906 may comprise an mmWave interface 906-A. mmWave interface 906-A may comprise logic, circuitry, and/or instructions operative to send and/or receive messages, select transmission and/or reception parameters and/or timing, perform packet/PDU construction and/or deconstruction, perform encoding and/or decoding, perform error detection and/or correction, and/or perform other operations in support of wireless communications according to one or more mmWave wireless communication protocols. In some embodiments, communications component 906 may also comprise an LTE interface 906-B. LTE interface 906-B may comprise logic, circuitry, and/or instructions operative to send and/or receive messages, select transmission and/or reception parameters and/or timing, perform packet/PDU construction and/or deconstruction, perform encoding and/or decoding, perform error detection and/or correction, and/or perform other operations in support of wireless communications in an Evolved Universal Mobile Telecommunications System (UMTS) Terrestrial Radio Access Network (E-UTRAN) according to one or more LTE wireless communication protocols. The embodiments are not limited in this context.

In various embodiments, via mmWave interface 906-A and LTE interface 906-B, apparatus 900 and/or system 940 may be dually configured with both mmWave and LTE wireless communication capabilities. However, it is worthy of note that in some other embodiments, LTE interface 906-B may be absent, and apparatus 900 and/or system 940 may be mmWave-capable but not LTE-capable. It is also worthy of note that in various embodiments, apparatus 900 and/or system 940 may be configured with one or more other types of wireless communication capabilities in lieu of—or in addition to—LTE capabilities. For example, in some embodiments, apparatus 900 and/or system 940 may be configured such that it is capable of wirelessly communicating in one or more of a wireless local area network (WLAN), a Global System for Mobile Communications (GSM)/Enhanced Data Rates for GSM Evolution (EDGE) Radio Access Network (GERAN), and a UMTS terrestrial radio access network (UTRAN), and/or in one or more other types of wireless communication networks. The embodiments are not limited in this context.

In various embodiments, apparatus 900 may comprise a management component 908. Management component 908 may comprise logic, circuitry, and/or instructions operative to manage various operations performed by apparatus 900. In some embodiments, management component 908 may be operative to control operations that apparatus 900 performs in conjunction with communicating with one or more external devices and/or networks. In various embodiments, management component 908 may be operative to control operations performed by apparatus 900 in conjunction with mmW small cell detection. The embodiments are not limited in this context.

FIG. 9 also illustrates a block diagram of a system 940. System 940 may comprise any of the aforementioned elements of apparatus 900. System 940 may further comprise one or more RF transceivers 942, one or more RF antennas 944, and/or a display 946. These elements may be the same as—or similar to—RF transceiver(s) 542, RF antenna(s) 544, and display 546 of FIG. 5, respectively. The embodiments are not limited in this context.

In some embodiments, during general operation, apparatus 900 and/or system 940 may obtain wireless coverage from an mmW anchor 950 while it is located within an mmW macro cell served by that mmW anchor 950. In various embodiments, mmW anchor 950 may be the same as—or similar to—mmW anchor 150 of FIG. 1, mmW anchor 250 of FIG. 2, apparatus 300 and/or system 340 of FIG. 3, mmW anchor 450 of FIG. 4, and/or mmW anchor 550 of FIG. 5. In some embodiments, while being served by mmW anchor 950, apparatus 900 and/or system 940 may move within the mmW macro cell. In various embodiments, as a result of such motion, apparatus 900 and/or system 940 may approach or cross the outer periphery of the mmW macro cell. In some embodiments, management component 908 may be operative to detect that apparatus 900 and/or system 940 has approached or crossed the outer periphery of the mmW macro cell based on reductions in the degrees of power, quality, and/or strength with which communications component 906 receives transmissions from mmW anchor 950. In various embodiments, management component 908 may be operative to detect that apparatus 900 and/or system 940 has approached or crossed the outer periphery of the mmW macro cell based alternatively or additionally on geographic location information such as global positioning system (GPS) data. In some embodiments, management component 908 may be operative to detect that apparatus 900 and/or system 940 has approached or crossed the outer periphery of the mmW macro cell based alternatively or additionally on information received from mmW anchor 950. In various embodiments, for example, mmW anchor 950 may be operative to monitor the geographic location of apparatus 900 and/or system 940, and may be operative to send apparatus 900 and/or system 940 a notification that it is approaching the outer periphery of the mmW macro cell. The embodiments are not limited to these examples.

In some embodiments, in response to a determination that apparatus 900 and/or system 940 has approached or crossed the outer periphery of the mmW macro cell, management component 908 may determine that a discovery procedure should be initiated in order to identify an mmW booster from which service may be obtained. In various embodiments, management component 908 may be operative to select the discovery procedure based on whether apparatus 900 and/or system 940 has knowledge of any nearby mmW small cells. In some embodiments, apparatus 900 and/or system 940 may have knowledge of one or more nearby mmW small cells due to receipt of neighboring mmW booster information 939 from mmW anchor 950. In various embodiments, as apparatus 900 and/or system 940 approaches or crosses the periphery of the mmW macro cell, mmW anchor 950 may be operative to send neighboring mmW booster information 939 in order to notify apparatus 900 and/or system 940 of one or more nearby mmW small cells via which it may obtain service. In some embodiments, apparatus 900 and/or system 940 may have knowledge of one or more nearby mmW small cells based alternatively or additionally on local history information indicating that one or more previously encountered mmW small cells are nearby. In various other embodiments, apparatus 900 and/or system 940 may not have knowledge of any nearby mmW small cell.

In some embodiments, if apparatus 900 and/or system 940 has knowledge of one or more nearby mmW small cells, management component 908 may be operative to initiate an mmW small cell discovery procedure. In various embodiments, according to the mmW small cell discovery procedure, communications component 906 may be operative to perform mmWave discovery using mmWave interface 906-A. In some embodiments, according to the mmW small cell discovery procedure, communications component 906 may be operative to scan one or more mmWave frequency channels for directional sync signals. In various embodiments, if apparatus 900 and/or system 940 does not have knowledge of any nearby mmW small cell, management component 908 may be operative to initiate an LTE/mmW small cell discovery procedure. In some embodiments, according to the LTE/mmW small cell discovery procedure, communications component 906 may be operative both to perform mmWave discovery using mmWave interface 906-A and to perform LTE discovery using LTE interface 906-B. In various embodiments, according to the LTE/mmW small cell discovery procedure, communications component 906 may be operative to scan one or more mmWave frequency channels for directional sync signals and may be operative to scan one or more LTE frequency channels for LTE sync signals, such as PSSs and/or SSSs. It is worthy of note that in some other embodiments, communications component 906 may not comprise LTE interface 906-B and may not be LTE-capable, and thus may be operative to use the mmW small cell discovery procedure to seek service even when it does not have knowledge of any nearby mmW small cells. The embodiments are not limited in this context.

In various embodiments, during either an mmW small cell discovery procedure or an LTE/mmW small cell discovery procedure, communications component 906 may be operative to discover an mmW booster 980 that serves a nearby mmW small cell. In some embodiments, communications component 906 may be operative to discover mmW booster 980 via mmWave discovery, by receiving directional sync signals 914 that mmW booster 980 transmits during an ISS. In various embodiments, communications component 906 may then be operative to perform an RSS, during which it may send RSS signals 992 for detection/reception by mmW booster 980. In some embodiments, communications component 906 may be operative on RF transceiver(s) 942 and/or RF antenna(s) 944 to sweep transmissions of RSS signals 992 through a plurality of RSS sectors. In various embodiments, the RSS may comprise a random access sector sweep, and may involve sweeping random access code transmissions through each of a plurality of RSS sectors. In some embodiments, the RSS signals 992 may comprise ISS sector feedback 993 that identifies—from among various ISS sectors through which mmW booster 980 swept transmission of directional sync signals 914 during the ISS via which it was detected—a best ISS sector. In various embodiments, the best ISS sector may comprise an ISS sector with respect to which the corresponding directional sync signals 914 were received with a highest associated degree of power, quality, and/or strength. The embodiments are not limited in this context.

In some embodiments, communications component 906 may be operative to receive SSW-FB 982 from mmW booster 980 in response to transmission of RSS signals 992. In various embodiments, SSW-FB 982 may indicate that mmW booster 980 has successfully received at least some of the RSS signals 992 transmitted during the RSS. In some embodiments, SSW-FB 982 may comprise RSS sector feedback 983 that specifies a best RSS sector as determined by mmW booster 980. In various embodiments, the best RSS sector may comprise an RSS sector with respect to which mmW booster 980 received the corresponding RSS signals 992 with a highest associated degree of power, quality, and/or strength during the RSS. In some embodiments, in response to receipt of SSW-FB 982, communications component 906 may be operative to send a sector sweep acknowledgment (SSW-ACK) 994. In various embodiments, SSW-ACK 994 may indicate that apparatus 900 and/or system 940 has successfully received SSW-FB 982. In some embodiments, using this exchange of directional sync signals 914, RSS signals 992, SSW-FB 982, and SSW-ACK 994, communications component 906 may be operative to establish an mmWave connection 934 between apparatus 900 and/or system 940 and mmW booster 980. In various embodiments, communications component 906 may be operative to use mmWave interface 906-A to exchange user plane data with mmW booster 980 over that mmWave connection 934. The embodiments are not limited in this context.

In some embodiments, mmW booster 980 may have only mmWave communications capabilities, and may not be LTE-capable. However, in various other embodiments, mmW booster 980 may be configured with both an mmWave communications interface and an LTE communications interface. In some such embodiments, mmW booster 980 may be operative to use one such interface to inform apparatus 900 and/or system 940 of the availability of the other. For example, mmW booster 980 may exchange one or more mmWave communications with apparatus 900 and/or system 940 in order to notify apparatus 900 and/or system 940 of its LTE capabilities. In another example, mmW booster 980 may exchange one or more LTE communications with apparatus 900 and/or system 940 in order to notify apparatus 900 and/or system 940 of its mmWave capabilities. It is worthy of note that in various embodiments, mmW booster 980 may be LTE-capable but apparatus 900 and/or system 940 may not be, and thus mmW booster 980 may not be able to use its LTE interface to notify apparatus 900 and/or system 940 of its mmWave capabilities. The embodiments are not limited in this context.

In some embodiments in which both apparatus 900 and/or system 940 and mmW booster 980 are LTE-capable, communications component 906 may be operative to discover mmW booster 980 via LTE discovery. More particularly, in various embodiments, communications component 906 may be operative to discover mmW booster 980 during an LTE/mmW small cell discovery procedure, by receiving LTE sync signals 984 transmitted by mmW booster 980. In some embodiments, LTE sync signals 984 may comprise PSSs and/or SSSs. In various embodiments, in response to LTE discovery of mmW booster 980, management component 908 may be operative to initiate an LTE connection establishment procedure. In some embodiments, using the LTE connection establishment procedure, communications component 906 may obtain LTE connectivity with mmW booster 980 over an LTE wireless connection 937. The embodiments are not limited in this context.

In various embodiments, mmW booster 980 may be operative to send an mmWave capability notification 986 to apparatus 900 and/or system 940 over LTE wireless connection 937. In some embodiments, mmWave capability notification 986 may notify apparatus 900 and/or system 940 that mmW booster 980 is mmWave-capable. In various embodiments, communications component 906 may be operative to send an mmWave capability notification 996 to mmW booster 980 over LTE wireless connection 937. In some embodiments, mmWave capability notification 996 may notify mmW booster 980 that apparatus 900 and/or system 940 is mmWave-capable. In various embodiments, following a determination that both apparatus 900 and/or system 940 and mmW booster 980 are mmWave-capable, mmW booster 980 may be operative to initiate an mmWave beamforming procedure to establish an mmWave connection 934 between apparatus 900 and/or system 940 and mmW booster 980. In some embodiments, communications component 906 may send a request over LTE wireless connection 937 to be switched to an mmWave connection, and mmW booster 980 may initiate the mmWave beamforming procedure in response to the request. In various other embodiments, mmW booster 980 may determine to switch apparatus 900 and/or system 940 to an mmWave connection without receiving such a request, and may initiate the mmWave beamforming procedure in response to that determination. The embodiments are not limited in this context.

In some embodiments, as a result of initiation of the mmWave beamforming procedure, communications component 906 may be operative to receive ISS monitoring instructions 988 from mmW booster 980. In various embodiments, in response to receipt of ISS monitoring instructions 988, communications component 906 may be operative to perform an ISS monitoring procedure during an ISS performed by mmW booster 980. In some embodiments, according to the ISS monitoring procedure, communications component 906 may be operative to scan for directional sync signals 914 according to one or more parameters specified in ISS monitoring instructions 988. In various embodiments, ISS monitoring instructions 988 may specify one or more mmWave frequency channels on which apparatus 900 and/or system 940 is to scan for directional sync signals 914. In some embodiments, ISS monitoring instructions 988 may specify one or more time intervals during which apparatus 900 and/or system 940 is to scan for directional sync signals 914. In various embodiments, ISS monitoring instructions 988 may instruct apparatus 900 and/or system 940 to scan a particular mmWave frequency channel for directional sync signals 914 during a particular time interval. The embodiments are not limited in this context.

In some embodiments, if communications component 906 does not successfully detect directional sync signals 914 during the ISS, communications component 906 may be operative to send a beamforming failure notification 998 to notify mmW booster 980 that mmWave connection establishment has failed. In various embodiments, communications component 906 may then be operative to use LTE interface 906-B to exchange user plane data with mmW booster 980 over LTE wireless connection 937. In some embodiments, if communications component 906 successfully detects directional sync signals 914 during the ISS, communications component 906 may be operative to perform an RSS following the ISS. In various embodiments, as previously discussed, the RSS may involve transmission of RSS signals 992, which may comprise ISS sector feedback 993. In some embodiments, communications component 906 may then be operative to receive SSW-FB 982 from mmW booster 980, and the SSW-FB 982 may comprise RSS sector feedback 983. In various embodiments, communications component 906 may be operative to respond to SSW-FB 982 by sending SSW-ACK 994. In some embodiments, using this exchange of directional sync signals 914, RSS signals 992, SSW-FB 982, and SSW-ACK 994, communications component 906 may be operative to establish an mmWave connection 934 between apparatus 900 and/or system 940 and mmW booster 980. In various embodiments, communications component 906 may then be operative to use mmWave interface 906-A to exchange user plane data with mmW booster 980 over mmWave connection 934. The embodiments are not limited in this context.

Figure 10:
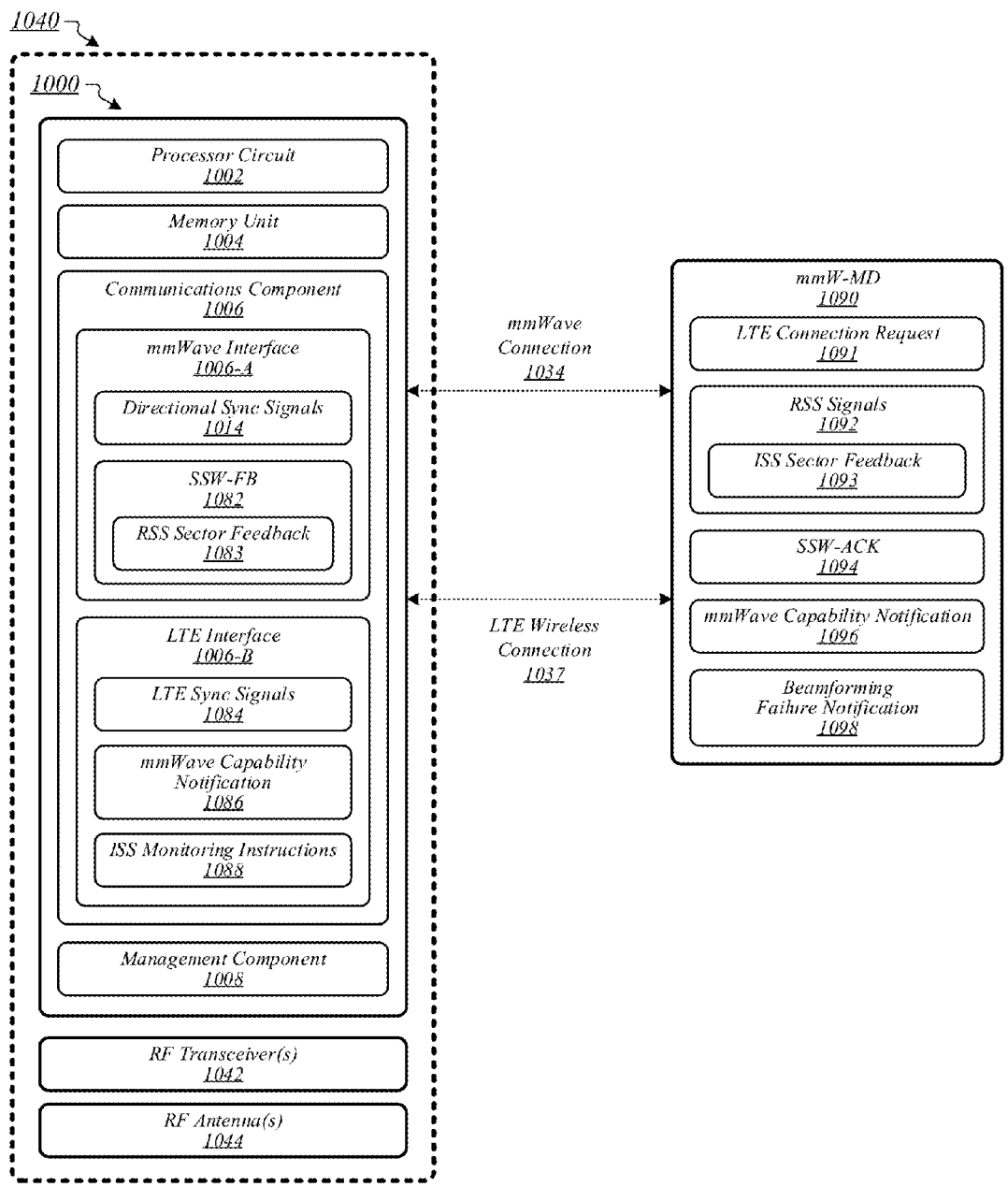
FIG. 10 illustrates an embodiment of a fifth apparatus and an embodiment of a fifth system.

FIG. 10 illustrates a block diagram of an apparatus 1000 such as may be representative of a coverage-deployed mmW booster that may implement techniques to support efficient mmW small cell detection in some embodiments. For example, apparatus 1000 may be representative of mmW booster 280 of FIG. 2 and/or mmW booster 980 of FIG. 9. As shown in FIG. 10, apparatus 1000 comprises multiple elements including a processor circuit 1002, a memory unit 1004, a communications component 1006, and a management component 1008. The embodiments, however, are not limited to the type, number, or arrangement of elements shown in this figure.

In various embodiments, apparatus 1000 may comprise processor circuit 1002. Processor circuit 1002 may be implemented using any processor or logic device, examples of which may include—without limitation—any of the examples previously mentioned with respect to processor circuit 302 of FIG. 3, processor circuit 402 of FIG. 4, processor circuit 502 of FIG. 5, and/or processor circuit 902 of FIG. 9. The embodiments are not limited in this context.

In some embodiments, apparatus 1000 may comprise or be arranged to communicatively couple with a memory unit 1004. Memory unit 1004 may be implemented using any machine-readable or computer-readable media capable of storing data, including both volatile and non-volatile memory. Examples of memory unit 1004 may include—without limitation—any of the examples previously mentioned with respect to memory unit 304 of FIG. 3, memory unit 404 of FIG. 4, memory unit 504 of FIG. 5, and/or memory unit 904 of FIG. 9. It is worthy of note that some portion or all of memory unit 1004 may be included on the same integrated circuit as processor circuit 1002, or alternatively some portion or all of memory unit 1004 may be disposed on an integrated circuit or other medium, for example a hard disk drive, that is external to the integrated circuit of processor circuit 1002. Although memory unit 1004 is comprised within apparatus 1000 in FIG. 10, memory unit 1004 may be external to apparatus 1000 in various embodiments. The embodiments are not limited in this context.

In some embodiments, apparatus 1000 may comprise a communications component 1006. Communications component 1006 may comprise logic, circuitry, and/or instructions operative to send messages to one or more remote devices and/or to receive messages from one or more remote devices. In various embodiments, communications component 1006 may be operative to send and/or receive messages over one or more wired connections, one or more wireless connections, or a combination of both. In some embodiments, communications component 1006 may additionally comprise logic, circuitry, and/or instructions operative to perform various operations in support of such communications. Examples of such operations may include selection of transmission and/or reception parameters and/or timing, packet and/or protocol data unit (PDU) construction and/or deconstruction, encoding and/or decoding, error detection, and/or error correction. The embodiments are not limited to these examples.

In various embodiments, communications component 1006 may comprise an mmWave interface 1006-A. mmWave interface 1006-A may comprise logic, circuitry, and/or instructions operative to send and/or receive messages, select transmission and/or reception parameters and/or timing, perform packet/PDU construction and/or deconstruction, perform encoding and/or decoding, perform error detection and/or correction, and/or perform other operations in support of wireless communications according to one or more mmWave wireless communication protocols. In some embodiments, communications component 1006 may also comprise an LTE interface 1006-B. LTE interface 1006-B may comprise logic, circuitry, and/or instructions operative to send and/or receive messages, select transmission and/or reception parameters and/or timing, perform packet/PDU construction and/or deconstruction, perform encoding and/or decoding, perform error detection and/or correction, and/or perform other operations in support of wireless communications in an E-UTRAN according to one or more LTE wireless communication protocols. The embodiments are not limited in this context.

In various embodiments, via mmWave interface 1006-A and LTE interface 1006-B, apparatus 1000 and/or system 1040 may be dually configured with both mmWave and LTE wireless communication capabilities. However, it is worthy of note that in some other embodiments, LTE interface 1006-B may be absent, and apparatus 1000 and/or system 1040 may be mmWave-capable but not LTE-capable. It is also worthy of note that in various embodiments, apparatus 1000 and/or system 1040 may be configured with one or more other types of wireless communication capabilities in lieu of—or in addition to—LTE capabilities. For example, in some embodiments, apparatus 1000 and/or system 1040 may be configured such that it is capable of wirelessly communicating in one or more of a WLAN, a GERAN, and a UTRAN, and/or in one or more other types of wireless communication networks. The embodiments are not limited in this context.

In various embodiments, apparatus 1000 may comprise a management component 1008. Management component 1008 may comprise logic, circuitry, and/or instructions operative to manage various operations performed by apparatus 1000. In some embodiments, management component 1008 may be operative to control operations that apparatus 1000 performs in conjunction with communicating with one or more external devices and/or networks. In various embodiments, management component 1008 may be operative to control operations performed by apparatus 1000 in support of mmW small cell detection on the part of one or more mobile devices. The embodiments are not limited in this context.

FIG. 10 also illustrates a block diagram of a system 1040. System 1040 may comprise any of the aforementioned elements of apparatus 1000. System 1040 may further comprise one or more RF transceivers 1042 and/or one or more RF antennas 1044. These elements may be the same as—or similar to—RF transceiver(s) 442 and/or RF antenna(s) 444 of FIG. 4, respectively. The embodiments are not limited in this context.

In some embodiments, apparatus 1000 and/or system 1040 may operate as an mmW booster in a coverage deployment, and may provide wireless coverage within an mmW small cell, such as mmW small cell 285 of FIG. 2. In various embodiments, during general operation of apparatus 1000 and/or system 1040, communications component 1006 may be operative to use mmWave interface 1006-A to periodically perform ISSs to enable nearby devices to discover the mmW small cell. In some embodiments, during each ISS, communications component 1006 may be operative to send directional sync signals 1014. In various embodiments, directional sync signals 1014 may comprise PSSs and/or SSSs. In some embodiments, during each ISS, communications component 1006 may be operative on RF transceiver(s) 1042 and/or RF antenna(s) 1044 to sweep transmissions of directional sync signals 1014 through various sectors of the mmW small cell served by apparatus 1000 and/or system 1040. In various embodiments, during each ISS, communications component 1006 may be operative on RF transceiver(s) 1042 and/or RF antenna(s) 1044 to transmit directional sync signals 1014 over one or more mmWave frequency channels. The embodiments are not limited in this context.

In some embodiments, apparatus 1000 and/or system 1040 may be both mmWave-capable and LTE-capable, and communications component 1006 may be configured with both mmWave interface 1006-A and LTE interface 1006-B. In various such embodiments, apparatus 1000 and/or system 1040 may be operative to periodically transmit LTE sync signals 1084 to enable nearby devices to discover the LTE connectivity available via apparatus 1000 and/or system 1040. In some embodiments, LTE sync signals 1084 may comprise PSSs and/or SSSs. In various other embodiments, apparatus 1000 and/or system 1040 may be mmWave-capable but not LTE-capable, and may periodically transmit directional sync signals 1014 but not LTE sync signals 1084. The embodiments are not limited in this context.

In some embodiments, a nearby mmW-MD 1090 may discover apparatus 1000 and/or system and may transmit connection initiation information in an attempt to establish a connection with apparatus 1000 and/or system 1040. In various embodiments, the nature of the transmitted connection initiation information may depend on the manner in which mmW-MD 1090 has discovered apparatus 1000 and/or system 1040. In some embodiments, using an mmWave interface, mmW-MD 1090 may discover apparatus 1000 and/or system 1040 based on directional sync signals 1014. In such embodiments, mmW-MD 1090 may then initiate an RSS, and communications component 1006 may be operative to receive connection initiation information comprising RSS signals 1092 that are transmitted during that RSS.

In various other embodiments, using an LTE interface, mmW-MD 1090 may discover apparatus 1000 and/or system 1040 based on LTE sync signals 1084. In such embodiments, communications component 1006 may be operative to receive connection initiation information comprising an LTE connection request 1091. In some embodiments, LTE connection request 1091 may comprise a request for wireless connectivity to an LTE small cell served by apparatus 1000 and/or system 1040. In various embodiments, in response to receipt of LTE connection request 1091, management component 1008 may be operative to initiate an LTE connection establishment procedure. In some embodiments, according to the LTE connection establishment procedure, an LTE wireless connection 1037 may be established between mmW-MD 1090 and apparatus 1000 and/or system 1040 in order to provide mmW-MD 1090 with LTE connectivity.

In various embodiments, communications component 1006 may be operative to send an mmWave capability notification 1086 to mmW-MD 1090 over LTE wireless connection 1037. In some embodiments, mmWave capability notification 1086 may notify mmW-MD 1090 that apparatus 1000 and/or system 1040 is mmWave-capable. In various embodiments, mmW-MD 1090 may be operative to send an mmWave capability notification 1096 to apparatus 1000 and/or system 1040 over LTE wireless connection 1037. In some embodiments, mmWave capability notification 1096 may notify apparatus 1000 and/or system 1040 that mmW-MD 1090 is mmWave-capable. In various embodiments, following a determination that both apparatus 1000 and/or system 1040 and mmW-MD 1090 are mmWave-capable, management component 1008 may be operative to initiate an mmWave beamforming procedure to establish an mmWave connection 1034 between apparatus 1000 and/or system 1040 and mmW-MD 1090. In some embodiments, mmW-MD 1090 may send a request over LTE wireless connection 1037 to be switched to an mmWave connection, and management component 1008 may initiate the mmWave beamforming procedure in response to the request. In various other embodiments, management component 1008 may determine to switch mmW-MD 1090 to an mmWave connection without receiving such a request, and may initiate the mmWave beamforming procedure in response to that determination. The embodiments are not limited in this context.

In some embodiments, during the mmWave beamforming procedure, communications component 1006 may be operative to perform an ISS. In various embodiments, during the ISS, communications component 1006 may be operative to send directional sync signals 1014 for detection/reception by mmW-MD 1090. In some embodiments, directional sync signals 1014 may comprise PSSs and/or SSSs. In various embodiments, communications component 1006 may be operative on RF transceiver(s) 1042 and/or RF antenna(s) 1044 to sweep transmissions of directional sync signals 1014 through various sectors of the mmW small cell served by apparatus 1000 and/or system 1040. In some embodiments, communications component 1006 may be operative to send directional sync signals 1014 over one or more mmWave frequency channels. In various embodiments, communications component 1006 may be operative to send ISS monitoring instructions 1088 in order to instruct mmW-MD 1090 to scan for directional sync signals 1014 on the appropriate mmWave frequency channel(s) and/or during the appropriate time interval(s). The embodiments are not limited in this context.

In some embodiments, if mmW-MD 1090 is unable to successfully detect directional sync signals 1014 during the ISS, it may transmit a beamforming failure notification 1098 to notify apparatus 1000 and/or system 1040 that mmWave connection establishment has failed. In various embodiments, in response to receipt of beamforming failure notification 1098, management component 1008 may determine to discontinue the attempt to establish mmWave connection 1034, and communications component 1006 may exchange user plane data with mmW-MD 1090 over LTE wireless connection 1037. In some other embodiments, in response to receipt of beamforming failure notification 1098, management component 1008 may elect to retry the ISS and may send a new set of ISS monitoring instructions 1088 to mmW-MD 1090. In various such embodiments, management component 1008 may determine to discontinue the attempt to establish mmWave connection 1034 if the ISS fails a certain number of times. In an example embodiment, management component 1008 may perform the ISS three times before discontinuing the attempt to establish mmWave connection 1034. The embodiments are not limited to this example.

In some embodiments, if mmW-MD 1090 successfully detects directional sync signals 1014 during a given ISS, it may not send a beamforming failure notification 1098 and my instead initiate an RSS. In various embodiments, if no beamforming failure notification 1098 is received, management component 1008 may be operative to determine that the ISS has been successful and may perform an RSS monitoring procedure. In some embodiments, according to the RSS monitoring procedure, communications component 1006 may be operative to monitor one or more mmWave frequency channels for RSS signals 1092 transmitted by mmW-MD 1090. In various embodiments, the RSS signals 1092 may comprise ISS sector feedback 1093 that identifies—from among various ISS sectors through which apparatus 1000 and/or system 1040 swept transmission of directional sync signals 1014 during the ISS via which it was detected—a best ISS sector. In some embodiments, the best ISS sector may comprise an ISS sector with respect to which the corresponding directional sync signals 1014 were received with a highest associated degree of power, quality, and/or strength. The embodiments are not limited in this context.

In various embodiments, in response to successful receipt of RSS signals 1092, communications component 1006 may be operative to send SSW-FB 1082 to mmW-MD 1090. In some embodiments, SSW-FB 1082 may comprise RSS sector feedback 1083 that specifies a best RSS sector as previously discussed. In various embodiments, in response to SSW-FB 1082, communications component 1006 may be operative to receive an SSW-ACK 1094 indicating that mmW-MD 1090 has successfully received SSW-FB 1082. In some embodiments, upon completion of the mmWave beamforming procedure comprising the exchange of directional sync signals 1014, RSS signals 1092, SSW-FB 1082, and SSW-ACK 1094, mmWave connection 1034 may be established between apparatus 1000 and/or system 1040 and mmW-MD 1090. In various embodiments, communications component 1006 may then be operative to use mmWave interface 1006-A to exchange user plane data with mmW-MD 1090 over mmWave connection 1034. It is worthy of note that in some embodiments, the mmWave beamforming procedure may be completed and mmWave connection 1034 may be established without reliance on LTE connectivity between apparatus 1000 and/or system 1040 and mmW-MD 1090 even when both are LTE-capable. The embodiments are not limited in this context.

Figure 11:
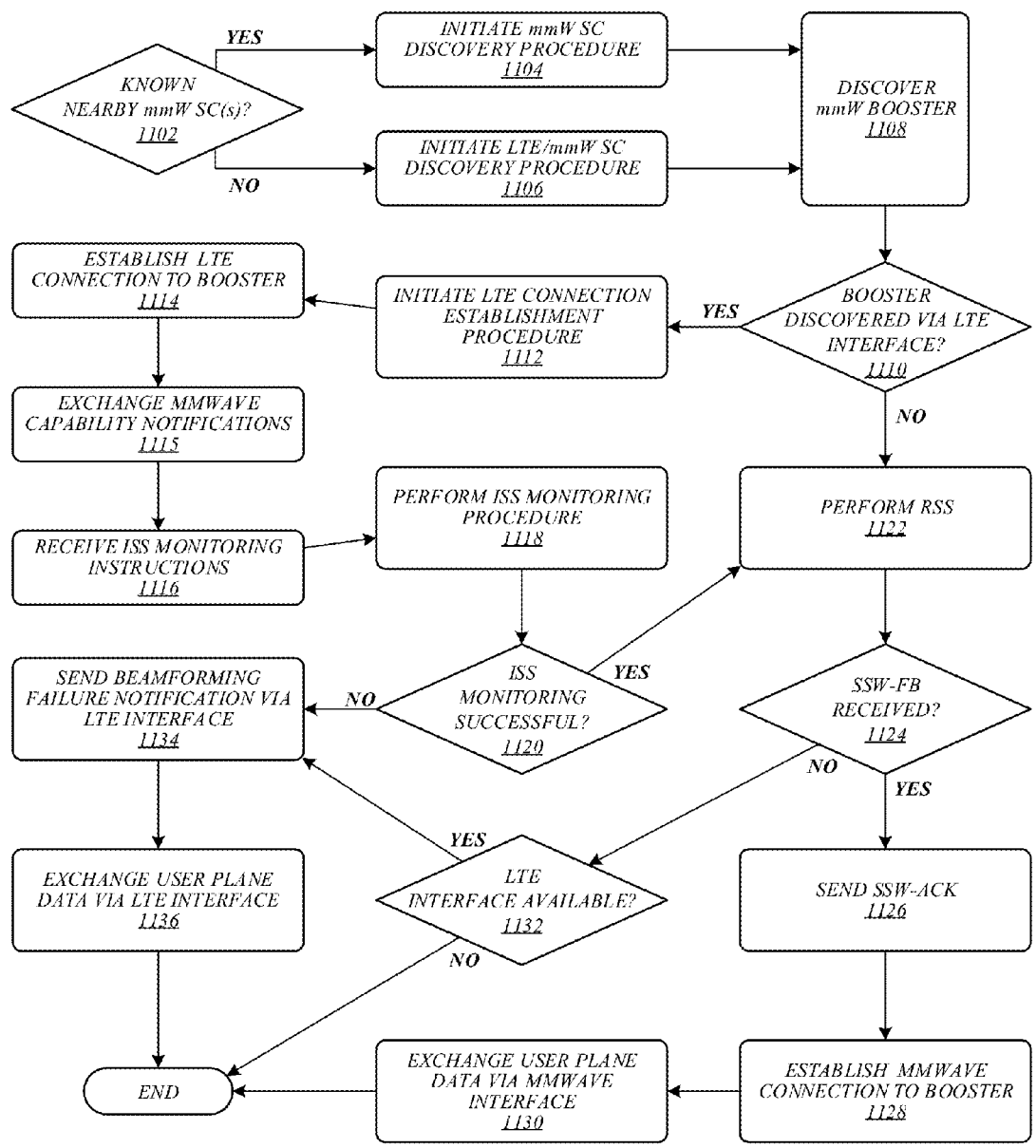
FIG. 11 illustrates an embodiment of a fourth logic flow.

FIG. 11 illustrates one embodiment of a logic flow 1100, which may be representative of operations that may be executed by an mmWave-capable mobile device in various embodiments in conjunction with the establishment of a wireless connection with a coverage-deployed mmW booster. For example, logic flow 1100 may be representative of operations that apparatus 900 and/or system 940 of FIG. 9 may perform in some embodiments in conjunction with the establishment of a wireless connection with mmW booster 980. As shown in logic flow 1100, flow may proceed from an initial block 1102 based on whether there are any known nearby mmW small cells. If there are any known nearby mmW small cells, flow may pass from 1102 to 1104, where an mmW small cell discovery procedure may be initiated. For example, management component 908 of FIG. 9 may be operative to initiate an mmW small cell discovery procedure if communications component 906 has received neighboring mmW booster information 939 from mmW anchor 950, and/or if local history information indicates that one or more previously encountered mmW small cells are nearby. If there are no known nearby mmW small cells, flow may pass from 1102 to 1106, where an LTE/mmW small cell discovery procedure may be initiated. For example, management component 908 of FIG. 9 may be operative to initiate an LTE/mmW small cell discovery procedure if apparatus 900 and/or system 940 has no knowledge of any nearby mmW small cell.

From either 1104 or 1106, flow may pass to 1108, where an mmW booster may be discovered. For example, apparatus 900 and/or system 940 of FIG. 9 may be operative to discover mmW booster 980 via an mmW small cell discovery procedure or an LTE/mmW small cell discovery procedure. It is worthy of note that in various embodiments, the mmWave capabilities of the mmW booster discovered at 1108 may not be known prior to discovery of the mmW booster or initially after discovery of the mmW booster. For example, in some embodiments, apparatus 900 and/or system 940 of FIG. 9 may be operative to discover mmW booster 980 using LTE interface 906-B during an LTE/mmW small cell discovery procedure, and may not yet be aware that mmW booster 980 has mmWave capabilities. The embodiments are not limited in this context.

Following mmW booster discovery at 1108, flow may proceed from 1110 based on the interface used to discover the mmW booster. If the mmW booster has been detected via an LTE interface, flow may pass to 1112, where an LTE connection establishment procedure may be initiated. For example, after discovering mmW booster 980 using LTE interface 906-B, apparatus 900 and/or system 940 of FIG. 9 may be operative to initiate an LTE connection establishment procedure to establish LTE connectivity with mmW booster 980. At 1114, an LTE connection to the mmW booster may be established. For example, apparatus 900 and/or system 940 of FIG. 9 may be operative to establish LTE wireless connection 937 to mmW booster 980. At 1115, one or more mmWave capability notifications may be exchanged with the mmW booster over the LTE connection. For example, communications component 906 of FIG. 9 may be operative to send mmWave capability notification 996 to mmW booster 980 over LTE wireless connection 937, and/or may be operative to receive mmWave capability notification 986 from mmW booster 980 over LTE wireless connection 937.

At 1116, ISS monitoring instructions may be received over the LTE connection. For example, mmW booster 980 of FIG. 9 may be operative to initiate an mmWave beamforming procedure, according to which it sends ISS monitoring instructions 988 to apparatus 900 and/or system 940 over LTE wireless connection 937. At 1118, an ISS monitoring procedure may be performed based on the ISS monitoring instructions. For example, based on ISS monitoring instructions 988 received from mmW booster 980, communications component 906 may be operative to scan for directional sync signals 914 on one ore more mmWave frequency channels during one or more time intervals.

Following performance of the ISS monitoring procedure at 1118, flow may proceed from 1120 based on whether the ISS monitoring procedure has been successful. If the ISS monitoring procedure has been successful, flow may pass from 1120 to 1122, where an RSS may be performed. For example, if communications component 906 of FIG. 9 successfully detects directional sync signals 914 during an ISS performed by mmW booster 980, it may be operative to perform an RSS. Following performance of the RSS at 1122, flow may proceed from 1124 based on whether SSW-FB is received in response to the RSS. If SSW-FB is received in response to the RSS, flow may pass from 1124 to 1126, where an SSW-ACK may be sent in response to the SSW-FB. For example, if communications component 906 of FIG. 9 receives SSW-FB 982 from mmW booster 980, communications component 906 may be operative to send SSW-ACK 994 to mmW booster 980 in response to SSW-FB 982. At 1128, an mmWave connection may be established with the mmW booster. For example, apparatus 900 and/or system 940 of FIG. 9 may be operative to establish mmWave connection 934 with mmW booster 980. At 1130, user plane data may be exchanged via an mmWave interface. For example, communications component 906 of FIG. 9 may be operative to use mmWave interface 906-A to exchange user plane data with mmW booster 980 over mmWave connection 934. Following 1130, the logic flow may end.

If the ISS monitoring at 1118 is not successful, flow may pass from 1120 to 1134, where a beamforming failure notification may be sent to the mmW booster via an LTE interface. For example, if communications component 906 of FIG. 9 does not successfully detect directional sync signals 914 during an ISS performed by mmW booster 980, it may be operative to use LTE interface 906-B to send beamforming failure notification 998 to mmW booster 980 over LTE wireless connection 937. Flow may also pass to 1134 from 1124 (via 1132) if no SSW-FB is received for an RSS performed at 1122 in response to a successful ISS monitoring procedure at 1118. For example, if communications component 906 of FIG. 9 receives ISS monitoring instructions 988 via LTE interface 906-B, successfully detects directional sync signals 914 and performs an RSS, but does not receive SSW-FB 982 in response to the RSS, it may be operative to use LTE interface 906-B to send beamforming failure notification 998 to mmW booster 980 over LTE wireless connection 937. From 1134, flow may pass to 1136, where user plane data may be exchanged via the LTE interface. For example, communications component 906 of FIG. 9 may be operative to use LTE interface 906-B to exchange user plane data with mmW booster 980. Following 1136, the logic flow may end.

Returning to block 1110, if the mmW booster discovered at 1108 has been discovered via an mmWave interface and not an LTE interface, flow may pass from 1110 to 1122, where an RSS may be performed. For example, after discovering mmW booster 980 using mmWave interface 906-A, communications component 906 of FIG. 9 may be operative to perform an RSS. As previously noted, following performance of the RSS at 1122, flow may proceed from 1124 based on whether SSW-FB is received in response to the RSS. If SSW-FB is received in response to the RSS, flow may pass from 1124 to 1126 and then along to 1128 and 1130, after which the logic flow may end. If no SSW-FB is received in response to the RSS, flow may pass to 1132, from which flow may proceed based on whether an LTE interface is available for use in communicating with the mmW booster. If no LTE interface is available, the logic flow may end. If an LTE interface is available, it may be used to send a beamforming failure notification at 1134 and to exchange user plane data at 1136, after which the logic flow may end. In an example embodiment, apparatus 900 and/or system 940 of FIG. 9 may have LTE connectivity with mmW booster 980 but may discover mmW booster 980 via mmWave interface 906-A and perform an RSS. In such an example embodiment, if communications component 906 does not receive SSW-FB 982 in response to the RSS, it may be operative to make use of the availability of LTE connectivity with mmW booster 980 by using LTE interface 906-B to send beamforming failure notification 998 to mmW booster and to exchange user plane data with mmW booster 980. The embodiments are not limited to this example.

Figure 12:
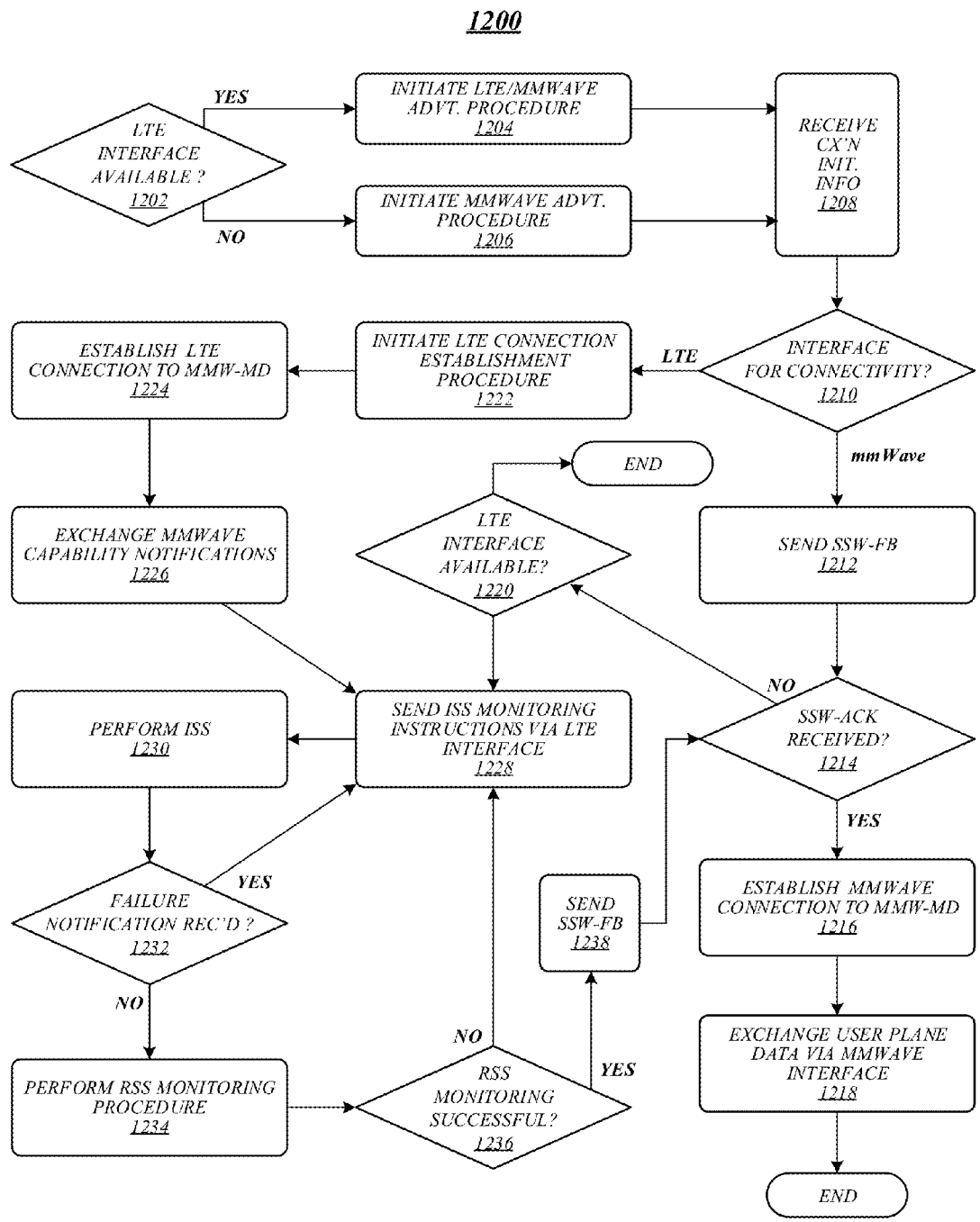
FIG. 12 illustrates an embodiment of a fifth logic flow.

FIG. 12 illustrates one embodiment of a logic flow 1200, which may be representative of operations that may be executed by a coverage-deployed mmW booster in various embodiments in conjunction with the establishment of a wireless connection with an mmWave-capable mobile device. For example, logic flow 1200 may be representative of operations that apparatus 1000 and/or system 1040 of FIG. 10 may perform in some embodiments in conjunction with the establishment of a wireless connection with mmW-MD 1090. As shown in logic flow 1200, flow may proceed from an initial block 1202 based on whether an LTE interface is available. If an LTE interface is available, flow may pass from 1202 to 1204, where an LTE/mmWave advertisement procedure may be initiated. In various embodiments, the LTE/mmWave advertisement procedure may involve both transmission of mmWave sync signals and transmission of LTE sync signals. For example, if communications component 1006 of FIG. 10 comprises both mmWave interface 1006-A and LTE interface 1006-B, it may be operative to initiate an LTE/mmWave advertisement procedure that involves both transmission of directional sync signals 1014 and transmission of LTE sync signals 1084. If no LTE interface is available, flow may pass from 1202 to 1206, where an mmWave advertisement procedure may be initiated. In some embodiments, the mmWave advertisement procedure may involve transmission of mmWave sync signals. For example, if communications component 1006 of FIG. 10 comprises mmWave interface 1006-A but not LTE interface 1006-B, it may be operative to initiate an mmWave advertisement procedure that involves transmission of directional sync signals 1014.

From either 1204 or 1206, flow may pass to 1208, where connection initiation information may be received from an mmW-MD. In various embodiments, the connection initiation information may generally indicate that the mmW-MD has successfully discovered the mmW booster and wishes to establish connectivity with the mmW booster. In some embodiments, the particular nature of the connection initiation information may depend on the manner in which the mmW-MD has discovered the mmW booster. If the mmW-MD has discovered the mmW booster based on mmWave sync signals received via an mmWave interface, it may send connection initiation information comprising RSS signals. For example, if mmW-MD 1090 of FIG. 10 discovers apparatus 1000 and/or system 1040 based on directional sync signals 1014 received via an mmWave interface, it may perform an RSS according to which it transmits RSS signals 1092, which may constitute the connection initiation information received at block 1208 in logic flow 1200. If the mmW-MD has discovered the mmW booster based on LTE sync signals received via an LTE interface, it may send connection initiation information comprising an LTE connection request. For example, if mmW-MD 1090 of FIG. 10 discovers apparatus 1000 and/or system 1040 based on LTE sync signals 1084 received via an LTE interface, it may transmit LTE connection request 1091, which may constitute the connection initiation information received at block 1208 in logic flow 1200. The embodiments are not limited in this context.

Following receipt of the connection initiation information at 1208, flow may proceed from 1210 based on the interface via which connectivity is to be established, as indicated by the connection initiation information. If the connection initiation information indicates that connectivity is to be established with the mmW-MD via an mmWave interface, flow may pass from 1210 to 1212, where SSW-FB may be sent in response to RSS signals received at 1208. For example, in response to receipt of connection initiation information from mmW-MD 1090 that comprises RSS signals 1092, communications component 1006 of FIG. 10 may be operative to send SSW-FB 1082 to mmW-MD 1090. Following transmission of the SSW-FB at 1212, flow may proceed from 1214 based on whether an SSW-ACK is received in response to the SSW-FB. If an SSW-ACK is received in response to the SSW-FB, flow may pass from 1214 to 1216, where an mmWave connection may be established with the mmW-MD. For example, apparatus 1000 and/or system 1040 of FIG. 10 may be operative to establish mmWave connection 1034 with mmW-MD 1090. At 1216, user plane data may be exchanged via an mmWave interface. For example, communications component 1006 of FIG. 10 may be operative to use mmWave interface 1006-A to exchange user plane data with mmW-MD 1090 over mmWave connection 1034. Following 1218, the logic flow may end.

Returning to 1210, if the connection initiation information indicates that connectivity is to be established with the mmW-MD via an LTE interface, flow may pass from 1210 to 1222, where an LTE connection establishment procedure may be initiated. For example, in response to receipt of connection initiation information from mmW-MD 1090 that comprises LTE connection request 1091, communications component 1006 of FIG. 10 may be operative to initiate an LTE connection establishment procedure to establish LTE connectivity with mmW-MD 1090. At 1224, an LTE connection to the mmW-MD may be established. For example, apparatus 1000 and/or system 1040 of FIG. 10 may be operative to establish LTE wireless connection 1037 with mmW-MD 1090. At 1226, one or more mmWave capability notifications may be exchanged with the mmW-MD over the LTE connection. For example, communications component 1006 of FIG. 10 may be operative to send mmWave capability notification 1086 to mmW-MD 1090 over LTE wireless connection 1037, and/or may be operative to receive mmWave capability notification 1096 from mmW-MD 1090 over LTE wireless connection 1037.

At 1228, ISS monitoring instructions may be sent via an LTE interface. For example, communications component 1006 of FIG. 10 may be operative to send ISS monitoring instructions 1088 to mmW-MD 1090 via LTE interface 1006-B. At 1230, an ISS may be performed. For example, communications component 1006 of FIG. 10 may be operative to perform an ISS, according to which transmissions of directional sync signals 1014 may be swept through one or more ISS sectors. Following performance of the ISS at 1230, flow may proceed from 1232 based on whether a failure notification for the ISS is received. If a failure notification is received, flow may return to 1228, new ISS monitoring instructions may be sent, and a new ISS may be performed at 1230. For example, in response to receipt of beamforming failure notification 1098 from mmW-MD 1090, communications component 1006 of FIG. 10 may be operative to send a new set of ISS monitoring instructions 1088 and to perform a new ISS. In various embodiments, if no ISS has been successful after a certain number of repetitions of this cycle, the logic flow may end. If no failure notification is received following performance of an ISS at 1230, flow may pass from 1232 to 1234, where an RSS monitoring procedure may be performed. For example, if it does not receive a beamforming failure notification 1098 from mmW-MD 1090, communications component 1006 of FIG. 10 may be operative to perform an RSS monitoring procedure according to which it may monitor one or more mmWave frequency channels for RSS signals 1092 transmitted by mmW-MD 1090.

Following performance of the RSS monitoring procedure at 1234, flow may proceed from 1236 based on whether the RSS monitoring procedure has been successful. In some embodiments, the RSS monitoring procedure may be determined to be successful if RSS signals transmitted by the mmW-MD are successfully detected during the RSS monitoring procedure. If the RSS monitoring procedure at 1234 is not successful, flow may pass from 1236 back to 1228. If the RSS monitoring procedure at 1234 is successful, flow may pass from 1236 to 1238, where SSW-FB may be sent. For example, if communications component 1006 of FIG. 10 successfully receives RSS signals 1092 transmitted by mmW-MD 1090, it may be operative to send SSW-FB 1082 to mmW-MD 1090. Following transmission of the SSW-FB at 1238, flow may pass to 1214, from which flow may then proceed based on whether an SSW-ACK is received in response to the SSW-FB. If an SSW-ACK is received in response to the SSW-FB, flow may pass from 1214 to 1216 and then on to 1218, as previously discussed. If no SSW-ACK is received in response to the SSW-FB, flow may pass to 1220, from which flow may then proceed based on whether an LTE interface is available for communicating with the mmW-MD. If an LTE interface is available, flow may pass to 1228, where the LTE interface may be used to send ISS monitoring instructions to the mmW-MD. If no LTE interface is available, the logic flow may end. The embodiments are not limited in this context.

Figure 13A:
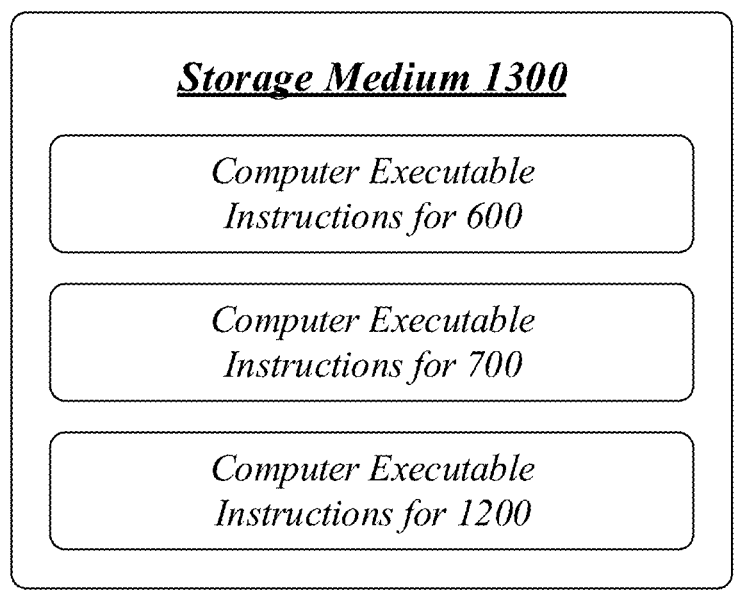
FIG. 13A illustrates an embodiment of a first storage medium.

FIG. 13A illustrates an embodiment of a storage medium 1300. Storage medium 1300 may comprise any non-transitory computer-readable storage medium or machine-readable storage medium, such as an optical, magnetic or semiconductor storage medium. In various embodiments, storage medium 1300 may comprise an article of manufacture. In some embodiments, storage medium 1300 may store computer-executable instructions, such as computer-executable instructions to implement one or more of logic flow 600 of FIG. 6, logic flow 700 of FIG. 7, and logic flow 1200 of FIG. 12. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like. The embodiments are not limited in this context.

Figure 13B:
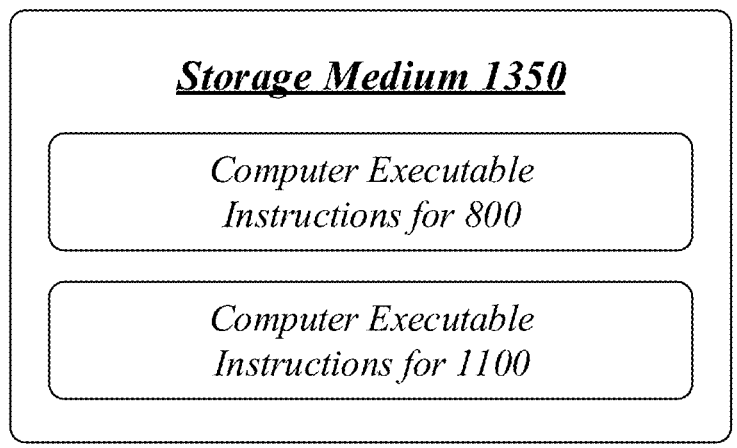
FIG. 13B illustrates an embodiment of a second storage medium.

FIG. 13B illustrates an embodiment of a storage medium 1350. Storage medium 1350 may comprise any non-transitory computer-readable storage medium or machine-readable storage medium, such as an optical, magnetic or semiconductor storage medium. In various embodiments, storage medium 1350 may comprise an article of manufacture. In some embodiments, storage medium 1350 may store computer-executable instructions, such as computer-executable instructions to implement one or both of logic flow 800 of FIG. 8 and logic flow 1100 of FIG. 11. Examples of a computer-readable/machine-readable storage medium and of computer-executable instructions may include—without limitation—any of the respective examples previously mentioned with respect to storage medium 1300 of FIG. 13 A. The embodiments are not limited in this context.

Figure 14:
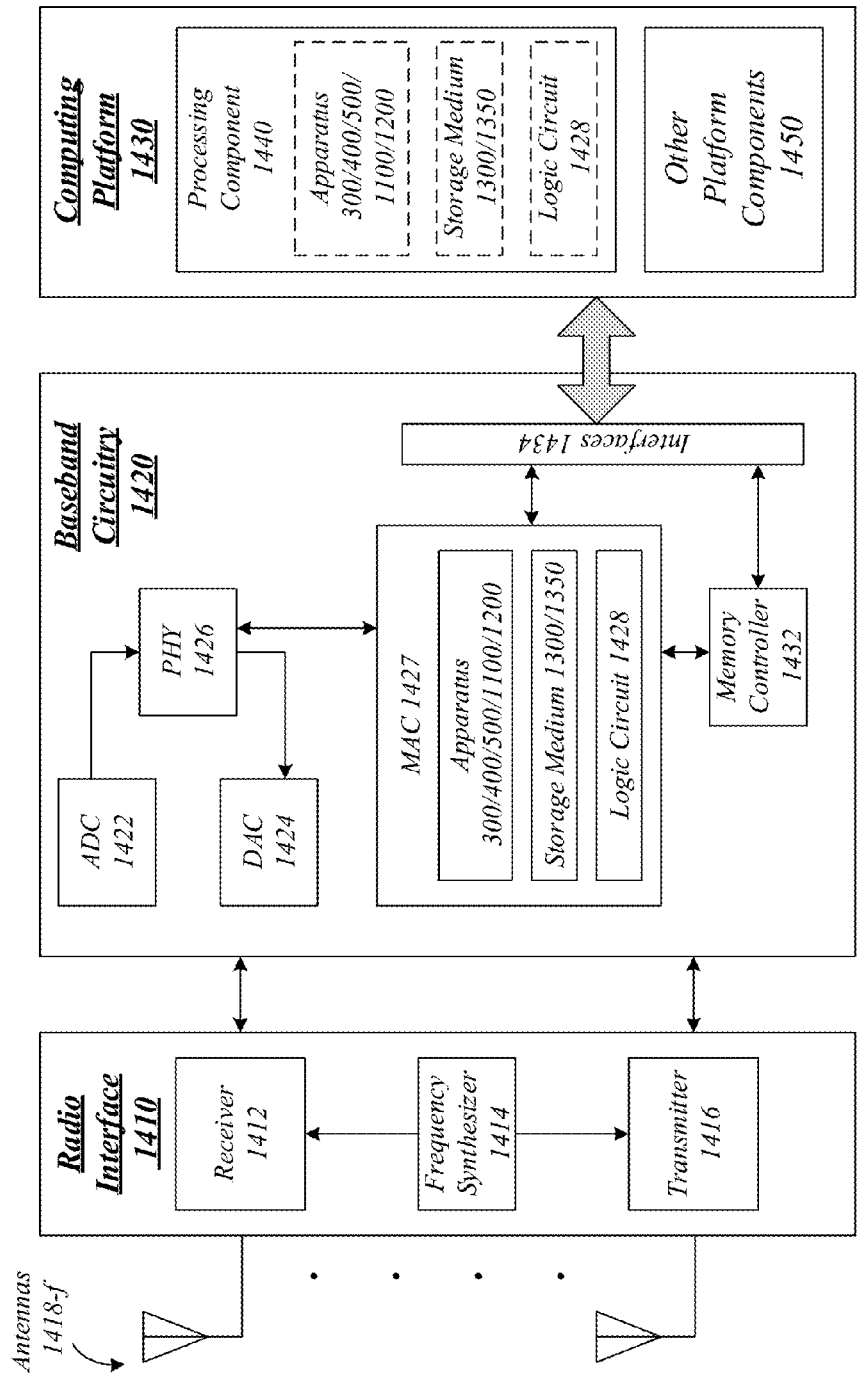
FIG. 14 illustrates an embodiment of a device.

FIG. 14 illustrates an embodiment of a communications device 1400 that may implement one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, apparatus 900 and/or system 940 of FIG. 9, apparatus 1000 and/or system 1040 of FIG. 10, logic flow 1100 of FIG. 11, logic flow 1200 of FIG. 12, storage medium 1300 of FIG. 13A, and storage medium 1350 of 13B. In various embodiments, device 1400 may comprise a logic circuit 1428. The logic circuit 1428 may include physical circuits to perform operations described for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, apparatus 900 and/or system 940 of FIG. 9, apparatus 1000 and/or system 1040 of FIG. 10, logic flow 1100 of FIG. 11, and logic flow 1200 of FIG. 12, for example. As shown in FIG. 14, device 1400 may include a radio interface 1410, baseband circuitry 1420, and computing platform 1430, although the embodiments are not limited to this configuration.

The device 1400 may implement some or all of the structure and/or operations for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, apparatus 900 and/or system 940 of FIG. 9, apparatus 1000 and/or system 1040 of FIG. 10, logic flow 1100 of FIG. 11, logic flow 1200 of FIG. 12, storage medium 1300 of FIG. 13A, storage medium 1350 of 13B, and logic circuit 1428 in a single computing entity, such as entirely within a single device. Alternatively, the device 1400 may distribute portions of the structure and/or operations for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, apparatus 900 and/or system 940 of FIG. 9, apparatus 1000 and/or system 1040 of FIG. 10, logic flow 1100 of FIG. 11, logic flow 1200 of FIG. 12, storage medium 1300 of FIG. 13A, storage medium 1350 of 13B, and logic circuit 1428 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1410 may include a component or combination of components adapted for transmitting and/or receiving single-carrier or multi-carrier modulated signals (e.g., including complementary code keying (CCK), orthogonal frequency division multiplexing (OFDM), and/or single-carrier frequency division multiple access (SC-FDMA) symbols) although the embodiments are not limited to any specific over-the-air interface or modulation scheme. Radio interface 1410 may include, for example, a receiver 1412, a frequency synthesizer 1414, and/or a transmitter 1416. Radio interface 1410 may include bias controls, a crystal oscillator and/or one or more antennas 1418-*f*. In another embodiment, radio interface 1410 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1420 may communicate with radio interface 1410 to process receive and/or transmit signals and may include, for example, an analog-to-digital converter 1422 for down converting received signals, a digital-to-analog converter 1424 for up converting signals for transmission. Further, baseband circuitry 1420 may include a baseband or physical layer (PHY) processing circuit 1426 for PHY link layer processing of respective receive/transmit signals. Baseband circuitry 1420 may include, for example, a medium access control (MAC) processing circuit 1427 for MAC/data link layer processing. Baseband circuitry 1420 may include a memory controller 1432 for communicating with MAC processing circuit 1427 and/or a computing platform 1430, for example, via one or more interfaces 1434.

In some embodiments, PHY processing circuit 1426 may include a frame construction and/or detection module, in combination with additional circuitry such as a buffer memory, to construct and/or deconstruct communication frames. Alternatively or in addition, MAC processing circuit 1427 may share processing for certain of these functions or perform these processes independent of PHY processing circuit 1426. In some embodiments, MAC and PHY processing may be integrated into a single circuit.

The computing platform 1430 may provide computing functionality for the device 1400. As shown, the computing platform 1430 may include a processing component 1440. In addition to, or alternatively of, the baseband circuitry 1420, the device 1400 may execute processing operations or logic for one or more of apparatus 300 and/or system 340 of FIG. 3, apparatus 400 and/or system 440 of FIG. 4, apparatus 500 and/or system 540 of FIG. 5, logic flow 600 of FIG. 6, logic flow 700 of FIG. 7, logic flow 800 of FIG. 8, apparatus 900 and/or system 940 of FIG. 9, apparatus 1000 and/or system 1040 of FIG. 10, logic flow 1100 of FIG. 11, logic flow 1200 of FIG. 12, storage medium 1300 of FIG. 13A, storage medium 1350 of 13B, and logic circuit 1428 using the processing component 1440. The processing component 1440 (and/or PHY 1426 and/or MAC 1427) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1430 may further include other platform components 1450. Other platform components 1450 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1400 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, display, television, digital television, set top box, wireless access point, base station, node B, subscriber station, mobile subscriber center, radio network controller, router, hub, gateway, bridge, switch, machine, or combination thereof. Accordingly, functions and/or specific configurations of device 1400 described herein, may be included or omitted in various embodiments of device 1400, as suitably desired.

Embodiments of device 1400 may be implemented using single input single output (SISO) architectures. However, certain implementations may include multiple antennas (e.g., antennas 1418-$f$) for transmission and/or reception using adaptive antenna techniques for beamforming or spatial division multiple access (SDMA) and/or using MIMO communication techniques.

The components and features of device 1400 may be implemented using any combination of discrete circuitry, application specific integrated circuits (ASICs), logic gates and/or single chip architectures. Further, the features of device 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

Figure 15:
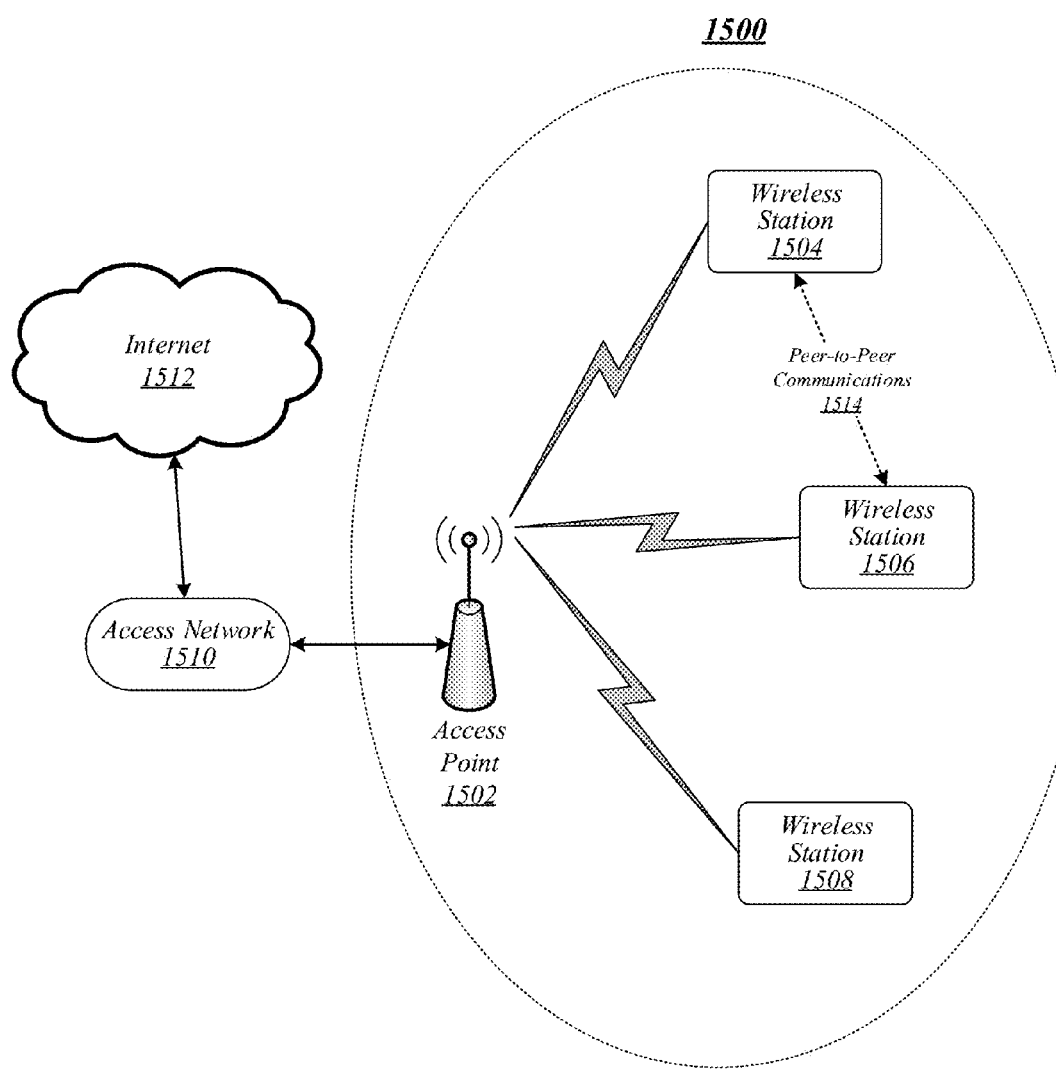
FIG. 15 illustrates an embodiment of a wireless network.

FIG. 15 illustrates an embodiment of a wireless network 1500. As shown in FIG. 15, wireless network comprises an access point 1502 and wireless stations 1504, 1506, and 1508. In various embodiments, wireless network 1500 may comprise a wireless local area network (WLAN), such as a WLAN implementing one or more Institute of Electrical and Electronics Engineers (IEEE) 802.11 standards (sometimes collectively referred to as "Wi-Fi"). In some other embodiments, wireless network 1500 may comprise another type of wireless network, and/or may implement other wireless communications standards. In various embodiments, for example, wireless network 1500 may comprise a WWAN or WPAN rather than a WLAN. The embodiments are not limited to this example.

In some embodiments, wireless network 1500 may implement one or more broadband wireless communications standards, such as 3G or 4G standards, including their revisions, progeny, and variants. Examples of 3G or 4G wireless standards may include without limitation any of the IEEE 802.16m and 802.16p standards, 3rd Generation Partnership Project (3GPP) Long Term Evolution (LTE) and LTE-Advanced (LTE-A) standards, and International Mobile Telecommunications Advanced (IMT-ADV) standards, including their revisions, progeny and variants. Other suitable examples may include, without limitation, Global System for Mobile Communications (GSM)/Enhanced Data Rates for GSM Evolution (EDGE) technologies, Universal Mobile Telecommunications System (UMTS)/High Speed Packet Access (HSPA) technologies, Worldwide Interoperability for Microwave Access (WiMAX) or the WiMAX II technologies, Code Division Multiple Access (CDMA) 2000 system technologies (e.g., CDMA2000 1xRTT, CDMA2000 EV-DO, CDMA EV-DV, and so forth), High Performance Radio Metropolitan Area Network (HIPERMAN) technologies as defined by the European Telecommunications Standards Institute (ETSI) Broadband Radio Access Networks (BRAN), Wireless Broadband (WiBro) technologies, GSM with General Packet Radio Service (GPRS) system (GSM/GPRS) technologies, High Speed Downlink Packet Access (HSDPA) technologies, High Speed Orthogonal Frequency-Division Multiplexing (OFDM) Packet Access (HSOPA) technologies, High-Speed Uplink Packet Access (HSUPA) system technologies, 3GPP Rel. 8-12 of LTE/System Architecture Evolution (SAE), and so forth. The embodiments are not limited in this context.

In various embodiments, wireless stations 1504, 1506, and 1508 may communicate with access point 1502 in order to obtain connectivity to one or more external data networks. In some embodiments, for example, wireless stations 1504, 1506, and 1508 may connect to the Internet 1512 via access point 1502 and access network 1510. In various embodiments, access network 1510 may comprise a private network that provides subscription-based Internet-connectivity, such as an Internet Service Provider (ISP) network. The embodiments are not limited to this example.

In various embodiments, two or more of wireless stations 1504, 1506, and 1508 may communicate with each other directly by exchanging peer-to-peer communications. For example, in the example of FIG. 15, wireless stations 1504 and 1506 communicate with each other directly by exchanging peer-to-peer communications 1514. In some embodiments, such peer-to-peer communications may be performed according to one or more Wi-Fi Alliance (WFA) standards. For example, in various embodiments, such peer-to-peer communications may be performed according to the WFA Wi-Fi Direct standard, 2010 Release. In various embodiments, such peer-to-peer communications may additionally or alternatively be performed using one or more interfaces, protocols, and/or standards developed by the WFA Wi-Fi Direct Services (WFDS) Task Group. The embodiments are not limited to these examples.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments:

Example 1 is a mobile communication device, comprising: logic, at least a portion of which is in hardware, the logic to receive initiator sector sweep (ISS) monitoring instructions identifying one or more millimeter-wave (mmWave) frequency channels to be monitored, perform an ISS monitoring procedure comprising monitoring the one or more mmWave frequency channels, and send an ISS monitoring report indicating whether any mmWave-capable boosters have been detected during the ISS monitoring procedure.

Example 2 is the mobile communication device of Example 1, the logic to include a respective booster identifier (ID) for each of one or more mmWave-capable boosters in the ISS monitoring report in response to detecting the one or more mmWave-capable boosters during the ISS monitoring procedure.

Example 3 is the mobile communication device of Example 2, the logic to receive a booster selection notification in response to the ISS monitoring report, the booster selection notification to identify a provisional serving booster for the mobile communication device, the provisional serving booster to comprise one of the one or more mmWave-capable boosters.

Example 4 is the mobile communication device of Example 3, the logic to perform an mmWave beamforming procedure in response to receipt of the booster selection notification, the performance of the mmWave beamforming procedure to include performance of a responder sector sweep (RSS).

Example 5 is the mobile communication device of Example 4, the logic to receive a sector sweep feedback (SSW-FB) message in response to the RSS and, in response to receipt of the SSW-FB message, send a sector sweep acknowledgment (SSW-ACK) message and a beamforming outcome report indicating that the mmWave beamforming procedure has been successful.

Example 6 is the mobile communication device of Example 4, the logic to send a beamforming outcome report indicating that the mmWave beamforming procedure has failed in response to a determination that no sector sweep feedback (SSW-FB) message has been received in response to the RSS.

Example 7 is the mobile communication device of Example 1, the logic to send a respective set of reference signal measurements for each of a plurality of mmWave-capable boosters in response to detecting the plurality of mmWave-capable boosters during the ISS monitoring procedure.

Example 8 is the mobile communication device of Example 7, the respective set of reference signal measurements for each of the plurality of mmWave-capable boosters to comprise one or more of a reference signal received power (RSRP), a reference signal received quality (RSRQ), and a received signal strength indicator (RSSI).

Example 9 is the mobile communication device of any of Examples 1 to 8, comprising: at least one radio frequency (RF) transceiver; and at least one RF antenna.

Example 10 is the mobile communication device of Example 9, comprising a touchscreen display.

Example 11 is at least one non-transitory computer-readable storage medium comprising a set of wireless communication instructions that, in response to being executed at a millimeter-wave (mmWave)-capable booster node, cause the mmWave-capable booster node to: receive initiator sector sweep (ISS) performance instructions; perform an ISS during a time interval specified by the ISS performance instructions, the ISS to comprise sweeping transmissions of directional synchronization signals through a plurality of sectors of an mmWave-capable small cell; and send an ISS performance confirmation to confirm performance of the ISS.

Example 12 is the at least one non-transitory computer-readable storage medium of Example 11, the ISS to comprise transmission of directional synchronization signals on one or more mmWave frequency channels specified by the ISS performance instructions.

Example 13 is the at least one non-transitory computer-readable storage medium of Example 11, comprising wireless communication instructions that, in response to being executed at the mmWave-capable booster node, cause the mmWave-capable booster node to receive a booster selection notification following transmission of the ISS performance confirmation, the booster selection notification to identify an mmWave-capable mobile device and to indicate that the mmWave-capable booster node is to serve the mmWave-capable mobile device.

Example 14 is the at least one non-transitory computer-readable storage medium of Example 13, comprising wireless communication instructions that, in response to being executed at the mmWave-capable booster node, cause the mmWave-capable booster node to perform an mmWave beamforming procedure in response to receipt of the booster selection notification, the performance of the mmWave beamforming procedure to include performance of a responder sector sweep (RSS) monitoring procedure.

Example 15 is the at least one non-transitory computer-readable storage medium of Example 14, comprising wireless communication instructions that, in response to being executed at the mmWave-capable booster node, cause the mmWave-capable booster node to send a sector sweep feedback (SSW-FB) message in response to successful receipt of one or more RSS signals during the RSS.

Example 16 is the at least one non-transitory computer-readable storage medium of Example 15, comprising wireless communication instructions that, in response to being executed at the mmWave-capable booster node, cause the mmWave-capable booster node to: receive a sector sweep acknowledgment (SSW-ACK) message in response to the SSW-FB message; and send a beamforming outcome report indicating that the mmWave beamforming procedure has been successful in response to receipt of the SSW-ACK message.

Example 17 is the at least one non-transitory computer-readable storage medium of Example 16, comprising wireless communication instructions that, in response to being executed at the mmWave-capable booster node, cause the mmWave-capable booster node to: establish a beamformed wireless link via the mmWave beamforming procedure; receive a link allocation notification; and exchange user plane data over the beamformed wireless link based on the link allocation notification.

Example 18 is the at least one non-transitory computer-readable storage medium of Example 15, comprising wireless communication instructions that, in response to being executed at the mmWave-capable booster node, cause the mmWave-capable booster node to send a beamforming outcome report indicating that the mmWave beamforming procedure has failed in response to a determination that no sector sweep feedback (SSW-ACK) message has been received in response to the SSW-FB message.

Example 19 is a wireless communication method, comprising: sending, from a wireless communication node, a booster selection notification identifying a provisional serving millimeter-wave (mmWave)-capable booster for an mmWave-capable mobile device; determining, by processing circuitry at the wireless communication node, whether an mmWave beamforming procedure for establishing a beamformed wireless link between the mmWave-capable booster and the mmWave-capable mobile device has been successful; and sending a link allocation notification identifying one or more types of data to be exchanged over the beamformed wireless link in response to a determination that the mmWave beamforming procedure has been successful.

Example 20 is the wireless communication method of Example 19, comprising: receiving an initiator sector sweep (ISS) monitoring report; and determining the provisional serving mmWave-capable booster based on the ISS monitoring report.

Example 21 is the wireless communication method of Example 20, comprising: sending ISS monitoring instructions; and receiving the ISS monitoring report in response to the ISS monitoring instructions.

Example 22 is the wireless communication method of Example 21, the ISS monitoring instructions to identify one or more time intervals during which the mmWave-capable mobile device is to perform ISS monitoring and one or more mmWave frequency channels on which the mmWave-capable mobile device is to scan for directional sync signals.

Example 23 is the wireless communication method of Example 20, the ISS monitoring report to comprise a respective set of one or more reference signal measurements for each of a plurality of mmWave-capable boosters, the provisional serving mmWave-capable booster selected from among the plurality of mmWave-capable boosters based on the set of reference signal measurements for the provisional serving mmWave-capable booster.

Example 24 is the wireless communication method of Example 23, the set of reference signal measurements for the provisional serving mmWave-capable booster to comprise one or more of a reference signal received power (RSRP), a reference signal received quality (RSRQ), and a received signal strength indicator (RSSI).

Example 25 is the wireless communication method of Example 23, comprising: selecting a second provisional serving mmWave-capable booster from among the plurality of mmWave-capable boosters; and sending a second booster selection notification identifying the second provisional serving mmWave-capable booster in response to a determination that the mmWave beamforming procedure has failed.

Example 26 is the wireless communication method of Example 19, comprising determining whether the mmWave beamforming procedure has been successful based on one or more received beamforming outcome reports.

Example 27 is at least one non-transitory computer-readable storage medium comprising a set of instructions that, in response to being executed on a computing device, cause the computing device to perform a wireless communication method according to any of Examples 19 to 26.

Example 28 is an apparatus, comprising means for performing a wireless communication method according to any of Examples 19 to 26.

Example 29 is a system, comprising: an apparatus according to Example 28; at least one radio frequency (RF) transceiver; and at least one RF antenna.

Example 30 is the system of Example 29, comprising at least one memory unit.

Example 31 is a millimeter-wave (mmWave)-capable booster node, comprising: means for receiving initiator sector sweep (ISS) performance instructions; means for performing an ISS during a time interval specified by the ISS performance instructions, the ISS to comprise sweeping transmissions of directional synchronization signals through a plurality of sectors of an mmWave-capable small cell; and means for sending an ISS performance confirmation to confirm performance of the ISS.

Example 32 is the mmWave-capable booster node of Example 31, the ISS to comprise transmission of directional synchronization signals on one or more mmWave frequency channels specified by the ISS performance instructions.

Example 33 is the mmWave-capable booster node of Example 31, comprising means for receiving a booster selection notification following transmission of the ISS performance confirmation, the booster selection notification to identify an mmWave-capable mobile device and to indicate that the mmWave-capable booster node is to serve the mmWave-capable mobile device.

Example 34 is the mmWave-capable booster node of Example 33, comprising means for performing an mmWave beamforming procedure in response to receipt of the booster selection notification, the performance of the mmWave beamforming procedure to include performance of a responder sector sweep (RSS) monitoring procedure.

Example 35 is the mmWave-capable booster node of Example 34, comprising means for sending a sector sweep feedback (SSW-FB) message in response to successful receipt of one or more RSS signals during the RSS.

Example 36 is the mmWave-capable booster node of Example 35, comprising: means for receiving a sector sweep acknowledgment (SSW-ACK) message in response to the SSW-FB message; and means for sending a beamforming outcome report indicating that the mmWave beamforming procedure has been successful in response to receipt of the SSW-ACK message.

Example 37 is the mmWave-capable booster node of Example 36, comprising: means for establishing a beamformed wireless link via the mmWave beamforming procedure; means for receiving a link allocation notification; and means for exchanging user plane data over the beamformed wireless link based on the link allocation notification.

Example 38 is the mmWave-capable booster node of Example 35, comprising means for sending a beamforming outcome report indicating that the mmWave beamforming procedure has failed in response to a determination that no sector sweep feedback (SSW-ACK) message has been received in response to the SSW-FB message.

Example 39 is the mmWave-capable booster node of any of Examples 31 to 38, comprising: at least one radio frequency (RF) transceiver; and at least one RF antenna.

Example 40 is the mmWave-capable booster node of Example 39, comprising at least one memory unit.

Example 41 is a wireless communication node, comprising: logic, at least a portion of which is in hardware, the logic to send a booster selection notification identifying a provisional serving millimeter-wave (mmWave)-capable booster for an mmWave-capable mobile device, determine whether an mmWave beamforming procedure for establishing a beamformed wireless link between the mmWave-capable booster and the mmWave-capable mobile device has been successful, and in response to a determination that the mmWave beamforming procedure has been successful, send a link allocation notification identifying one or more types of data to be exchanged over the beamformed wireless link.

Example 42 is the wireless communication node of Example 41, the logic to receive an initiator sector sweep (ISS) monitoring report and determine the provisional serving mmWave-capable booster based on the ISS monitoring report.

Example 43 is the wireless communication node of Example 42, the logic to send ISS monitoring instructions and receive the ISS monitoring report in response to the ISS monitoring instructions.

Example 44 is the wireless communication node of Example 43, the ISS monitoring instructions to identify one or more time intervals during which the mmWave-capable mobile device is to perform ISS monitoring and one or more mmWave frequency channels on which the mmWave-capable mobile device is to scan for directional sync signals.

Example 45 is the wireless communications node of Example 42, the ISS monitoring report to comprise a respective set of one or more reference signal measurements for each of a plurality of mmWave-capable boosters, the logic to select the provisional serving mmWave-capable booster from among the plurality of mmWave-capable boosters based on the set of reference signal measurements for the provisional serving mmWave-capable booster.

Example 46 is the wireless communications node of Example 45, the set of reference signal measurements for the provisional serving mmWave-capable booster to comprise one or more of a reference signal received power (RSRP), a reference signal received quality (RSRQ), and a received signal strength indicator (RSSI).

Example 47 is the wireless communication node of Example 45, the logic to select a second provisional serving mmWave-capable booster from among the plurality of mmWave-capable boosters and send a second booster selection notification identifying the second provisional serving mmWave-capable booster in response to a determination that the mmWave beamforming procedure has failed.

Example 48 is the wireless communication node of Example 41, the logic to determine whether the mmWave beamforming procedure has been successful based on one or more received beamforming outcome reports.

Example 49 is the wireless communication node of any of Examples 41 to 48, comprising: one or more radio frequency (RF) transceivers; and one or more RF antennas.

Example 50 is the wireless communication node of Example 49, comprising at least one memory unit.

Example 51 is at least one non-transitory computer-readable storage medium comprising a set of wireless communication instructions that, in response to being executed on a mobile communication device, cause the mobile communication device to: receive initiator sector sweep (ISS) monitoring instructions identifying one or more millimeter-wave (mmWave) frequency channels to be monitored; perform an ISS monitoring procedure comprising monitoring the one or more mmWave frequency channels; and send an ISS monitoring report indicating whether any mmWave-capable boosters have been detected during the ISS monitoring procedure.

Example 52 is the at least one non-transitory computer-readable storage medium of Example 51, comprising wireless communication instructions that, in response to being executed on the mobile communication device, cause the mobile communication device to include a respective booster identifier (ID) for each of one or more mmWave-capable boosters in the ISS monitoring report in response to detecting the one or more mmWave-capable boosters during the ISS monitoring procedure.

Example 53 is the at least one non-transitory computer-readable storage medium of Example 52, comprising wireless communication instructions that, in response to being executed on the mobile communication device, cause the mobile communication device to receive a booster selection notification in response to the ISS monitoring report, the booster selection notification to identify a provisional serving booster for the mobile communication device, the provisional serving booster to comprise one of the one or more mmWave-capable boosters.

Example 54 is the at least one non-transitory computer-readable storage medium of Example 53, comprising wireless communication instructions that, in response to being executed on the mobile communication device, cause the mobile communication device to perform an mmWave beamforming procedure in response to receipt of the booster selection notification, the performance of the mmWave beamforming procedure to include performance of a responder sector sweep (RSS).

Example 55 is the at least one non-transitory computer-readable storage medium of Example 54, comprising wireless communication instructions that, in response to being executed on the mobile communication device, cause the mobile communication device to: receive a sector sweep feedback (SSW-FB) message in response to the RSS; and send a sector sweep acknowledgment (SSW-ACK) message and a beamforming outcome report indicating that the mmWave beamforming procedure has been successful in response to receipt of the SSW-FB message.

Example 56 is the at least one non-transitory computer-readable storage medium of Example 54, comprising wireless communication instructions that, in response to being executed on the mobile communication device, cause the mobile communication device to send a beamforming outcome report indicating that the mmWave beamforming procedure has failed in response to a determination that no sector sweep feedback (SSW-FB) message has been received in response to the RSS.

Example 57 is the at least one non-transitory computer-readable storage medium of Example 51, comprising wireless communication instructions that, in response to being executed on the mobile communication device, cause the mobile communication device to send a respective set of reference signal measurements for each of a plurality of mmWave-capable boosters in response to detecting the plurality of mmWave-capable boosters during the ISS monitoring procedure.

Example 58 is the at least one non-transitory computer-readable storage medium of Example 57, the respective set of reference signal measurements for each of the plurality of mmWave-capable boosters to comprise one or more of a reference signal received power (RSRP), a reference signal received quality (RSRQ), and a received signal strength indicator (RSSI).

Example 59 is a wireless communication node, comprising: means for sending a booster selection notification identifying a provisional serving millimeter-wave (mmWave)-capable booster for an mmWave-capable mobile device; means for determining whether an mmWave beamforming procedure for establishing a beamformed wireless link between the mmWave-capable booster and the mmWave-capable mobile device has been successful; and means for sending a link allocation notification identifying one or more types of data to be exchanged over the beamformed wireless link in response to a determination that the mmWave beamforming procedure has been successful.

Example 60 is the wireless communication node of Example 59, comprising: means for receiving an initiator sector sweep (ISS) monitoring report; and means for determining the provisional serving mmWave-capable booster based on the ISS monitoring report.

Example 61 is the wireless communication node of Example 60, comprising: means for sending ISS monitoring instructions; and means for receiving the ISS monitoring report in response to the ISS monitoring instructions.

Example 62 is the wireless communication node of Example 61, the ISS monitoring instructions to identify one or more time intervals during which the mmWave-capable mobile device is to perform ISS monitoring and one or more mmWave frequency channels on which the mmWave-capable mobile device is to scan for directional sync signals.

Example 63 is the wireless communication node of Example 60, the ISS monitoring report to comprise a respective set of one or more reference signal measurements for each of a plurality of mmWave-capable boosters, the provisional serving mmWave-capable booster selected from among the plurality of mmWave-capable boosters based on the set of reference signal measurements for the provisional serving mmWave-capable booster.

Example 64 is the wireless communication node of Example 63, the set of reference signal measurements for the provisional serving mmWave-capable booster to comprise one or more of a reference signal received power (RSRP), a reference signal received quality (RSRQ), and a received signal strength indicator (RSSI).

Example 65 is the wireless communication node of Example 63, comprising: means for selecting a second provisional serving mmWave-capable booster from among the plurality of mmWave-capable boosters; and means for sending a second booster selection notification identifying the second provisional serving mmWave-capable booster in response to a determination that the mmWave beamforming procedure has failed.

Example 66 is the wireless communication node of Example 59, comprising means for determining whether the mmWave beamforming procedure has been successful based on one or more received beamforming outcome reports.

Example 67 is the wireless communication node of any of Examples 59 to 66, comprising: at least one radio frequency (RF) transceiver; and at least one RF antenna.

Example 68 is the wireless communication node of Example 67, comprising at least one memory unit.

Example 69 is a wireless communication method, comprising: receiving initiator sector sweep (ISS) monitoring instructions identifying one or more millimeter-wave (mmWave) frequency channels to be monitored; performing, by processing circuitry of a mobile communication device, an ISS monitoring procedure comprising monitoring the one or more mmWave frequency channels; and sending an ISS monitoring report indicating whether any mmWave-capable boosters have been detected during the ISS monitoring procedure.

Example 70 is the wireless communication method of Example 69, comprising including a respective booster identifier (ID) for each of one or more mmWave-capable boosters in the ISS monitoring report in response to detecting the one or more mmWave-capable boosters during the ISS monitoring procedure.

Example 71 is the wireless communication method of Example 71, comprising receiving a booster selection notification in response to the ISS monitoring report, the booster selection notification to identify a provisional serving booster for the mobile communication device, the provisional serving booster to comprise one of the one or more mmWave-capable boosters.

Example 72 is the wireless communication method of Example 71, comprising performing an mmWave beamforming procedure in response to receipt of the booster selection notification, the performance of the mmWave beamforming procedure to include performance of a responder sector sweep (RSS).

Example 73 is the wireless communication method of Example 72, comprising: receiving a sector sweep feedback (SSW-FB) message in response to the RSS; and sending a sector sweep acknowledgment (SSW-ACK) message and a beamforming outcome report indicating that the mmWave beamforming procedure has been successful in response to receipt of the SSW-FB message.

Example 74 is the wireless communication method of Example 72, comprising sending a beamforming outcome report indicating that the mmWave beamforming procedure has failed in response to a determination that no sector sweep feedback (SSW-FB) message has been received in response to the RSS.

Example 75 is the wireless communication method of Example 69, comprising sending a respective set of reference signal measurements for each of a plurality of mmWave-capable boosters in response to detecting the plurality of mmWave-capable boosters during the ISS monitoring procedure.

Example 76 is the wireless communication method of Example 75, the respective set of reference signal measurements for each of the plurality of mmWave-capable boosters to comprise one or more of a reference signal received power (RSRP), a reference signal received quality (RSRQ), and a received signal strength indicator (RSSI).

Example 77 is at least one non-transitory computer-readable storage medium comprising a set of instructions that, in response to being executed on a mobile communication device, cause the mobile communication device to perform a wireless communication method according to any of Examples 69 to 76.

Example 78 is an apparatus, comprising means for performing a wireless communication method according to any of Examples 69 to 76.

Example 79 is a system, comprising: an apparatus according to Example 78; at least one radio frequency (RF) transceiver; and at least one RF antenna.

Example 80 is the system of Example 79, comprising a touchscreen display.

Example 81 is a wireless communication method, comprising: receiving initiator sector sweep (ISS) performance instructions at a millimeter-wave (mmWave)-capable booster node; performing, by processing circuitry at the mmWave-capable booster node, an ISS during a time interval specified by the ISS performance instructions, the ISS to comprise sweeping transmissions of directional synchronization signals through a plurality of sectors of an mmWave-capable small cell; and sending an ISS performance confirmation to confirm performance of the ISS.

Example 82 is the wireless communication method of Example 81, the ISS to comprise transmission of directional synchronization signals on one or more mmWave frequency channels specified by the ISS performance instructions.

Example 83 is the wireless communication method of Example 81, comprising receiving a booster selection notification following transmission of the ISS performance confirmation, the booster selection notification to identify an mmWave-capable mobile device and to indicate that the mmWave-capable booster node is to serve the mmWave-capable mobile device.

Example 84 is the wireless communication method of Example 83, comprising performing an mmWave beamforming procedure in response to receipt of the booster selection notification, the performance of the mmWave beamforming procedure to include performance of a responder sector sweep (RSS) monitoring procedure.

Example 85 is the wireless communication method of Example 84, comprising sending a sector sweep feedback (SSW-FB) message in response to successful receipt of one or more RSS signals during the RSS.

Example 86 is the wireless communication method of Example 85, comprising: receiving a sector sweep acknowledgment (SSW-ACK) message in response to the SSW-FB message; and sending a beamforming outcome report indicating that the mmWave beamforming procedure has been successful in response to receipt of the SSW-ACK message.

Example 87 is the wireless communication method of Example 86, comprising: establishing a beamformed wireless link via the mmWave beamforming procedure; receiving a link allocation notification; and exchanging user plane data over the beamformed wireless link based on the link allocation notification.

Example 88 is the wireless communication method of Example 85, comprising sending a beamforming outcome report indicating that the mmWave beamforming procedure has failed in response to a determination that no sector sweep feedback (SSW-ACK) message has been received in response to the SSW-FB message.

Example 89 is at least one non-transitory computer-readable storage medium comprising a set of instructions that, in response to being executed on a computing device, cause the computing device to perform a wireless communication method according to any of Examples 81 to 88.

Example 90 is an apparatus, comprising means for performing a wireless communication method according to any of Examples 81 to 88.

Example 91 is a system, comprising: an apparatus according to Example 90; at least one radio frequency (RF) transceiver; and at least one RF antenna.

Example 92 is the system of Example 91, comprising at least one memory unit.

Example 93 is a mobile communication device, comprising: means for receiving initiator sector sweep (ISS) monitoring instructions identifying one or more millimeter-wave (mmWave) frequency channels to be monitored; means for performing an ISS monitoring procedure comprising monitoring the one or more mmWave frequency channels; and means for sending an ISS monitoring report indicating whether any mmWave-capable boosters have been detected during the ISS monitoring procedure.

Example 94 is the mobile communication device of Example 93, comprising means for including a respective booster identifier (ID) for each of one or more mmWave-capable boosters in the ISS monitoring report in response to detecting the one or more mmWave-capable boosters during the ISS monitoring procedure.

Example 95 is the mobile communication device of Example 94, comprising means for receiving a booster selection notification in response to the ISS monitoring report, the booster selection notification to identify a provisional serving booster for the mobile communication device, the provisional serving booster to comprise one of the one or more mmWave-capable boosters.

Example 96 is the mobile communication device of Example 95, comprising means for performing an mmWave beamforming procedure in response to receipt of the booster selection notification, the performance of the mmWave beamforming procedure to include performance of a responder sector sweep (RSS).

Example 97 is the mobile communication device of Example 96, comprising: means for receiving a sector sweep feedback (SSW-FB) message in response to the RSS; and means for sending a sector sweep acknowledgment (SSW-ACK) message and a beamforming outcome report indicating that the mmWave beamforming procedure has been successful in response to receipt of the SSW-FB message.

Example 98 is the mobile communication device of Example 96, comprising means for sending a beamforming outcome report indicating that the mmWave beamforming procedure has failed in response to a determination that no sector sweep feedback (SSW-FB) message has been received in response to the RSS.

Example 99 is the mobile communication device of Example 93, comprising means for sending a respective set of reference signal measurements for each of a plurality of mmWave-capable boosters in response to detecting the plurality of mmWave-capable boosters during the ISS monitoring procedure.

Example 100 is the mobile communication device of Example 99, the respective set of reference signal measurements for each of the plurality of mmWave-capable boosters to comprise one or more of a reference signal received power (RSRP), a reference signal received quality (RSRQ), and a received signal strength indicator (RSSI).

Example 101 is the mobile communication device of any of Examples 93 to 100, comprising: at least one radio frequency (RF) transceiver; and at least one RF antenna.

Example 102 is the mobile communication device of Example 101, comprising a touchscreen display.

Example 103 is a millimeter-wave (mmWave)-capable booster node, comprising: logic, at least a portion of which is in hardware, the logic to receive initiator sector sweep (ISS) performance instructions, perform an ISS during a time interval specified by the ISS performance instructions, the ISS to comprise sweeping transmissions of directional synchronization signals through a plurality of sectors of an mmWave-capable small cell, and send an ISS performance confirmation to confirm performance of the ISS.

Example 104 is the mmWave-capable booster node of Example 103, the ISS to comprise transmission of directional synchronization signals on one or more mmWave frequency channels specified by the ISS performance instructions.

Example 105 is the mmWave-capable booster node of Example 103, the logic to receive a booster selection notification following transmission of the ISS performance confirmation, the booster selection notification to identify an mmWave-capable mobile device and to indicate that the mmWave-capable booster node is to serve the mmWave-capable mobile device.

Example 106 is the mmWave-capable booster node of Example 105, the logic to perform an mmWave beamforming procedure in response to receipt of the booster selection notification, the performance of the mmWave beamforming procedure to include performance of a responder sector sweep (RSS) monitoring procedure.

Example 107 is the mmWave-capable booster node of Example 106, the logic to send a sector sweep feedback (SSW-FB) message in response to successful receipt of one or more RSS signals during the RSS.

Example 108 is the mmWave-capable booster node of Example 107, the logic to receive a sector sweep acknowledgment (SSW-ACK) message in response to the SSW-FB message and, in response to receipt of the SSW-ACK message, send a beamforming outcome report indicating that the mmWave beamforming procedure has been successful.

Example 109 is the mmWave-capable booster node of Example 108, the logic to establish a beamformed wireless link via the mmWave beamforming procedure, receive a link allocation notification, and exchange user plane data over the beamformed wireless link based on the link allocation notification.

Example 110 is the mmWave-capable booster node of Example 107, the logic to send a beamforming outcome report indicating that the mmWave beamforming procedure has failed in response to a determination that no sector sweep feedback (SSW-ACK) message has been received in response to the SSW-FB message.

Example 111 is the mmWave-capable booster node of any of Examples 103 to 110, comprising: one or more radio frequency (RF) transceivers; and one or more RF antennas.

Example 112 is the mmWave-capable booster node of Example 111, comprising at least one memory unit.

Example 113 is at least one non-transitory computer-readable storage medium comprising a set of wireless communication instructions that, in response to being executed at a wireless communication node, cause the wireless communication node to: send a booster selection notification identifying a provisional serving millimeter-wave (mmWave)-capable booster for an mmWave-capable mobile device; determine whether an mmWave beamforming procedure for establishing a beamformed wireless link between the mmWave-capable booster and the mmWave-capable mobile device has been successful; and send a link allocation notification identifying one or more types of data to be exchanged over the beamformed wireless link in response to a determination that the mmWave beamforming procedure has been successful.

Example 114 is the at least one non-transitory computer-readable storage medium of Example 113, comprising wireless communication instructions that, in response to being executed at the wireless communication node, cause the wireless communication node to: receive an initiator sector sweep (ISS) monitoring report; and determine the provisional serving mmWave-capable booster based on the ISS monitoring report.

Example 115 is the at least one non-transitory computer-readable storage medium of Example 114, comprising wireless communication instructions that, in response to being executed at the wireless communication node, cause the wireless communication node to: send ISS monitoring instructions; and receive the ISS monitoring report in response to the ISS monitoring instructions.

Example 116 is the at least one non-transitory computer-readable storage medium of Example 115, the ISS monitoring instructions to identify one or more time intervals during which the mmWave-capable mobile device is to perform ISS monitoring and one or more mmWave frequency channels on which the mmWave-capable mobile device is to scan for directional sync signals.

Example 117 is the at least one non-transitory computer-readable storage medium of Example 114, the ISS monitoring report to comprise a respective set of one or more reference signal measurements for each of a plurality of mmWave-capable boosters, the provisional serving mmWave-capable booster selected from among the plurality of mmWave-capable boosters based on the set of reference signal measurements for the provisional serving mmWave-capable booster.

Example 118 is the at least one non-transitory computer-readable storage medium of Example 117, the set of reference signal measurements for the provisional serving mmWave-capable booster to comprise one or more of a reference signal received power (RSRP), a reference signal received quality (RSRQ), and a received signal strength indicator (RSSI).

Example 119 is the at least one non-transitory computer-readable storage medium of Example 117, comprising wireless communication instructions that, in response to being executed at the wireless communication node, cause the wireless communication node to: select a second provisional serving mmWave-capable booster from among the plurality of mmWave-capable boosters; and send a second booster selection notification identifying the second provisional serving mmWave-capable booster in response to a determination that the mmWave beamforming procedure has failed.

Example 120 is the at least one non-transitory computer-readable storage medium of Example 113, comprising wireless communication instructions that, in response to being executed at the wireless communication node, cause the wireless communication node to determine whether the mmWave beamforming procedure has been successful based on one or more received beamforming outcome reports.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A mobile communication device, comprising:
   at least one radio frequency (RF) transceiver;
   at least one RF antenna; and
   logic, at least a portion of which is in hardware, the logic to receive initiator sector sweep (ISS) monitoring instructions identifying one or more millimeter-wave (mmWave) frequency channels to be monitored, perform an ISS monitoring procedure comprising monitoring the one or more mmWave frequency channels, and send an ISS monitoring report indicating whether any mmWave-capable boosters have been detected during the ISS monitoring procedure.

2. The mobile communication device of claim 1, the logic to include a respective booster identifier (ID) for each of one or more mmWave-capable boosters in the ISS monitoring report in response to detecting the one or more mmWave-capable boosters during the ISS monitoring procedure.

3. The mobile communication device of claim 2, the logic to receive a booster selection notification in response to the ISS monitoring report, the booster selection notification to identify a provisional serving booster for the mobile communication device, the provisional serving booster to comprise one of the one or more mmWave-capable boosters.

4. The mobile communication device of claim 3, the logic to perform an mmWave beamforming procedure in response to receipt of the booster selection notification, the mmWave beamforming procedure to include performance of a responder sector sweep (RSS).

5. The mobile communication device of claim 4, the logic to receive a sector sweep feedback (SSW-FB) message in response to the RSS and, in response to receipt of the SSW-FB message, send a sector sweep acknowledgment (SSW-ACK) message and a beamforming outcome report indicating that the mmWave beamforming procedure has been successful.

6. The mobile communication device of claim 4, the logic to send a beamforming outcome report indicating that the mmWave beamforming procedure has failed in response to a determination that no sector sweep feedback (SSW-FB) message has been received in response to the RSS.

7. The mobile communication device of claim 1, the logic to send a respective set of reference signal measurements for each of a plurality of mmWave-capable boosters in response to detecting the plurality of mmWave-capable boosters during the ISS monitoring procedure.

8. The mobile communication device of claim 7, the respective set of reference signal measurements for each of the plurality of mmWave-capable boosters to comprise one or more of a reference signal received power (RSRP), a reference signal received quality (RSRQ), and a received signal strength indicator (RSSI).

9. The mobile communication device of claim 1, comprising a touchscreen display.

10. A millimeter-wave (mmWave)-capable booster node, comprising:
    one or more radio frequency (RF) transceivers;
    one or more RF antennas; and
    logic, at least a portion of which is in hardware, the logic to receive initiator sector sweep (ISS) performance instructions, perform an ISS during a time interval specified by the ISS performance instructions, the ISS to comprise sweeping transmissions of directional synchronization signals through a plurality of sectors of an mmWave-capable small cell, and send an ISS performance confirmation to confirm performance of the ISS.

11. The mmWave-capable booster node of claim 10, the ISS to comprise transmission of directional synchronization signals on one or more mmWave frequency channels specified by the ISS performance instructions.

12. The mmWave-capable booster node of claim 10, the logic to receive a booster selection notification following transmission of the ISS performance confirmation, the booster selection notification to identify an mmWave-capable mobile device and to indicate that the mmWave-capable booster node is to serve the mmWave-capable mobile device.

13. The mmWave-capable booster node of claim 12, the logic to perform an mmWave beamforming procedure in response to receipt of the booster selection notification, the performance of the mmWave beamforming procedure to include performance of a responder sector sweep (RSS) monitoring procedure.

14. The mmWave-capable booster node of claim 13, the logic to send a sector sweep feedback (SSW-FB) message in response to successful receipt of one or more RSS signals during the RSS.

15. The mmWave-capable booster node of claim 14, the logic to receive a sector sweep acknowledgment (SSW-ACK) message in response to the SSW-FB message and, in response to receipt of the SSW-ACK message, send a beamforming outcome report indicating that the mmWave beamforming procedure has been successful.

16. The mmWave-capable booster node of claim 15, the logic to establish a beamformed wireless link via the mmWave beamforming procedure, receive a link allocation notification, and exchange user plane data over the beamformed wireless link based on the link allocation notification.

17. The mmWave-capable booster node of claim 14, the logic to send a beamforming outcome report indicating that the mmWave beamforming procedure has failed in response to a determination that no sector sweep feedback (SSW-ACK) message has been received in response to the SSW-FB message.

18. A wireless communication node, comprising:
logic, at least a portion of which is in hardware, the logic to send a booster selection notification identifying a provisional serving millimeter-wave (mmWave)-capable booster for an mmWave-capable mobile device, determine whether an mmWave beamforming procedure for establishing a beamformed wireless link between the mmWave-capable booster and the mmWave-capable mobile device has been successful, and in response to a determination that the mmWave beamforming procedure has been successful, send a link allocation notification identifying one or more types of data to be exchanged over the beamformed wireless link.

19. The wireless communication node of claim 18, the logic to receive an initiator sector sweep (ISS) monitoring report and determine the provisional serving mmWave-capable booster based on the ISS monitoring report.

20. The wireless communication node of claim 19, the logic to send ISS monitoring instructions and receive the ISS monitoring report in response to the ISS monitoring instructions.

21. The wireless communication node of claim 20, the ISS monitoring instructions to identify one or more time intervals during which the mmWave-capable mobile device is to perform ISS monitoring and one or more mmWave frequency channels on which the mmWave-capable mobile device is to scan for directional sync signals.

22. The wireless communications node of claim 19, the ISS monitoring report to comprise a respective set of one or more reference signal measurements for each of a plurality of mmWave-capable boosters, the logic to select the provisional serving mmWave-capable booster from among the plurality of mmWave-capable boosters based on the set of reference signal measurements for the provisional serving mmWave-capable booster.

23. The wireless communications node of claim 22, the set of reference signal measurements for the provisional serving mmWave-capable booster to comprise one or more of a reference signal received power (RSRP), a reference signal received quality (RSRQ), and a received signal strength indicator (RSSI).

24. The wireless communication node of claim 22, the logic to select a second provisional serving mmWave-capable booster from among the plurality of mmWave-capable boosters and send a second booster selection notification identifying the second provisional serving mmWave-capable booster in response to a determination that the mmWave beamforming procedure has failed.

25. The wireless communication node of claim 18, the logic to determine whether the mmWave beamforming procedure has been successful based on one or more received beamforming outcome reports.

* * * * *